x

US007601796B2

(12) United States Patent
Breitenkamp et al.

(10) Patent No.: US 7,601,796 B2
(45) Date of Patent: Oct. 13, 2009

(54) SYNTHESIS OF HYBRID BLOCK COPOLYMERS AND USES THEREOF

(75) Inventors: Kurt Breitenkamp, Northampton, MA (US); Kevin Sill, Tampa, FL (US)

(73) Assignee: Intezyne Technologies, Inc., Tampa, FL (US)

( * ) Notice: Subject to any disclaimer, the term of this patent is extended or adjusted under 35 U.S.C. 154(b) by 577 days.

(21) Appl. No.: 11/325,020

(22) Filed: Jan. 4, 2006

(65) Prior Publication Data

US 2006/0172914 A1 Aug. 3, 2006

Related U.S. Application Data

(60) Provisional application No. 60/641,170, filed on Jan. 4, 2005.

(51) Int. Cl.
*C08G 69/08* (2006.01)
(52) U.S. Cl. .............................. 528/310; 526/91; 556/1; 556/45; 556/136; 556/137; 556/138; 530/333
(58) Field of Classification Search .................. 526/91; 556/1, 45, 136, 137, 138; 530/333; 528/310
See application file for complete search history.

(56) References Cited

U.S. PATENT DOCUMENTS

| 5,449,513 | A | 9/1995 | Yokoyama et al. | |
|---|---|---|---|---|
| 5,780,579 | A | 7/1998 | Soula et al. | |
| 5,904,936 | A | 5/1999 | Huille et al. | |
| 5,929,177 | A | 7/1999 | Kataoka et al. | |
| 6,630,171 | B1 | 10/2003 | Huille et al. | |
| 6,686,446 | B2 | 2/2004 | Demming et al. | |
| 2002/0107340 | A1* | 8/2002 | Matyjaszewski et al. | 526/91 |
| 2003/0147958 | A1 | 8/2003 | Ahn et al. | |
| 2004/0048782 | A1 | 3/2004 | Bryson et al. | |
| 2004/0126900 | A1 | 7/2004 | Barry et al. | |
| 2004/0138095 | A1 | 7/2004 | Soula et al. | |
| 2005/0214375 | A1 | 9/2005 | Nakanishi et al. | |
| 2006/0142506 | A1 | 6/2006 | Breitenkamp et al. | |
| 2006/0240092 | A1 | 10/2006 | Breitenkamp et al. | |
| 2006/0269613 | A1 | 11/2006 | Ogawa et al. | |
| 2007/0059271 | A1 | 3/2007 | Kataoka et al. | |

FOREIGN PATENT DOCUMENTS

| EP | 1230934 | 8/2002 |
|---|---|---|
| JP | 11335267 | 12/1999 |
| WO | 2004105799 | 12/2004 |

OTHER PUBLICATIONS

Dimitrov, et al. "Advances in the Synthesis and Characterization of Polypeptide-based Hybrid Block Polymers," Macromolecular Symp 2004, 215, 383-393.
Schlaad, et al, "The Role of Chain-Length Distribution in the Formation of Solid-State Structures of Polypeptide-Based Rod-Coil Block Copolymers" Macromolecules, 2004, 37, 2210-2214.
Dimitrov, et al. "Synthesis of nearly monodisperse polystyrene-polypeptide block copolymers via polymerisation of N-carboxyanhydrides" Chem. Commun., 2003, 2944-2945.
Schlaad, et al. "Block copolymers with amino acid sequences: Molecular chimeras of polypeptides and synthetic polymers" Eur. Phys. J. E 10, 17-23 (2003).
Cammas-Marion, "Functional and site-specific macromolecular micelles as high potential drug carriers" Colloids and Surfaces B: Biointerfaces 16 (1999) 207-215.
Yokoyama, et al., "Preparation of Micelle-Forming Polymer-Drug Conjugates" Bioconjugate Chem. 1992, 3, 295-301.
Deng, et al., "Synthesis of a novel structural triblock copolymer of poly(g-benzyl-lglutamic acid)-b-poly(ethylene oxide)-b-poly(e-caprolactone)" Biomaterials 25 (2004) 3553-3558.
Kim, et al., "Possibility of wound dressing using poly(L-leucine)/poly(ethyleneglycol)/poly(L-leucine) triblock copolymer" Biomaterials 21 (2000) 131}141.
Deming, "Methodologies for preparation of synthetic block polypeptides: materials with future promise in drug delivery" Advanced Drug Deliver Reviews 54, 2002, 1145-1155.
Deming, "Amino Acid Derived Nickelacycles: Intermediates in Nickel-Mediated Polypeptide Synthesis" J. Am. Chem. Soc. 1998, 120, 4240-4241.
Curtin, "Initiators for End-Group Functionalized Polypeptides via Tandem Addition Reactions" J. Am. Chem. Soc. 1999, 121, 7427-7428.
Klok, "Biological-Synthetic Hybrid Block Copolymers: Combining the Best from Two Worlds" Journal of Polymer Science: Part A: Polymer Chemistry, vol. 43, 1-17 (2005).
Doubravaszky, et al., "Uber Probleme der kationischen Polymerisation des Caprolactams. 111. Die Polymerisation mit Benzylamin-hydrochlorid" Die Mukromolekulure Chemie 110 (1967) 257-267 (Nr. 2307).
Adams, et al, "Amphiphilic Block Copolymers for Drug Delivery" Journal of Pharmaceutical Sciences, vol. 92, No. 7, Jul. 2003.
Lutz, "Preparation of Well-Defined Diblock Copolymers with Short Polypeptide Segments by Polymerization of N-Carboxy Anhydrides" Macromol. Rapid Commun. 2005, 26, 23-28.
Aliferis, et al., "Living Polypeptides" Biomacromolecules 2004, 5, 1653-1656.
Fukushima, et al., "PEGylated Polyplex Micelles from Triblock Catiomers with Spatially Ordered Layering of Condensed pDNA and Buffering Units for Enhanced Intracellular Gene Delivery" JACS, ISSN 0002-7863, vol. 127, N°. 9, 2005, pp. 2810-2811.
Meyer and Schlaad "Poly(2-isopropyl-2-oxazoline)-Poly(L-glutamate) Block Copolymers through Ammonium-Mediated NCA Polymerization" Macromolecules 2006, 39, 3967-3970.
International Search Report and Written Opinion for PCT/US06/00144 (corresponding to USSN 11325020) mailed Aug. 27, 2007.

\* cited by examiner

*Primary Examiner*—David Wu
*Assistant Examiner*—Gregory Listvoyb
(74) *Attorney, Agent, or Firm*—Choate Hall & Stewart LLP; Andrea L. C. Robidoux

(57) ABSTRACT

The present invention relates to the field of polymer chemistry and more particularly to multiblock copolymers and methods of preparing the same.

10 Claims, No Drawings

US 7,601,796 B2

SYNTHESIS OF HYBRID BLOCK COPOLYMERS AND USES THEREOF

CROSS-REFERENCE TO RELATED APPLICATIONS

This application claims priority to U.S. provisional application Ser. No. 60/641,170, filed Jan. 4, 2005, the entirety of which is hereby incorporated herein by reference.

FIELD OF THE INVENTION

The present invention relates to the field of polymer chemistry and more particularly to block copolymers, uses thereof, and intermediates thereto.

BACKGROUND OF THE INVENTION

Multi-block copolymers comprising a synthetic polymer portion and a poly(amino acid) portion are of great synthetic interest. The poly(amino acid) portion of such polymers is typically prepared by the ring-opening polymerization of an amino acid-N-carboxy-anhydride (NCA). However, methods for preparing the poly(amino acid) block that employ free amines as initiators of the NCA polymerization afford block copolymers with a wide range of polydispersity indices (PDIs) that tend to be quite high. For example, Schlaad reported PDI values of 1.12-1.60 by initiating polymerization with amino-terminated polystyrene. Schlaad (2003 *Eur. Chem. J.*) also reports a PDI of 7.0 for crude PEG-b-poly(L-benzyl glutamate) copolymers and a PDI of 1.4 after fractionation. Chen (*Biomaterials*, 2004) reported a PDI of 1.5 for poly(ε-caprolactone) (PCL)-b-poly(ethylene glycol) (PEG)-b-poly (γ-benzyl-L-glutamate)(PBLG). It is believed that these high PDIs are due to the highly reactive nature of the NCAs.

To date, the only reported synthetic methods to prepare multi-block copolymers that contain a poly(amino acid) portion with a narrower distribution of molecular weights, is amine-initiated NCA polymerization utilizing high vacuum techniques developed by Hadjichristidis (*Biomacromolecules*, 2004), and the nickel-catalyzed coordination-insertion polymerization of NCAs developed by Deming at the University of California-Santa Barbara (see U.S. Pat. No. 6,686,446). Poly(amino acids) synthesized using high vacuum techniques are synthetically challenging to prepare, employ handmade reaction vessels, and require long time periods for reagent purification and complete polymerization to be achieved. Due to these factors, only a few grams of poly(amino acid) can be prepared in a single polymerization reaction. In addition, since multi-block copolymers that comprise a poly(amino acid) portion are typically designed for biological applications, the use of organometallic initiators and catalysts is undesirable.

Accordingly, there remains a need for a method for preparing block copolymers having a synthetic polymer portion and a poly(amino acid) portion wherein the method is well controlled and multiple poly(amino acid) blocks are incorporated.

DETAILED DESCRIPTION OF CERTAIN EMBODIMENTS OF THE INVENTION

1. General Description:

A method for the controlled polymerization of an NCA, initiated by a polystyrene amine salt, was first reported by Schlaad and coworkers (*Chem. Comm.*, 2003, 2944-2945). It is believed that, during the reaction, the chain end exists primarily in its unreactive salt form as a dormant species and that the unreactive amine salt is in equilibrium with the reactive amine. The free amine is capable of ring opening the NCA, which adds one repeat unit to the polymer chain. This cycle repeats until all of the monomer is consumed and the final poly(amino acid) is formed. This reported method has limitations in that only a single poly(amino acid) block is incorporated. In addition, this reported method only described the use of a polystyrene macroinitiator. In another publication by Schlaad and coworkers (*Eur. Phys. J.*, 2003, 10, 17-23), the author indicates that use of a PEG macroinitiator results in diverse and unpredictable PDIs. The author further indicates that even "the coupling of preformed polymer segments like that of a haloacylated poly(ethylene oxide) with poly(L-aspartic acid) . . . yields block copolymers that are chemically disperse and are often contaminated with homopolymers."

The present invention provides methods for the synthesis of block copolymers containing one or more poly(amino acid) blocks and one or more synthetic polymer blocks. The poly(amino acid) portions of these block copolymers are prepared by controlled ring-opening polymerization of cyclic monomers such as N-carboxy anhydrides (NCAs), lactams, and cyclic imides wherein said polymerization is initiated by an amine salt. The amine salt initiators used in this invention are polymers with terminal amine salts (referred to herein as "macroinitiators"). Without wishing to be bound by any particular theory, it is believed that the amine salt reduces or eliminates many side reactions that are commonly observed with traditional polymerization of these reactive monomers. This leads to block copolymers with narrow distributions of block lengths and molecular weights. It has been surprisingly found that the sequential addition of monomers provides multi-block copolymers having desirable low polydispersity.

The sequential addition of cyclic monomers to a "living" polymer chain end (i.e. a terminal amine salt) affords multi-block copolymers having a variety of poly(amino acid) and synthetic polymer block types. Accordingly, one aspect of the present invention provides a method for preparing a multi-block copolymer comprising two or more different poly (amino acid) blocks and one or more synthetic polymer blocks, wherein said method comprises the step of sequentially polymerizing two or more different cyclic amino acid monomers onto a synthetic polymer having a terminal amine salt wherein said polymerization is initiated by said amine salt.

2. Definitions:

Compounds of this invention include those described generally above, and are further illustrated by the embodiments, sub-embodiments, and species disclosed herein. As used herein, the following definitions shall apply unless otherwise indicated. For purposes of this invention, the chemical elements are identified in accordance with the Periodic Table of the Elements, CAS version, Handbook of Chemistry and Physics, 75$^{th}$ Ed. Additionally, general principles of organic chemistry are described in "Organic Chemistry", Thomas Sorrell, University Science Books, Sausalito: 1999, and "March's Advanced Organic Chemistry", 5$^{th}$ Ed., Ed.: Smith, M. B. and March, J., John Wiley & Sons, New York: 2001, the entire contents of which are hereby incorporated by reference.

As used herein, the term "sequential polymerization", and variations thereof, refers to the method wherein, after a first monomer (e.g. NCA, lactam, or imide) is incorporated into the polymer, thus forming an amino acid "block", a second monomer (e.g. NCA, lactam, or imide) is added to the reaction to form a second amino acid block, which process may be continued in a similar fashion to introduce additional amino acid blocks into the resulting multi-block copolymers.

As used herein, the term "block copolymer" refers to a polymer comprising at least one synthetic polymer portion and at least one poly(amino acid) portion. The term "multi-block copolymer" refers to a polymer comprising at least one synthetic polymer and two or more poly(amino acid) portions. These are also referred to as triblock copolymers (having two poly(amino acid) portions), tetrablock copolymers (having three poly(amino acid) portions), etc. Such multi-block copolymers include those having the format X—W—X, X—W—X', W—X—X', W—X—X'—X", X'—X—W—X—X', X'—X—W—X"—X''', or W—X—X'—X wherein W is a synthetic polymer portion and X, X', X", and X''' are poly(amino acid) chains or "amino acid blocks". In certain aspects, the synthetic polymer is used as the center block which allows the growth of multiple blocks symmetrically from the center.

As used herein, the term "synthetic polymer" refers to a polymer that is not a poly(amino acid). Such synthetic polymers are well known in the art and include polystyrene, polyalkylene oxides, such as polyethyleneoxide (also referred to as polyethylene glycol or PEG), and derivatives thereof.

As used herein, the term "poly(amino acid)" or "amino acid block" refers to a covalently linked amino acid chain wherein each monomer is an amino acid unit. Such amino acid units include natural and unnatural amino acids. In certain embodiments, each amino acid unit is in the L-configuration. Such poly(amino acids) include those having suitably protected functional groups. For example, amino acid monomers may have hydroxyl or amino moieties which are optionally protected by a suitable hydroxyl protecting group or a suitable amine protecting group, as appropriate. Such suitable hydroxyl protecting groups and suitable amine protecting groups are described in more detail herein, infra. As used herein, an amino acid block comprises one or more monomers or a set of two or more monomers. In certain embodiments, an amino acid block comprises one or more monomers such that the overall block is hydrophilic. In other embodiments, an amino acid block comprises one or more monomers such that the overall block is hydrophobic. In still other embodiments, amino acid blocks of the present invention include random amino acid blocks, ie blocks comprising a mixture of amino acid residues.

As used herein, the phrase "natural amino acid side-chain group" refers to the side-chain group of any of the 20 amino acids naturally occuring in proteins. Such natural amino acids include the nonpolar, or hydrophobic amino acids, glycine, alanine, valine, leucine isoleucine, methionine, phenylalanine, tryptophan, and proline. Cysteine is sometimes classified as nonpolar or hydrophobic and other times as polar. Natural amino acids also include polar, or hydrophilic amino acids, such as tyrosine, serine, threonine, aspartic acid (also known as aspartate, when charged), glutamic acid (also known as glutamate, when charged), asparagine, and glutamine. Certain polar, or hydrophilic, amino acids have charged side-chains. Such charged amino acids include lysine, arginine, and histidine. One of ordinary skill in the art would recognize that protection of a polar or hydrophilic amino acid side-chain can render that amino acid nonpolar. For example, a suitably protected tyrosine hydroxyl group can render that tyroine nonpolar and hydrophobic by virtue of protecting the hydroxyl group.

As used herein, the phrase "unnatural amino acid side-chain group" refers to amino acids not included in the list of 20 amino acids naturally occuring in proteins, as described above. Such amino acids include the D-isomer of any of the 20 naturally occuring amino acids. Unnatural amino acids also include homoserine, ornithine, and thyroxine. Other unnatural amino acids side-chains are well know to one of ordinary skill in the art and include unnatural aliphatic side chains. Other unnatural amino acids include modified amino acids, including those that are N-alkylated, cyclized, phosphorylated, acetylated, amidated, labelled, and the like.

As used herein, the phrase "living polymer chain-end" refers to the terminus resulting from a polymerization reaction which maintains the ability to react further with additional monomer or with a polymerization terminator.

As used herein, the term "termination" refers to attaching a terminal group to a polymer chain-end by the reaction of a living polymer with an appropriate compound. Alternatively, the term "termination" may refer to attaching a terminal group to an amine or hydroxyl end, or derivative thereof, of the polymer chain.

As used herein, the term "polymerization terminator" is used interchangeably with the term "polymerization terminating agent" and refers to a compound that reacts with a living polymer chain-end to afford a polymer with a terminal group. Alternatively, the term "polymerization terminator" may refer to a compound that reacts with an amine or hydroxyl end, or derivative thereof, of the polymer chain, to afford a polymer with a terminal group.

As used herein, the term "polymerization initiator" refers to a compound, which reacts with, or whose anion or free base form reacts with, the desired monomer in a manner which results in polymerization of that monomer. In certain embodiments, the polymerization initiator is the compound that reacts with an alkylene oxide to afford a polyalkylene oxide block. In other embodiments, the polymerization initiator is the amine salt described herein.

The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-20 carbon atoms. In some embodiments, aliphatic groups contain 1-10 carbon atoms. In other embodiments, aliphatic groups contain 1-8 carbon atoms. In still other embodiments, aliphatic groups contain 1-6 carbon atoms, and in yet other embodiments aliphatic groups contain 1-4 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "heteroatom" means one or more of oxygen, sulfur, nitrogen, phosphorus, or silicon. This includes any oxidized form of nitrogen, sulfur, phosphorus, or silicon; the quaternized form of any basic nitrogen, or; a substitutable nitrogen of a heterocyclic ring including =N— as in 3,4-dihydro-2H-pyrrolyl, —NH— as in pyrrolidinyl, or =N($R^+$)— as in N-substituted pyrrolidinyl.

The term "unsaturated", as used herein, means that a moiety has one or more units of unsaturation.

The term "aryl" used alone or as part of a larger moiety as in "aralkyl", "aralkoxy", or "aryloxyalkyl", refers to monocyclic, bicyclic, and tricyclic ring systems having a total of five to fourteen ring members, wherein at least one ring in the system is aromatic and wherein each ring in the system contains three to seven ring members. The term "aryl" may be used interchangeably with the term "aryl ring".

As described herein, compounds of the invention may contain "optionally substituted" moieties. In general, the term "substituted", whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen; —$(CH_2)_{0-4}R°$; —$(CH_2)_{0-4}OR°$; —O—$(CH_2)_{0-4}C(O)OR°$; —$(CH_2)_{0-4}CH(OR°)_2$; —$(CH_2)_{0-4}SR°$; —$(CH_2)_{0-4}$Ph, which may be substituted with $R°$; —$(CH_2)_{0-4}O(CH_2)_{0-1}$Ph which may be substituted with $R°$; —CH=CHPh, which may be substituted with $R°$; —$NO_2$; —CN; —$N_3$; —$(CH_2)_{0-4}N(R°)_2$; —$(CH_2)_{0-4}N(R°)C(O)R°$; —$N(R°)C(S)R°$; —$(CH_2)_{0-4}N(R°)C(O)NR°_2$; —$N(R°)C(S)NR°_2$; —$(CH_2)_{0-4}N(R°)C(O)OR°$; —$N(R°)N(R°)C(O)R°$; —$N(R°)N(R°)C(O)NR°_2$; —$N(R°)N(R°)C(O)OR°$; —$(CH_2)_{0-4}C(O)R°$; —$C(S)R°$; —$(CH_2)_{0-4}C(O)OR°$; —$(CH_2)_{0-4}C(O)SR°$; —$(CH_2)_{0-4}C(O)OSiR°_3$; —$(CH_2)_{0-4}OC(O)R°$; —OC(O)$(CH_2)_{0-4}SR$—, SC(S)$SR°$; —$(CH_2)_{0-4}SC(O)R°$; —$(CH_2)_{0-4}C(O)NR°_2$; —$C(S)NR°_2$; —$C(S)SR°$; —$SC(S)SR°$, —$(CH_2)_{0-4}OC(O)NR°_2$; —$C(O)N(OR°)R°$; —$C(O)C(O)R°$; —$C(O)CH_2C(O)R°$; —$C(NOR°)R°$; —$(CH_2)_{0-4}SSR°$; —$(CH_2)_{0-4}S(O)_2R°$; —$(CH_2)_{0-4}S(O)_2OR°$; —$(CH_2)_{0-4}OS(O)_2R°$; —$S(O)_2NR°_2$; —$(CH_2)_{0-4}S(O)R°$; —$N(R°)S(O)_2NR°_2$; —$N(R°)S(O)_2R°$; —$N(OR°)R°$; —$C(NH)NR°_2$; —$P(O)_2R°$; —$P(O)R°_2$; —$OP(O)R°_2$; —OP(O)(OR°)_2$; $SiR°_3$; —$(C_{1-4}$ straight or branched alkylene)O—$N(R°)_2$; or —$(C_{1-4}$ straight or branched alkylene)C(O)O—N(R°)_2$, wherein each $R°$ may be substituted as defined below and is independently hydrogen, $C_{1-6}$ aliphatic, —$CH_2$Ph, —$O(CH_2)_{0-1}$Ph, or a 5-6-membered saturated, partially unsaturated, or aryl ring having 0-4 heteroatoms independently selected from nitrogen, oxygen, or sulfur, or, notwithstanding the definition above, two independent occurrences of $R°$, taken together with their intervening atom(s), form a 3-12-membered saturated, partially unsaturated, or aryl mono- or bicyclic ring having 0-4 heteroatoms independently selected from nitrogen, oxygen, or sulfur, which may be substituted as defined below.

Suitable monovalent substituents on $R°$ (or the ring formed by taking two independent occurrences of $R°$ together with their intervening atoms), are independently halogen, —$(CH_2)_{0-2}R^{\bullet}$, -(haloR$^{\bullet}$), —$(CH_2)_{0-2}$OH, —$(CH_2)_{0-2}OR^{\bullet}$, —$(CH_2)_{0-2}CH(OR^{\bullet})_2$; —O(haloR$^{\bullet}$), —CN, —$N_3$, —$(CH_2)_{0-2}C(O)R^{\bullet}$, —$(CH_2)_{0-2}C(O)OH$, —$(CH_2)_{0-2}C(O)OR^{\bullet}$, —$(CH_2)_{0-2}SR^{\bullet}$, —$(CH_2)_{0-2}SH$, —$(CH_2)_{0-2}NH_2$, —$(CH_2)_{0-2}NHR^{\bullet}$, —$(CH_2)_{0-2}NR^{\bullet}_2$, —$NO_2$, —$SiR^{\bullet}_3$, —$OSiR^{\bullet}_3$, —$C(O)SR^{\bullet}$, —$(C_{1-4}$ straight or branched alkylene)C(O)OR$^{\bullet}$, or —$SSR^{\bullet}$ wherein each $R^{\bullet}$ is unsubstituted or where preceded by "halo" is substituted only with one or more halogens, and is independently selected from $C_{1-4}$ aliphatic, —$CH_2$Ph, —$O(CH_2)_{0-1}$Ph, or a 5-6-membered saturated, partially unsaturated, or aryl ring having 0-4 heteroatoms independently selected from nitrogen, oxygen, or sulfur. Suitable divalent substituents on a saturated carbon atom of $R°$ include =O and =S.

Suitable divalent substituents on a saturated carbon atom of an "optionally substituted" group include the following: =O, =S, =NNR*_2, =NNHC(O)R*, =NNHC(O)OR*, =NNHS(O)_2R*, =NR*, =NOR*, —$O(C(R*_2))_{2-3}O$—, or —$S(C(R*_2))_{2-3}S$—, wherein each independent occurrence of R* is selected from hydrogen, $C_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —$O(CR*_2)_{2-3}O$—, wherein each independent occurrence of R* is selected from hydrogen, $C_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. A suitable tetravalent substituent that is bound to vicinal substitutable methylene carbons of an "optionally substituted" group is the dicobalt hexacarbonyl cluster represented by

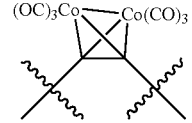

when depicted with the methylenes which bear it.

Suitable substituents on the aliphatic group of R* include halogen, —$R^{\bullet}$, -(haloR$^{\bullet}$), —OH, —$OR^{\bullet}$, —O(haloR$^{\bullet}$), —CN, —C(O)OH, —$C(O)OR^{\bullet}$, —$NH_2$, —$NHR^{\bullet}$, —$NR^{\bullet}_2$, or —$NO_2$, wherein each $R^{\bullet}$ is unsubstituted or where preceded by "halo" is substituted only with one or more halogens, and is independently $C_{1-4}$ aliphatic, —$CH_2$Ph, —$O(CH_2)_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —$R^{\dagger}$, —$NR^{\dagger}_2$, —$C(O)R^{\dagger}$, —$C(O)OR^{\dagger}$, —$C(O)C(O)R^{\dagger}$, —$C(O)CH_2C(O)R^{\dagger}$, —$S(O)_2R^{\dagger}$, —$S(O)_2NR^{\dagger}_2$, —$C(S)NR^{\dagger}_2$, —$C(NH)NR^{\dagger}_2$, or —$N(R^{\dagger})S(O)_2R^{\dagger}$; wherein each $R^{\dagger}$ is independently hydrogen, $C_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of $R^{\dagger}$, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of $R^{\dagger}$ are independently halogen, —$R^{\bullet}$, -(haloR$^{\bullet}$), —OH, —$OR^{\bullet}$, —O(haloR$^{\bullet}$), —CN, —C(O)OH, —$C(O)OR^{\bullet}$, —$NH_2$, —$NHR^{\bullet}$, —$NR^{\bullet}_2$, or —$NO_2$, wherein each $R^{\bullet}$ is unsubstituted or where preceded by "halo" is substituted only with one or more halogens, and is independently $C_{1-4}$ aliphatic, —$CH_2$Ph, —$O(CH_2)_{0-1}$Ph, or a 5-6-membered saturated, partially unsaturated, or aryl ring having 0-4 heteroatoms independently selected from nitrogen, oxygen, or sulfur.

Protected hydroxyl groups are well known in the art and include those described in detail in *Protecting Groups in Organic Synthesis*, T. W. Greene and P. G. M. Wuts, 3rd edition, John Wiley & Sons, 1999, the entirety of which is incorporated herein by reference. Examples of suitably protected hydroxyl groups further include, but are not limited to, esters, carbonates, sulfonates allyl ethers, ethers, silyl ethers, alkyl ethers, arylalkyl ethers, and alkoxyalkyl ethers. Examples of suitable esters include formates, acetates, proprionates, pentanoates, crotonates, and benzoates. Specific examples of suitable esters include formate, benzoyl formate, chloroacetate, trifluoroacetate, methoxyacetate, triphenylmethoxyacetate, p-chlorophenoxyacetate, 3-phenylpropionate, 4-oxopentanoate, 4,4-(ethylenedithio)pentanoate, pivaloate(trimethylacetate), crotonate, 4-methoxy-crotonate, benzoate, p-benylbenzoate, 2,4,6-trimethylbenzoate. Examples of suitable carbonates include 9-fluorenylmethyl, ethyl, 2,2,2-trichloroethyl, 2-(trimethylsilyl)ethyl, 2-(phenylsulfonyl)ethyl, vinyl, allyl, and p-nitrobenzyl carbonate. Examples of suitable silyl ethers include trimethylsilyl, triethylsilyl, t-butyldimethylsilyl, t-butyldiphenylsilyl, triisopropylsilyl ether, and other trialkylsilyl ethers. Examples of suitable alkyl ethers include methyl, benzyl, p-methoxybenzyl, 3,4-dimethoxybenzyl, trityl, t-butyl, and allyl ether, or derivatives thereof. Alkoxyalkyl ethers include acetals such as methoxymethyl, methylthiomethyl, (2-methoxyethoxy)methyl, benzyloxymethyl, beta-(trimethylsilyl)ethoxymethyl, and tetrahydropyran-2-yl ether. Examples of suitable arylalkyl ethers include benzyl, p-methoxybenzyl (MPM), 3,4-dimethoxybenzyl, O-nitrobenzyl, p-nitrobenzyl, p-halobenzyl, 2,6-dichlorobenzyl, p-cyanobenzyl, 2- and 4-picolyl ethers.

Protected amines are well known in the art and include those described in detail in Greene (1999). Suitable mono-protected amines further include, but are not limited to, aralkylamines, carbamates, allyl amines, amides, and the like. Examples of suitable mono-protected amino moieties include t-butyloxycarbonylamino (—NHBOC), ethyloxycarbonylamino, methyloxycarbonylamino, trichloroethyloxycarbonylamino, allyloxycarbonylamino (—NHAlloc), benzyloxocarbonylamino (—NHCBZ), allylamino, benzylamino (—NHBn), fluorenylmethylcarbonyl (—NHFmoc), formamido, acetamido, chloroacetamido, dichloroacetamido, trichloroacetamido, phenylacetamido, trifluoroacetamido, benzamido, t-butyldiphenylsilyl, and the like. Suitable di-protected amines include amines that are substituted with two substituents independently selected from those described above as mono-protected amines, and further include cyclic imides, such as phthalimide, maleimide, succinimide, and the like. Suitable di-protected amines also include pyrroles and the like, 2,2,5,5-tetramethyl-[1,2,5]azadisilolidine and the like, and azide.

Protected aldehydes are well known in the art and include those described in detail in Greene (1999). Suitable protected aldehydes further include, but are not limited to, acyclic acetals, cyclic acetals, hydrazones, imines, and the like. Examples of such groups include dimethyl acetal, diethyl acetal, diisopropyl acetal, dibenzyl acetal, bis(2-nitrobenzyl) acetal, 1,3-dioxanes, 1,3-dioxolanes, semicarbazones, and derivatives thereof.

Protected carboxylic acids are well known in the art and include those described in detail in Greene (1999). Suitable protected carboxylic acids further include, but are not limited to, optionally substituted $C_{1-6}$ aliphatic esters, optionally substituted aryl esters, silyl esters, activated esters, amides, hydrazides, and the like. Examples of such ester groups include methyl, ethyl, propyl, isopropyl, butyl, isobutyl, benzyl, and phenyl ester, wherein each group is optionally substituted. Additional suitable protected carboxylic acids include oxazolines and ortho esters.

Protected thiols are well known in the art and include those described in detail in Greene (1999). Suitable protected thiols further include, but are not limited to, disulfides, thioethers, silyl thioethers, thioesters, thiocarbonates, and thiocarbamates, and the like. Examples of such groups include, but are not limited to, alkyl thioethers, benzyl and substituted benzyl thioethers, triphenylmethyl thioethers, and trichloroethoxycarbonyl thioester, to name but a few.

A "crown ether moiety" is the radical of a crown ether. A crown ether is a monocyclic polyether comprised of repeating units of —$CH_2CH_2O$—. Examples of crown ethers include 12-crown-4, 15-crown-5, and 18-crown-6.

Unless otherwise stated, structures depicted herein are also meant to include all isomeric (e.g., enantiomeric, diastereomeric, and geometric (or conformational)) forms of the structure; for example, the R and S configurations for each asymmetric center, Z and E double bond isomers, and Z and E conformational isomers. Therefore, single stereochemical isomers as well as enantiomeric, diastereomeric, and geometric (or conformational) mixtures of the present compounds are within the scope of the invention. Unless otherwise stated, all tautomeric forms of the compounds of the invention are within the scope of the invention. Additionally, unless otherwise stated, structures depicted herein are also meant to include compounds that differ only in the presence of one or more isotopically enriched atoms. For example, compounds having the present structures except for the replacement of hydrogen by deuterium or tritium, or the replacement of a carbon by a $^{13}$C- or $^{14}$C-enriched carbon are within the scope of this invention. Such compounds are useful, for example, as analytical tools or probes in biological assays.

As used herein, the term "detectable moiety" is used interchangeably with the term "label" and relates to any moiety capable of being detected (e.g., primary labels and secondary labels). A "detectable moiety" or "label" is the radical of a detectable compound.

"Primary" labels include radioisotope-containing moieties (e.g., moieties that contain $^{32}$P, $^{33}$P, $^{35}$S, or $^{14}$C), mass-tags, and fluorescent labels, and are signal-generating reporter groups which can be detected without further modifications.

Other primary labels include those useful for positron emission tomography including molecules containing radio-isotopes (e.g. $^{18}$F) or ligands with bound radioactive metals (e.g. $^{62}$Cu). In other embodiments, primary labels are contrast agents for magnetic resonance imaging such as gadolinium, gadolinium chelates, or iron oxide (e.g $Fe_3O_4$ and $Fe_2O_3$) particles. Similarly, semiconducting nanoparticles (e.g. cadmium selenide, cadmium sulfide, cadmium telluride) are useful as fluorescent labels. Other metal nanoparticles (e.g colloidal gold) also serve as primary labels.

"Secondary" labels include moieties such as biotin, or protein antigens, that require the presence of a second compound to produce a detectable signal. For example, in the case of a biotin label, the second compound may include streptavidin-enzyme conjugates. In the case of an antigen label, the second compound may include an antibody-enzyme conjugate. Additionally, certain fluorescent groups can act as secondary labels by transferring energy to another compound or group in a process of nonradiative fluorescent resonance energy transfer (FRET), causing the second compound or group to then generate the signal that is detected.

Unless otherwise indicated, radioisotope-containing moieties are optionally substituted hydrocarbon groups that contain at least one radioisotope. Unless otherwise indicated, radioisotope-containing moieties contain from 1-40 carbon atoms and one radioisotope. In certain embodiments, radioisotope-containing moieties contain from 1-20 carbon atoms and one radioisotope.

The terms "fluorescent label", "fluorescent group", "fluorescent compound", "fluorescent dye", and "fluorophore", as used herein, refer to compounds or moieties that absorb light energy at a defined excitation wavelength and emit light energy at a different wavelength. Examples of fluorescent compounds include, but are not limited to: Alexa Fluor dyes (Alexa Fluor 350, Alexa Fluor 488, Alexa Fluor 532, Alexa Fluor 546, Alexa Fluor 568, Alexa Fluor 594, Alexa Fluor 633, Alexa Fluor 660 and Alexa Fluor 680), AMCA, AMCA-S, BODIPY dyes (BODIPY FL, BODIPY R6G, BODIPY TMR, BODIPY TR, BODIPY 530/550, BODIPY 558/568, BODIPY 564/570, BODIPY 576/589, BODIPY 581/591, BODIPY 630/650, BODIPY 650/665), Carboxyrhodamine 6G, carboxy-X-rhodamine (ROX), Cascade Blue, Cascade Yellow, Coumarin 343, Cyanine dyes (Cy3, Cy5, Cy3.5, Cy5.5), Dansyl, Dapoxyl, Dialkylaminocoumarin, 4',5'-Dichloro-2',7'-dimethoxy-fluorescein, DM-NERF, Eosin, Erythrosin, Fluorescein, FAM, Hydroxycoumarin, IRDyes (IRD40, IRD 700, IRD 800), JOE, Lissamine rhodamine B, Marina Blue, Methoxycoumarin, Naphthofluorescein, Oregon Green 488, Oregon Green 500, Oregon Green 514, Pacific Blue, PyMPO, Pyrene, Rhodamine B, Rhodamine 6G, Rhodamine Green, Rhodamine Red, Rhodol Green, 2',4', 5',7'-Tetra-bromosulfone-fluorescein, Tetramethylrhodamine (TMR), Carboxytetramethylrhodamine (TAMRA), Texas Red, Texas Red-X.

The term "mass-tag" as used herein refers to any moiety that is capable of being uniquely detected by virtue of its mass using mass spectrometry (MS) detection techniques. Examples of mass-tags include electrophore release tags such as N-[3-[4'-[(p-Methoxytetrafluorobenzyl)oxy]phenyl]-3-methylglyceronyl]isonipecotic Acid, 4'-[2,3,5,6-Tetrafluoro-4-(pentafluorophenoxyl)]methyl acetophenone, and their derivatives. The synthesis and utility of these mass-tags is described in U.S. Pat. Nos. 4,650,750, 4,709,016, 5,360,8191, 5,516,931, 5,602,273, 5,604,104, 5,610,020, and 5,650,270. Other examples of mass-tags include, but are not limited to, nucleotides, dideoxynucleotides, oligonucleotides of varying length and base composition, oligopeptides, oligosaccharides, and other synthetic polymers of varying length and monomer composition. A large variety of organic molecules, both neutral and charged (biomolecules or synthetic compounds) of an appropriate mass range (100-2000 Daltons) may also be used as mass-tags.

The term "substrate", as used herein refers to any material or macromolecular complex to which a functionalized end-group of a block copolymer can be attached. Examples of commonly used substrates include, but are not limited to, glass surfaces, silica surfaces, plastic surfaces, metal surfaces, surfaces containing a metalic or chemical coating, membranes (eg., nylon, polysulfone, silica), micro-beads (eg., latex, polystyrene, or other polymer), porous polymer matrices (eg., polyacrylamide gel, polysaccharide, polymethacrylate), macromolecular complexes (eg., protein, polysaccharide).

3. Description of Exemplary Embodiments

As described generally above, one aspect of the present invention provides a method for preparing a multi-block copolymer comprising one or more poly(amino acid) blocks and one or more synthetic polymer blocks, wherein said method comprises the steps of sequentially polymerizing one or more cyclic amino acid monomers onto a synthetic polymer having a terminal amine salt wherein said polymerization is initiated by said amine salt. In certain embodiments, said polymerization occurs by ring-opening polymerization of the cyclic amino acid monomers. In other embodiments, the cyclic amino acid monomer is an amino acid NCA, lactam, or imide.

As described generally above, the synthetic polymers used in methods of the present invention have a terminal amine salt for initiating the polymerization of a cyclic amino acid monomer. Such salts include the acid addition salts of an amino group formed with an inorganic acid such as hydrochloric acid, hydrobromic acid, phosphoric acid, sulfuric acid or perchloric acid. It is also contemplated that such amine salts include the acid addition salts of an amino group formed with an organic acid such as acetic acid, oxalic acid, maleic acid, tartaric acid, citric acid, succinic acid, malonic acid, and the like, or by using other methods used in the art such as ion exchange.

As described generally above, the synthetic polymers used in methods of the present invention have a terminal amine salt. In certain embodiments, the synthetic polymer is poly (ethylene glycol) (PEG) having a terminal amine salt ("PEG macroinitiator") which initiates the polymerization of NCAs to provide PEG-poly(amino acid) multi-block copolymers. Such synthetic polymers having a terminal amine salt may be prepared from synthetic polymers having a terminal amine. Such synthetic polymers having a terminal amine group are known in the art and include PEG-amines. PEG-amines may be obtained by the deprotection of a suitably protected PEG-amine. Preparation of such suitably protected PEG-amines, and methods of deprotecting the same, is described in detail in U.S. patent application Ser. No. 11/256,735, filed Oct. 24, 2005 the entirety of which is hereby incorporated herein by reference.

As described in U.S. Ser. No. 11/256,735, suitably protected PEG-amines may be formed by terminating the living polymer chain end of a PEG with a terminating agent that contains a suitably protected amine. The suitably protected amine may then be deprotected to generate a PEG that is terminated with a free amine that may subsequently be converted into the corresponding PEG-amine salt macroinitiator. In certain embodiments, the PEG-amine salt macroinitiator of the present invention is prepared directly from a suitably protected PEG-amine by deprotecting said protected amine with an acid. Accordingly, in other embodiments, the terminating agent has suitably protected amino group wherein the protecting group is acid-labile.

Alternatively, suitable synthetic polymers having a terminal amine salt may be prepared from synthetic polymers that contain terminal functional groups that may be converted to amine salts by known synthetic routes. In certain embodiments, the conversion of the terminal functional groups to the amine salts is conducted in a single synthetic step. In other embodiments, the conversion of the terminal functional groups to the amine salts is achieved by way of a multi-step sequence. Functional group transformations that afford amines, amine salts, or protected amines are well known in the art and include those described in Larock, R. C., "Comprehensive Organic Transformations," John Wiley & Sons, New York, 1999.

Alternatively, and as described in detail in U.S. Ser. No. 11/256,735, suitably protected PEG-amines may be formed by initiating the polymerization of ethylene oxide with a compound that contains a suitably protected amino moiety. The PEG formed therefrom may be terminated by any manner known in the art, including those described in U.S. Ser. No. 11/256,735. The method of termination may incorporate a additional suitably protected amine functional group, or a precursor thereto, such that each terminus of the PEG formed therefrom may be subsequently converted to an amine salt that may be employed in the polymerization of the cyclic monomers described herein. In certain embodiments, only one terminus of such a PEG is converted to an amine salt that is then employed in the formation of one or more poly(amino acid) blocks. Following such polymerizations, the amine salt terminus may be converted to an unreactive form, and then the other terminus may be converted to an amine salt for use in the introduction of additional poly(amino acid) blocks.

In another embodiment, both termini of a PEG are converted to amine salts that are then employed in bidirectional polymerization to introduce poly(amino acid) blocks concomitantly at each end. Such bidirectional polymerization is depicted in Scheme 2, below.

One of ordinary skill in the art would recognize that the embodiments described above and herein that employ PEG as the synthetic polymer block can be readily applied to other synthetic polymers. Therefore, this invention contemplates multiblock copolymers of the permutations described herein that employ synthetic polymers other than PEG. In certain embodiments, the synthetic polymer block is polypropylene oxide (PPO), PEG-PPO-PEG block copolymers (Pluronics®), polyesters, polyamides, poly(ethylene imine), polyphosphazines, polyacrylates, or polymethacrylates.

In certain embodiments, the synthetic polymer is poly(ethylene glycol) (PEG) having one or two terminal amine salt (s) ("PEG macroinitiator") to initiate the polymerization of NCAs to provide a PEG-poly(amino acid) multi-block copolymer as illustrated in Schemes 1 and 2, below.

Scheme 1

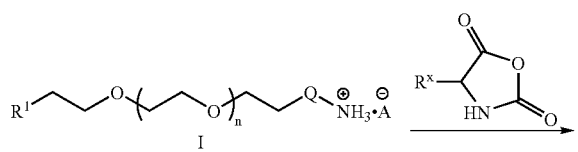

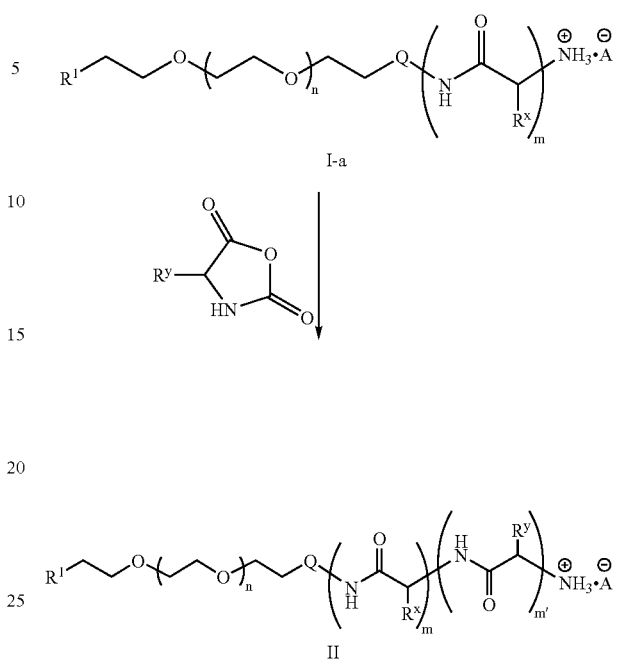

Scheme 1 above depicts a polymerization method of the present invention. A macroinitiator of formula I is treated with a first amino acid NCA to form a compound of formula I-a having a first amino acid block. The second amino acid NCA is added to the living polymer of formula I-a to form a compound of formula II having two differing amino acid blocks. Each of the $R^1$, A, n, Q, $R^x$, $R^y$, m, and m' groups depicted in Scheme 1 are as defined and described in classes and subclasses, singly and in combination, herein.

Scheme 2

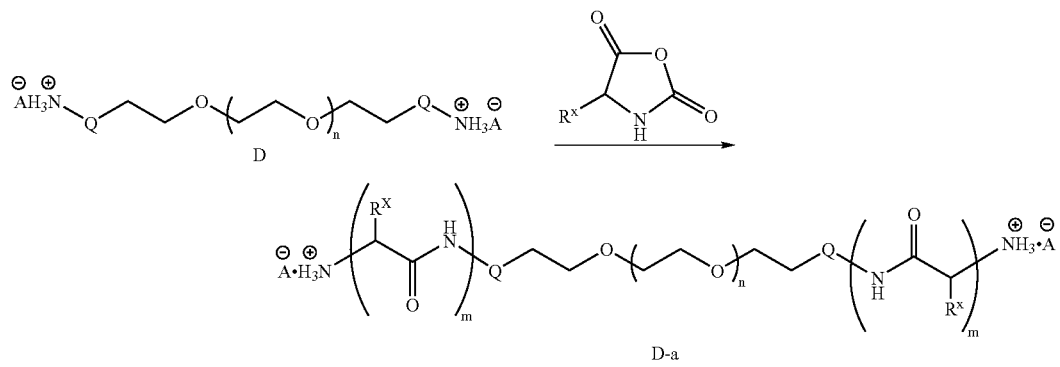

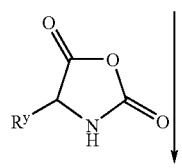

-continued

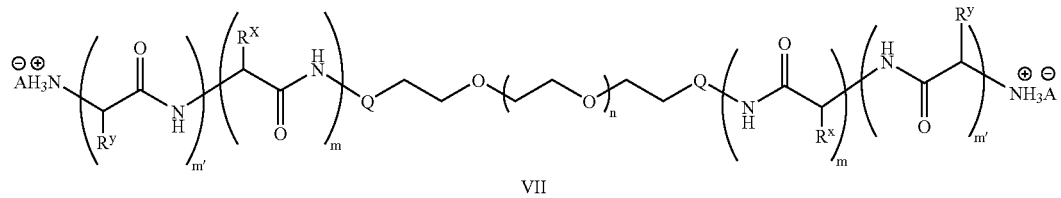

VII

Scheme 2 above depicts the synthesis of a PAA-b-PAA-b-PEG-b-PAA-b-PAA pentablock copolymer according to the present invention, wherein each of $R_x$, $R_y$, m, m', n, A, and Q are as defined herein and in classes and subclasses, singly and in combination.

Another aspect of the present invention provides a method of for preparing a multi-block copolymer comprising two or more different poly(amino acid) blocks and a PEG synthetic polymer block, wherein said method comprises the steps of:
(a) providing a compound of formula I:

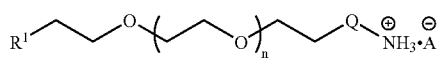

wherein:
  n is 10-2500;
  $R^1$ is -Z(CH$_2$CH$_2$Y)$_p$(CH$_2$)$_t$R$^3$, wherein:
    Z is —O—, —S—, —C≡C—, or —CH$_2$—;
    each Y is independently —O— or —S—;
    p is 0-10;
    t is 0-10; and
    $R^3$ is —N$_3$, —CN, a mono-protected amine, a di-protected amine, a protected aldehyde, a protected hydroxyl, a protected carboxylic acid, a protected thiol, a 9-30-membered crown ether, or an optionally substituted group selected from aliphatic, a 5-8 membered saturated, partially unsaturated, or aryl ring having 0-4 heteroatoms independently selected from nitrogen, oxygen, or sulfur, an 8-10 membered saturated, partially unsaturated, or aryl bicyclic ring having 0-5 heteroatoms independently selected from nitrogen, oxygen, or sulfur, or a detectable moiety;
  Q is a valence bond or a bivalent, saturated or unsaturated, straight or branched C$_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—, wherein:
    -Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur; and
  A is a suitable acid anion,
(b) polymerizing a first cyclic amino acid monomer onto the amine salt terminal end of formula I;
(c) optionally polymerizing a second cyclic amino acid monomer onto the living polymer end, wherein said second cyclic amino acid monomer is different from said first cyclic amino acid monomer; and
(d) optionally polymerizing additional cyclic amino acid monomers onto the living polymer end.

In certain embodiments, the cyclic amino acid monomers include N-carboxy anhydrides (NCAs), lactams, and cyclic imides. According to one embodiment, the cyclic amino acid monomer is an NCA. NCAs are well known in the art and are typically prepared by the carbonylation of amino acids by a modification of the Fuchs-Farthing method (Kricheldorf, α-Aminoacid-N-Carboxy-Anhydrides and Related Heterocycles: Syntheses, Properties, Peptide Synthesis, Polymerization, 1987). Although reaction conditions vary among different amino acids, most, if not all, natural and unnatural, 2-substituted amino acids can be converted to N-carboxy anhydrides using phosgene gas or triphosgene (for ease of handling). It will be appreciated that, although α-amino acids are described below, one of ordinary skill in the art would recognize that NCAs may be prepared from β- and γ-amino acids as well. In addition, NCAs can be prepared from dimers or trimers of amino acids. Using an amino acid having an $R^x$ side-chain, as defined herein, as an example, Scheme 3 below depicts the typical formation of an NCA using phosgene.

Scheme 3

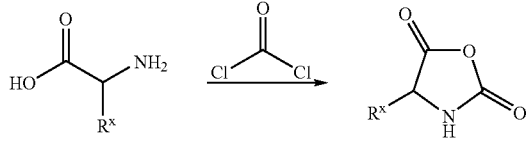

NCAs exhibit reactivity that is well-suited for ring-opening polymerization (ROP). Primary, secondary, and tertiary amines as well as alcohols, water, and acid are known to initiate the ring opening of the NCA. Thus, solvents and all starting materials, including initiators and the NCA monomers, are substantially free from impurities and moisture.

Because a wide variety of functionalities can initiate the polymerizations of NCAs, amino acids containing alcohol, amine, and carboxylic acid functionality are typically protected before polymerization. Such protected hydroxyl groups, protected amine groups, and protected carboxylic acids are well known in the art and include those described above and in Greene (1999).

Examples of suitable hydroxyl protecting groups include, but are not limited to, esters, allyl ethers, ethers, silyl ethers, alkyl ethers, arylalkyl ethers, and alkoxyalkyl ethers. Examples of such esters include formates, acetates, carbonates, and sulfonates. Specific examples include formate, benzoyl formate, chloroacetate, trifluoroacetate, methoxyacetate, triphenylmethoxyacetate, p-chlorophenoxyacetate, 3-phenylpropionate, 4-oxopentanoate, 4,4-(ethylenedithio)

pentanoate, pivaloate(trimethylacetyl), crotonate, 4-methoxy-crotonate, benzoate, p-benylbenzoate, 2,4,6-trimethylbenzoate, carbonates such as methyl, 9-fluorenylmethyl, ethyl, 2,2,2-trichloroethyl, 2-(trimethylsilyl)ethyl, 2-(phenylsulfonyl)ethyl, vinyl, allyl, and p-nitrobenzyl. Examples of such silyl ethers include trimethylsilyl, triethylsilyl, t-butyldimethylsilyl, t-butyldiphenylsilyl, triisopropylsilyl, and other trialkylsilyl ethers. Alkyl ethers include methyl, benzyl, p-methoxybenzyl, 3,4-dimethoxybenzyl, trityl, t-butyl, allyl, and allyloxycarbonyl ethers or derivatives. Alkoxyalkyl ethers include acetals such as methoxymethyl, methylthiomethyl, (2-methoxyethoxy)methyl, benzyloxymethyl, beta-(trimethylsilyl)ethoxymethyl, and tetrahydropyranyl ethers. Examples of arylalkyl ethers include benzyl, p-methoxybenzyl (MPM), 3,4-dimethoxybenzyl, O-nitrobenzyl, p-nitrobenzyl, p-halobenzyl, 2,6-dichlorobenzyl, p-cyanobenzyl, 2- and 4-picolyl.

Suitable amino protecting groups include, but are not limited to, aralkylamines, carbamates, cyclic imides, allyl amines, amides, and the like. Examples of such groups include t-butyloxycarbonyl (BOC), ethyloxycarbonyl, methyloxycarbonyl, trichloroethyloxycarbonyl, allyloxycarbonyl (Alloc), benzyloxocarbonyl (CBZ), allyl, phthalimide, benzyl (Bn), fluorenylmethylcarbonyl (Fmoc), formyl, acetyl, chloroacetyl, dichloroacetyl, trichloroacetyl, phenylacetyl, trifluoroacetyl, benzoyl, and the like. In certain embodiments, the amino protecting group is phthalimido. In other embodiments, the amino protecting group is mono- or di-benzyl or mono- or di-allyl. In still other embodiments, the amino protecting group is a tert-butyloxycarbonyl (BOC) group.

Suitable carboxylate protecting groups include, but are not limited to, substituted $C_{1-6}$ aliphatic esters, optionally substituted aryl esters, silyl esters, activated esters, amides, hydrazides, and the like. Examples of such ester groups include methyl, ethyl, propyl, isopropyl, butyl, isobutyl, tert-butyl, benzyl, and phenyl wherein each group is optionally substituted.

Both D and L NCA enantiomers can be synthesized and any combination of the two stereoisomers can undergo ring-opening polymerization. Advanced Chemtech (http://www.advancedchemtech.com) and Bachem (www.bachem.com) are commercial and widely-referenced sources for both protected and unprotected amino acids. It will be appreciated that amino acid dimers and trimers can form cyclic anhydrides and are capable of ROP in accordance with the present invention.

In certain embodiments, the cyclic amino acid monomer is a carboxylate-protected aspartic acid NCA, a hydroxyl-protected tyrosine NCA, or an amino-protected lysine NCA. In other embodiments, the cyclic amino acid monomer is a t-butyl protected aspartic acid NCA, a benzyl-protected tyrosine NCA, or a BOC-protected lysine NCA.

In certain embodiments, the $R^3$ moiety of the $R^1$ group of formula I is $-N_3$.

In other embodiments, the $R^3$ moiety of the $R^1$ group of formula I is $-CN$.

In still other embodiments, the $R^3$ moiety of the $R^1$ group of formula I is a mono-protected amine or a di-protected amine.

In certain embodiments, the $R^3$ moiety of the $R^1$ group of formula I is an optionally substituted aliphatic group. Examples include t-butyl, 5-norbornene-2-yl, octane-5-yl, acetylenyl, trimethylsilylacetylenyl, triisopropylsilylacetylenyl, and t-butyldimethylsilylacetylenyl. In some embodiments, said $R^3$ moiety is an optionally substituted alkyl group. In other embodiments, said $R^3$ moiety is an optionally substituted alkynyl or alkenyl group. When said $R^3$ moiety is a substituted aliphatic group, suitable substituents on $R^3$ include CN, $N_3$, trimethylsilyl, triisopropylsilyl, t-butyldimethylsilyl, N-methyl propiolamido, N-methyl-4-acetylenylanilino, N-methyl-4-acetylenylbenzoamido, bis-(4-ethynylbenzyl)-amino, dipropargylamino, di-hex-5-ynyl-amino, di-pent-4-ynyl-amino, di-but-3-ynyl-amino, propargyloxy, hex-5-ynyloxy, pent-4-ynyloxy, di-but-3-ynyloxy, N-methyl-propargylamino, N-methyl-hex-5-ynyl-amino, N-methyl-pent-4-ynyl-amino, N-methyl-but-3-ynyl-amino, 2-hex-5-ynyldisulfanyl, 2-pent-4-ynyldisulfanyl, 2-but-3-ynyldisulfanyl, and 2-propargyldisulfanyl. In certain embodiments, the $R^1$ group is 2-(N-methyl-N-(ethynylcarbonyl)amino)ethoxy, 4-ethynylbenzyloxy, or 2-(4-ethynylphenoxy)ethoxy.

In certain embodiments, the $R^3$ moiety of the $R^1$ group of formula I is an optionally substituted aryl group. Examples include optionally substituted phenyl and optionally substituted pyridyl. When said $R^3$ moiety is a substituted aryl group, suitable substituents on $R^3$ include CN, $N_3$, $NO_2$, $-CH_3$, $-CH_2N_3$, $-CH=CH_2$, $-C\equiv CH$, Br, I, F, bis-(4-ethynylbenzyl)-amino, dipropargylamino, di-hex-5-ynyl-amino, di-pent-4-ynyl-amino, di-but-3-ynyl-amino, propargyloxy, hex-5-ynyloxy, pent-4-ynyloxy, di-but-3-ynyloxy, 2-hex-5-ynyloxy-ethyldisulfanyl, 2-pent-4-ynyloxy-ethyldisulfanyl, 2-but-3-ynyloxy-ethyldisulfanyl, 2-propargyloxy-ethyldisulfanyl, bis-benzyloxy-methyl, [1,3]dioxolan-2-yl, and [1,3]dioxan-2-yl.

In other embodiments, the $R^3$ moiety is an aryl group substituted with a suitably protected amino group. According to another aspect, the $R^3$ moiety is phenyl substituted with a suitably protected amino group.

In other embodiments, the $R^3$ moiety of the $R^1$ group of formula I is a protected hydroxyl group. In certain embodiments the protected hydroxyl of the $R^3$ moiety is an ester, carbonate, sulfonate, allyl ether, ether, silyl ether, alkyl ether, arylalkyl ether, or alkoxyalkyl ether. In certain embodiments, the ester is a formate, acetate, proprionate, pentanoate, crotonate, or benzoate. Exemplary esters include formate, benzoyl formate, chloroacetate, trifluoroacetate, methoxyacetate, triphenylmethoxyacetate, p-chlorophenoxyacetate, 3-phenylpropionate, 4-oxopentanoate, 4,4-(ethylenedithio)pentanoate, pivaloate(trimethylacetate), crotonate, 4-methoxy-crotonate, benzoate, p-benylbenzoate, 2,4,6-trimethylbenzoate. Exemplary carbonates include 9-fluorenylmethyl, ethyl, 2,2,2-trichloroethyl, 2-(trimethylsilyl)ethyl, 2-(phenylsulfonyl)ethyl, vinyl, allyl, and p-nitrobenzyl carbonate. Examples of suitable silyl ethers include trimethylsilyl, triethylsilyl, t-butyldimethylsilyl, t-butyldiphenylsilyl, triisopropylsilyl ether, and other trialkylsilyl ethers. Exemplary alkyl ethers include methyl, benzyl, p-methoxybenzyl, 3,4-dimethoxybenzyl, trityl, t-butyl, and allyl ether, or derivatives thereof. Exemplary alkoxyalkyl ethers include acetals such as methoxymethyl, methylthiomethyl, (2-methoxyethoxy)methyl, benzyloxymethyl, beta-(trimethylsilyl)ethoxymethyl, and tetrahydropyran-2-yl ether. Exemplary arylalkyl ethers include benzyl, p-methoxybenzyl (MPM), 3,4-dimethoxybenzyl, O-nitrobenzyl, p-nitrobenzyl, p-halobenzyl, 2,6-dichlorobenzyl, p-cyanobenzyl, 2- and 4-picolyl ethers.

In certain embodiments, the $R^3$ moiety of the $R^1$ group of formula I is a mono-protected or di-protected amino group. In certain embodiments $R^3$ is a mono-protected amine. In certain embodiments $R^3$ is a mono-protected amine selected from aralkylamines, carbamates, allyl amines, or amides. Exemplary mono-protected amino moieties include t-butyloxycarbonylamino, ethyloxycarbonylamino, methyloxycarbonylamino, trichloroethyloxycarbonylamino, allyloxycarbonylamino, benzyloxocarbonylamino, allylamino, benzylamino, fluorenylmethylcarbonyl, formamido, acetamido, chloroacetamido, dichloroacetamido, trichloroacetamido, phenylacetamido, trifluoroacetamido, benzamido, and t-butyldiphenylsilylamino. In other embodiments $R^3$ is a di-protected amine. Exemplary di-protected amines include dibenzylamine, di-allylamine, phthalimide, maleimide, succinimide, pyrrole, 2,2,5,5-tetramethyl-[1,2,5]azadisilolidine, and azide. In certain embodiments, the $R^3$ moiety is phthalimido. In other embodiments, the $R^3$ moiety is mono- or di-benzylamino or mono- or di-allylamino. In certain embodiments, the $R^1$ group is 2-dibenzylaminoethoxy.

In other embodiments, the $R^3$ moiety of the $R^1$ group of formula I is a protected aldehyde group. In certain embodiments the protected aldehydo moiety of $R^3$ is an acyclic acetal, a cyclic acetal, a hydrazone, or an imine. Exemplary $R^3$ groups include dimethyl acetal, diethyl acetal, diisopropyl acetal, dibenzyl acetal, bis(2-nitrobenzyl)acetal, 1,3-dioxane, 1,3-dioxolane, and semicarbazone. In certain embodiments, $R^3$ is an acyclic acetal or a cyclic acetal. In other embodiments, $R^3$ is a dibenzyl acetal.

In yet other embodiments, the $R^3$ moiety of the $R^1$ group of formula I is a protected carboxylic acid group. In certain embodiments, the protected carboxylic acid moiety of $R^3$ is an optionally substituted ester selected from $C_{1-6}$ aliphatic or aryl, or a silyl ester, an activated ester, an amide, or a hydrazide. Examples of such ester groups include methyl, ethyl, propyl, isopropyl, butyl, isobutyl, benzyl, and phenyl ester. In other embodiments, the protected carboxylic acid moiety of $R^3$ is an oxazoline or an ortho ester. Examples of such protected carboxylic acid moieties include oxazolin-2-yl and 2-methoxy-[1,3]dioxin-2-yl. In certain embodiments, the $R^1$ group is oxazolin-2-ylmethoxy or 2-oxazolin-2-yl-1-propoxy.

According to another embodiments, the $R^3$ moiety of the $R^1$ group of formula I is a protected thiol group. In certain embodiments, the protected thiol of $R^3$ is a disulfide, thioether, silyl thioether, thioester, thiocarbonate, or a thiocarbamate. Examples of such protected thiols include triisopropylsilyl thioether, t-butyldimethylsilyl thioether, t-butyl thioether, benzyl thioether, p-methylbenzyl thioether, triphenylmethyl thioether, and p-methoxyphenyldiphenylmethyl thioether. In other embodiments, $R^3$ is an optionally substituted thioether selected from alkyl, benzyl, or triphenylmethyl, or trichloroethoxycarbonyl thioester. In certain embodiments, $R^3$ is —S—S-pyridin-2-yl, —S—SBn, —S—SCH$_3$, or —S—S(p-ethynylbenzyl). In other embodiments, $R^3$ is —S—S-pyridin-2-yl. In still other embodiments, the $R^1$ group is 2-triphenylmethylsulfanyl-ethoxy.

In certain embodiments, the $R^3$ moiety of the $R^1$ group of formula I is a crown ether. Examples of such crown ethers include 12-crown-4, 15-crown-5, and 18-crown-6.

In still other embodiments, the $R^3$ moiety of the $R^1$ group of formula I is a detectable moiety. According to one aspect of the invention, the R moiety of the $R^1$ group of formula I is a fluorescent moiety. Such fluorescent moieties are well known in the art and include coumarins, quinolones, benzoisoquinolones, hostasol, and Rhodamine dyes, to name but a few. Exemplary fluorescent moieties of the $R^3$ group of $R^1$ include anthracen-9-yl, pyren-4-yl, 9-H-carbazol-9-yl, the carboxylate of rhodamine B, and the carboxylate of coumarin 343.

In certain embodiments, the $R^3$ moiety of the $R^1$ group of formula I is a group suitable for Click chemistry. Click reactions tend to involve high-energy ("spring-loaded") reagents with well-defined reaction coordinates, giving rise to selective bond-forming events of wide scope. Examples include the nucleophilic trapping of strained-ring electrophiles (epoxide, aziridines, aziridinium ions, episulfonium ions), certain forms of carbonyl reactivity (aldehydes and hydrazines or hydroxylamines, for example), and several types of cycloaddition reactions. The azide-alkyne 1,3-dipolar cycloaddition is one such reaction. Click chemistry is known in the art and one of ordinary skill in the art would recognize that certain $R^3$ moieties of the present invention are suitable for Click chemistry.

Compounds of formula I having $R^3$ moieties suitable for Click chemistry are useful for conjugating said compounds to biological systems or macromolecules such as proteins, viruses, and cells, to name but a few. The Click reaction is known to proceed quickly and selectively under physiological conditions. In contrast, most conjugation reactions are carried out using the primary amine functionality on proteins (e.g. lysine or protein end-group). Because most proteins contain a multitude of lysines and arginines, such conjugation occurs uncontrollably at multiple sites on the protein. This is particularly problematic when lysines or arginines are located around the active site of an enzyme or other biomolecule. Thus, another embodiment of the present invention provides a method of conjugating the $R^1$ group of a compound of formula I to a macromolecule via Click chemistry. Yet another embodiment of the present invention provides a macromolecule conjugated to a compound of formula I via the $R^1$ group.

As defined generally above, Q is a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—, wherein -Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur. In certain embodiments, Q is a valence bond. In other embodiments, Q is a bivalent, saturated $C_{1-12}$ alkylene chain, wherein 0-6 methylene units of Q are independently replaced by -Cy-, —O—, —NH—, —S—, —OC(O)—, —C(O)O—, or —C(O)—, wherein -Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur.

In certain embodiments, Q is -Cy- (i.e. a C, alkylene chain wherein the methylene unit is replaced by -Cy-), wherein -Cy- is an optionally substituted 5-8 membered bivalent, saturated, partially unsaturated, or aryl ring having 0-4 heteroatoms independently selected from nitrogen, oxygen, or sulfur. According to one aspect of the present invention, -Cy- is an optionally substituted bivalent aryl group. According to another aspect of the present invention, -Cy- is an optionally substituted bivalent phenyl group. In other embodiments, -Cy- is an optionally substituted 5-8 membered bivalent, saturated carbocyclic ring. In still other embodiments, -Cy- is an optionally substituted 5-8 membered bivalent, saturated heterocyclic ring having 1-2 heteroatoms independently selected from nitrogen, oxygen, or sulfur. Exemplary -Cy- groups include bivalent rings selected from phenyl, pyridyl, pyrimidinyl, cyclohexyl, cyclopentyl, or cyclopropyl.

Multi-block copolymers of the present invention may be of the form X—W—X', W—X—X', W—X—X'—X", X'—X—W—X—X', X'—X—W—X"—X'", or W—X—

X'—X. For example, when W is a PEG having two terminal amine salts, a first cyclic amino acid monomer X may be polymerized onto the amine salt terminal ends of W. A second cyclic amino acid monomer X' may then be polymerized onto the resulting amine salts thus forming a multi-block copolymer of the form X'—X—W—X—X', as illustrated in Scheme 2, wherein W is a synthetic polymer portion and X, X', and X" are differing poly(amino acid) chains. In an alternate example, when W is a PEG having one terminal amine salt and one protected-amine terminus, a first cyclic amino acid monomer X may be polymerized onto the amine salt terminal end of W, following which the protected amine, at the other terminus, may be deprotected and the corresponding amine salt formed. A second cyclic amino acid monomer X' may then be polymerized onto the resulting amine salt thus forming a multi-block copolymer of the form X—W—X'.

After incorporating the poly (amino acid) block portions into the multi-block copolymer of the present invention resulting in a multi-block copolymer of the form W—X—X', the other end-group functionality, corresponding to the $R^1$ moiety of formula I, can be used to attach targeting groups for cell specific delivery including, but not limited to, detectable moieties, such as fluorescent dyes, covalent attachment to surfaces, and incorporation into hydrogels. Alternatively, the $R^1$ moiety of formula I is bonded to a biomolecule, drug, cell, or other suitable substrate.

According to another embodiment, the cyclic amino acid monomer is a lactam. Lactams are another class of monomers that can be polymerized by cationic ROP. (Odian, *Principles of Polymerization*, Ch. 7) Such lactams suitable for the present invention include the four, five (pyrrolidone), six (piperidone) and seven (caprolactam) membered rings depicted below:

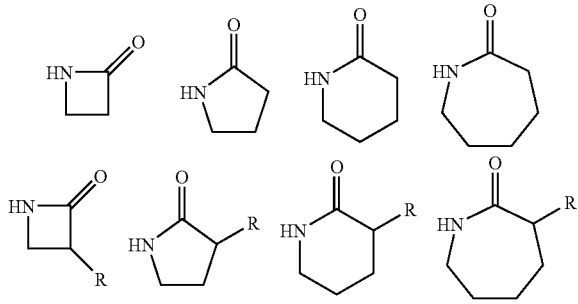

wherein each R is independently halogen; $N_3$, CN, R°; OR°; SR°; phenyl (Ph) optionally substituted with R°; —O(Ph) optionally substituted with R°; $(CH_2)_{1-2}$(Ph), optionally substituted with R°; CH═CH(Ph), optionally substituted with R°; $NO_2$; CN; N(R°)$_2$; NR°C(O)R°; NR°C(O)N(R°)$_2$; NR°CO$_2$R°; NR°NR°C(O)R°; NR°NR°C(O)N(R°)$_2$; NR°NR°CO$_2$R°; C(O)C(O)R°; C(O)CH$_2$C(O)R°; CO$_2$R°; C(O)R°; C(O)N(R°)$_2$; OC(O)N(R°)$_2$; S(O)$_2$R°; SO$_2$N(R°)$_2$; S(O)R°; NR°SO$_2$N(R°)$_2$; NR°SO$_2$R°; C(═S)N(R°)$_2$; C(═NH)—N(R°)$_2$; or $(CH_2)_{0-2}$NHC(O)R° wherein each R° may be substituted as defined below and is independently hydrogen, $C_{1-6}$ aliphatic, —$(CH_2)_{0-1}$Ph, —$O(CH_2)_{0-1}$Ph, or a 5-6-membered saturated, partially unsaturated, or aryl ring having 0-4 heteroatoms independently selected from nitrogen, oxygen, or sulfur, or, notwithstanding the definition above, two independent occurrences of R°, on the same substituent or different substituents, taken together with the atom(s) to which each R° group is bound, form a 3-8-membered cycloalkyl, heterocyclyl, aryl, or heteroaryl ring having 0-4 heteroatoms independently selected from nitrogen, oxygen, or sulfur. Suitable monovalent substituents on R°, are independently halogen, —$(CH_2)_{0-2}$R•, -(haloR•), —$(CH_2)_{0-2}$OH, —$(CH_2)_{0-2}$OR•, —$(CH_2)_{0-2}$CH(OR•)$_2$; —O(haloR•), —CN, —$N_3$, —$(CH_2)_{0-2}$C(O)R•, —$(CH_2)_{0-2}$C(O)OH, —$(CH_2)_{0-2}$C(O)OR•, —$(CH_2)_{0-2}$SR•, —$(CH_2)_{0-2}$SH, —$(CH_2)_{0-2}$NH$_2$, —$(CH_2)_{0-2}$NHR•, —$(CH_2)_{0-2}$NR•$_2$, —$NO_2$, —SiR•$_3$, —OSiR•$_3$, —C(O)SR•, —$(C_{1-4}$ straight or branched alkylene)C(O)OR•, or —SSR• wherein each R• is unsubstituted or where preceded by "halo" is substituted only with one or more halogens, and is independently selected from $C_{1-4}$ aliphatic, —$CH_2$Ph, —$O(CH_2)_{0-1}$Ph, or a 5-6-membered saturated, partially unsaturated, or aryl ring having 0-4 heteroatoms independently selected from nitrogen, oxygen, or sulfur. Suitable divalent substituents on a saturated carbon atom of R° include ═O and ═S.

Substitution α to the amide carbonyl allows for incorporation of almost unlimited types of chemical functionality into the polymer backbone. As is the case with NCA polymerization, potential nucleophiles incorporated into the monomer may be protected prior to prevent any undesired branching reactions.

Another aspect of the present invention provides a method for preparing a multi-block copolymer of formula II:

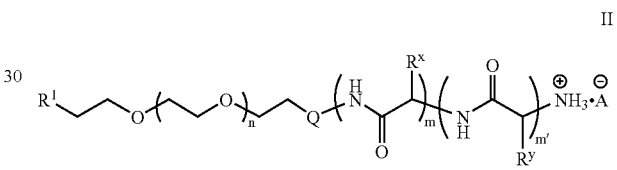

wherein:
n is 10-2500;
m is 1 to 1000;
m' is 0 to 1000;
$R^x$ and $R^y$ are each independently a natural or unnatural amino acid side-chain group, wherein $R^x$ and $R^y$ are different from each other;
$R^1$ is -Z(CH$_2$CH$_2$Y)$_p$(CH$_2$)$_t$R$^3$, wherein:
Z is —O—, —S—, —C≡C—, or —CH$_2$—;
each Y is independently —O— or —S—;
p is 0-10;
t is 0-10; and
$R^3$ is —$N_3$, —CN, a mono-protected amine, a di-protected amine, a protected aldehyde, a protected hydroxyl, a protected carboxylic acid, a protected thiol, a 9-30-membered crown ether, or an optionally substituted group selected from aliphatic, a 5-8 membered saturated, partially unsaturated, or aryl ring having 0-4 heteroatoms independently selected from nitrogen, oxygen, or sulfur, an 8-10 membered saturated, partially unsaturated, or aryl bicyclic ring having 0-5 heteroatoms independently selected from nitrogen, oxygen, or sulfur, or a detectable moiety;
Q is a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—, wherein:
-Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur; and A is a suitable acid anion, wherein said method comprises the steps of:
(a) providing a compound of formula I:

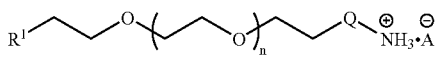

I wherein:
n is 10-2500;
$R^1$ is $-Z(CH_2CH_2Y)_p(CH_2)_tR^3$, wherein:
  Z is $-O-$, $-S-$, $-C\equiv C-$, or $-CH_2-$;
  each Y is independently $-O-$ or $-S-$;
  p is 0-10;
  t is 0-10; and
  $R^3$ is $-N_3$, $-CN$, a mono-protected amine, a di-protected amine, a protected aldehyde, a protected hydroxyl, a protected carboxylic acid, a protected thiol, a 9-30-membered crown ether, or an optionally substituted group selected from aliphatic, a 5-8 membered saturated, partially unsaturated, or aryl ring having 0-4 heteroatoms independently selected from nitrogen, oxygen, or sulfur, an 8-10 membered saturated, partially unsaturated, or aryl bicyclic ring having 0-5 heteroatoms independently selected from nitrogen, oxygen, or sulfur, or a detectable moiety;
Q is a valence bond or a bivalent, saturated or unsaturated, straight or branched $C_{1-12}$ alkylene chain, wherein 0-6 methylene units of Q are independently replaced by -Cy-, $-O-$, $-NH-$, $-S-$, $-OC(O)-$, $-C(O)O-$, $-C(O)-$, $-SO-$, $-SO_2-$, $-NHSO_2-$, $-SO_2NH-$, $-NHC(O)-$, $-C(O)NH-$, $-OC(O)NH-$, or $-NHC(O)O-$, wherein:
  -Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur; and
A is a suitable acid anion,
(b) polymerizing a first cyclic amino acid monomer onto the amine salt terminal end of formula I, wherein said first cyclic amino acid monomer comprises $R^x$; and
(c) optionally polymerizing a second cyclic amino acid monomer, comprising $R^y$, onto the living polymer end, wherein said second cyclic amino acid monomer is different from said first cyclic amino acid monomer.

Each of the classes and subclasses as described for the $R^1$ (including $R^3$ and other variables contained therein) and Q groups of formula I also apply singly and in combination to the $R^1$ and Q groups of formula II.

In certain embodiments, m' is 0. In other embodiments, m' is 1-1000. According to other embodiments, m and m' are independently 10 to 100 repeat units. In still other embodiments, m is 1-20 repeat units and m' is 10-50 repeat units.

In certain embodiments, one of $R^x$ and $R^y$ is a hydrophilic, or crosslinkable, amino acid side-chain group, or suitably protected form thereof, and the other of $R^x$ and $R^y$ is a hydrophobic, or ionic amino acid side-chain group, or suitably protected form thereof. In other embodiments, $R^x$ is a hydrophilic or crosslinkable amino acid side-chain group and $R^y$ is a hydrophobic, or ionic amino acid side-chain group. Such hydrophilic, or crosslinkable, amino acid side-chain groups include tyrosine, serine, cysteine, threonine, aspartic acid (also known as aspartate, when charged), glutamic acid (also known as glutamate, when charged), asparagine, and glutamine. Such hydrophobic amino acid side-chain groups include a suitably protected tyrosine side-chain, a suitably protected serine side-chain, a suitably protected threonine side-chain, phenylalanine, alanine, valine, leucine, tryptophan, proline, benzyl and alkyl glutamates, or benzyl and alkyl aspartates or mixtures thereof. Such ionic amino acid side chain groups includes a lysine side-chain, arginine side-chain, or a suitably protected lysine or arginine side-chain, an aspartic acid side chain, glutamic acid side-chain, or a suitably protected aspartic acid or glutamic acid side-chain. One of ordinary skill in the art would recognize that protection of a polar or hydrophilic amino acid side-chain can render that amino acid nonpolar. For example, a suitably protected tyrosine hydroxyl group can render that tyrosine nonpolar and hydrophobic by virtue of protecting the hydroxyl group. Suitable protecting groups for the hydroxyl, amino, and thiol, and carboxylate functional groups of $R^x$ and $R^y$ are as described herein.

In other embodiments, $R^y$ comprises a mixture of hydrophobic and hydrophilic amino acid side-chain groups such that the overall poly(amino acid) block comprising $R^y$ is hydrophobic. Such mixtures of amino acid side-chain groups include phenylalanine/tyrosine, phenalanine/serine, leucine/tyrosine, and the like. According to another embodiment, $R^y$ is a hydrophobic amino acid side-chain group selected from phenylalanine, alanine, or leucine, and one or more of tyrosine, serine, or threonine.

In other embodiments, one or both of $R^x$ and $R^y$ comprise functional groups capable of forming cross-links. According to another embodiment, $R^x$ comprises a functional group capable of forming cross-links. It will be appreciated that a variety of functional groups are capable of such cross-linking, including, but not limited to, carboxylate, hydroxyl, thiol, and amino groups. Examples of NCA's having functional groups capable of forming cross-links, or protected forms thereof, include protected glutamic and aspartic acids, such as:

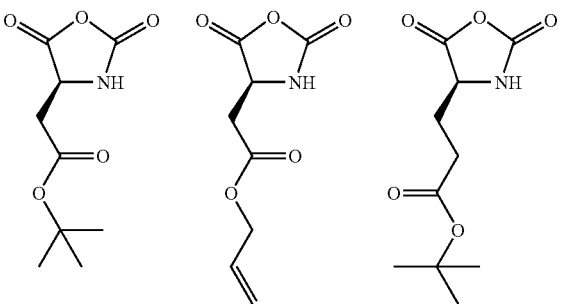

-continued

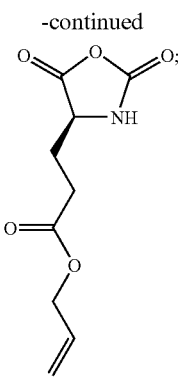

protected cysteines capable of forming disulfide crosslinking via the corresponding thiol, such as:

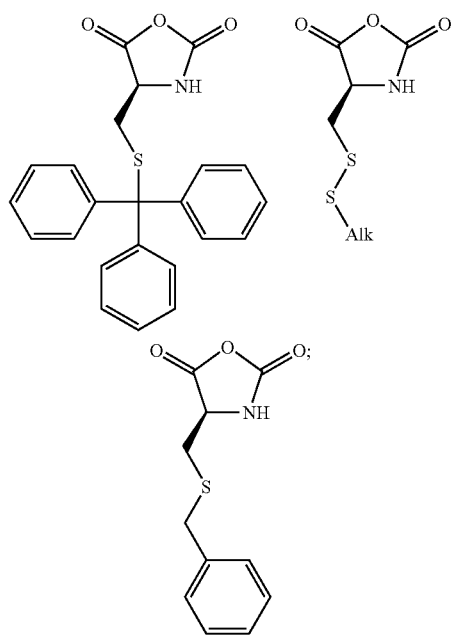

protected serines capable of glutaraldehyde crosslinking via the corresponding hydroxyl, such as:

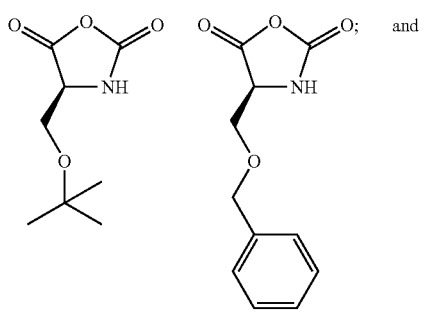

aldehyde and protected aldehyde capable of glutaraldehyde crosslinking, such as:

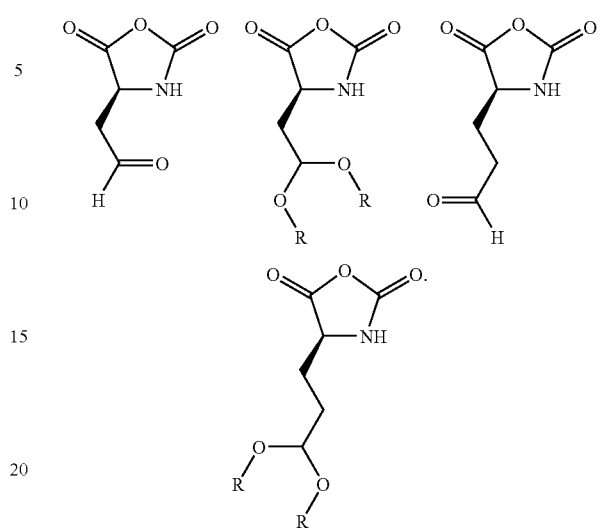

As discussed above, the preparation of poly(amino acid) containing polymers synthesized by the initiation of NCAs using free amine macroinitiators affords block copolymers with a wide range of PDIs. In certain embodiments, the sequential polymerization methods of the present invention result in the preparation of multi-block copolymers of the present invention having a PDI about equal to or lower than that of the starting synthetic polymer.

Other nonlimiting examples of amino acid monomers suitable for the methods of the present invention include protected glutamic and aspartic acids, such as:

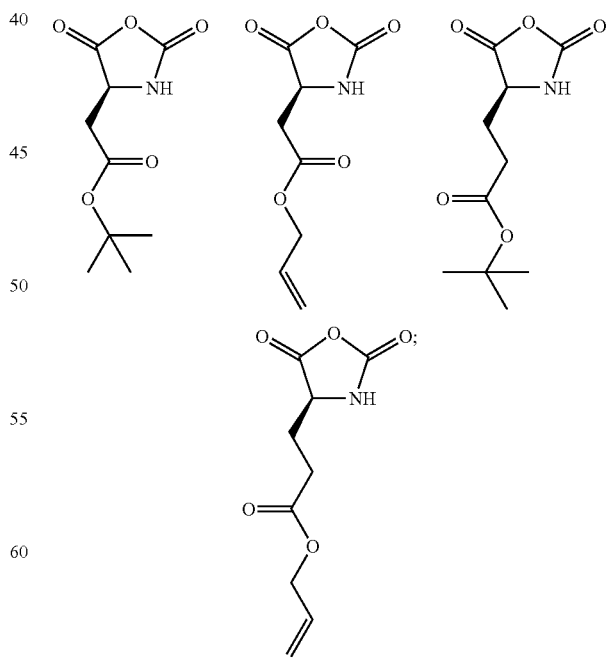

protected lysine, such as:

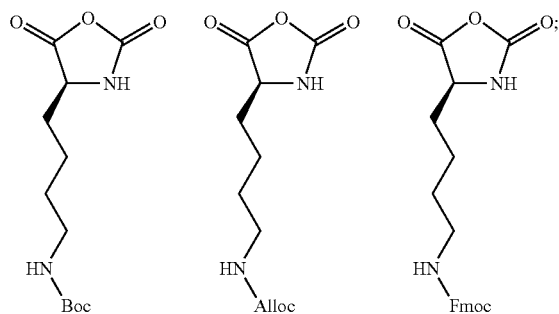

protected arginine, such as:

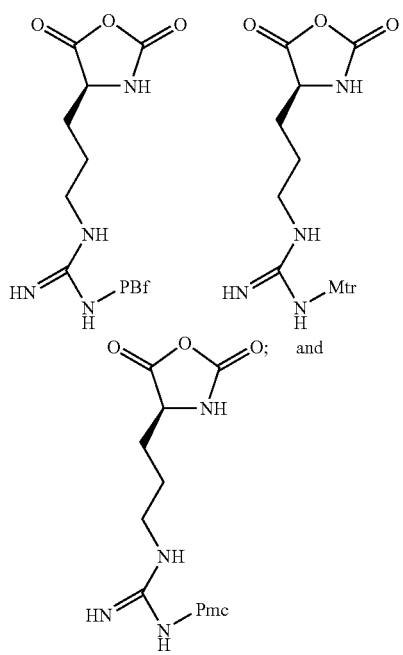

protected histidine, such as:

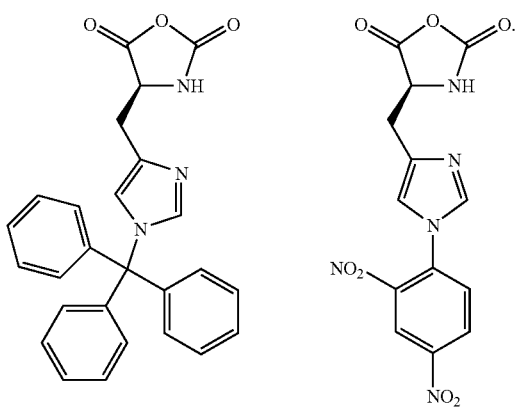

Another aspect of the present invention provides a compound of formula II:

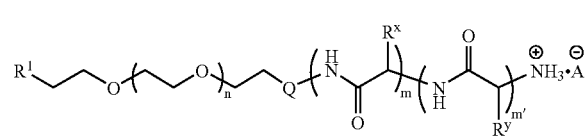

wherein:
n is 10-2500;
m is 1 to 1000;
m' is 0 to 1000;
$R^x$ and $R^y$ are each independently a natural or unnatural amino acid side-chain group, wherein $R^x$ and $R^y$ are different from each other;
$R^1$ is $-Z(CH_2CH_2Y)_p(CH_2)_tR^3$, wherein:
Z is —O—, —S—, —C≡C—, or —CH$_2$—;
each Y is independently —O— or —S—;
p is 0-10;
t is 0-10; and
$R^3$ is —N$_3$, —CN, a mono-protected amine, a di-protected amine, a protected aldehyde, a protected hydroxyl, a protected carboxylic acid, a protected thiol, a 9-30-membered crown ether, or an optionally substituted group selected from aliphatic, a 5-8 membered saturated, partially unsaturated, or aryl ring having 0-4 heteroatoms independently selected from nitrogen, oxygen, or sulfur, an 8-10 membered saturated, partially unsaturated, or aryl bicyclic ring having 0-5 heteroatoms independently selected from nitrogen, oxygen, or sulfur, or a detectable moiety;
Q is a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—, wherein:
-Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur; and
A is a suitable acid anion, wherein said compound is prepared by a method comprising the steps of:
(a) providing a compound of formula I:

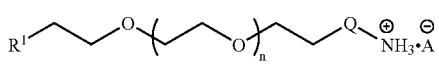

wherein:
n is 10-2500;
$R^1$ is $-Z(CH_2CH_2Y)_p(CH_2)_tR^3$, wherein:
Z is —O—, —S—, —C≡C—, or —CH$_2$—;
each Y is independently —O— or —S—;
p is 0-10;
t is 0-10; and $R^3$ is —$N_3$, —CN, a mono-protected amine, a di-protected amine, a protected aldehyde, a protected hydroxyl, a protected carboxylic acid, a protected thiol, a 9-30-membered crown ether, or an optionally substituted group selected from aliphatic, a 5-8 membered saturated, partially unsaturated, or aryl ring having 0-4 heteroatoms independently selected from nitrogen, oxygen, or sulfur, an 8-10 membered saturated, partially unsaturated, or aryl bicyclic ring having 0-5 heteroatoms independently selected from nitrogen, oxygen, or sulfur, or a detectable moiety;

Q is a valence bond or a bivalent, saturated or unsaturated, straight or branched $C_{1-12}$ alkylene chain, wherein 0-6 methylene units of Qs are independently replaced by -Cy-, —O—, —NH—, —S—, —OC(O)—, —C(O)O—, —C(O)—, —SO—, —$SO_2$—, —$NHSO_2$—, —$SO_2NH$—, —NHC(O)—, —C(O)NH—, —OC(O)NH—, or —NHC(O)O—, wherein:

-Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur; and A is a suitable acid anion, (b) polymerizing a first cyclic amino acid monomer onto the amine salt terminal end of formula I, wherein said first cyclic amino acid monomer comprises $R^x$; and (c) optionally polymerizing a second cyclic amino acid monomer, comprising $R^y$, onto the living polymer end, wherein said second cyclic amino acid monomer is different from said first cyclic amino acid monomer.

According to another embodiment, the present invention provides a compound of formula II:

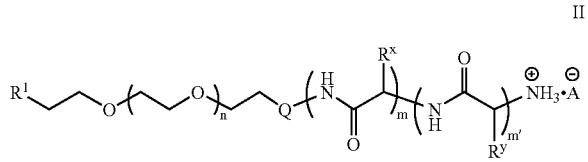

II wherein:
n is 10-2500;
m is 1 to 1000;
m' is 0 to 1000;
$R^x$ and $R^y$ are each independently a natural or unnatural amino acid side-chain group, wherein $R^x$ and $R^y$ are different from each other;
$R^1$ is -Z$(CH_2CH_2Y)_p(CH_2)_t R^3$, wherein:
Z is —O—, —S—, —C≡C—, or —$CH_2$—;
each Y is independently —O— or —S—;
p is 0-10;
t is 0-10; and
$R^3$ is —$N_3$, —CN, a mono-protected amine, a di-protected amine, a protected aldehyde, a protected hydroxyl, a protected carboxylic acid, a protected thiol, a 9-30-membered crown ether, or an optionally substituted group selected from aliphatic, a 5-8 membered saturated, partially unsaturated, or aryl ring having 0-4 heteroatoms independently selected from nitrogen, oxygen, or sulfur, an 8-10 membered saturated, partially unsaturated, or aryl bicyclic ring having 0-5 heteroatoms independently selected from nitrogen, oxygen, or sulfur, or a detectable moiety;

Q is a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —$SO_2$—, —$NHSO_2$—, —$SO_2NH$—, —NHC(O)—, —C(O)NH—, —OC(O)NH—, or —NHC(O)O—, wherein:

-Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur; and A is a suitable acid anion.

In certain embodiments, the m' group of formula II is 1-1000. In certain embodiments, the m' group of formula II is 0. In other embodiments, m' is 1-1000. According to other embodiments, m and m' are independently 10 to 100 repeat units. In still other embodiments, m is 1-20 repeat units and m' is 10-50 repeat units.

In certain embodiments, the $R^3$ moiety of the $R^1$ group of formula II is —$N_3$.

In other embodiments, the $R^3$ moiety of the $R^1$ group of formula II is —CN.

In certain embodiments, the $R^3$ moiety of the $R^1$ group of formula II is an optionally substituted aliphatic group. Examples include t-butyl, 5-norbornene-2-yl, octane-5-yl, acetylenyl, trimethylsilylacetylenyl, triisopropylsilylacetylenyl, and t-butyldimethylsilylacetylenyl. In some embodiments, said $R^3$ moiety is an optionally substituted alkyl group. In other embodiments, said $R^3$ moiety is an optionally substituted alkynyl or alkenyl group. When said $R^3$ moiety is a substituted aliphatic group, suitable substituents on $R^3$ include CN, $N_3$, trimethylsilyl, triisopropylsilyl, t-butyldimethylsilyl, N-methyl propiolamido, N-methyl-4-acetylenylanilino, N-methyl-4-acetylenylbenzoamido, bis-(4-ethynylbenzyl)-amino, dipropargylamino, di-hex-5-ynyl-amino, di-pent-4-ynyl-amino, di-but-3-ynyl-amino, propargyloxy, hex-5-ynyloxy, pent-4-ynyloxy, di-but-3-ynyloxy, N-methylpropargylamino, N-methyl-hex-5-ynyl-amino, N-methylpent-4-ynyl-amino, N-methyl-but-3-ynyl-amino, 2-hex-5-ynyldisulfanyl, 2-pent-4-ynyldisulfanyl, 2-but-3-ynyldisulfanyl, and 2-propargyldisulfanyl. In certain embodiments, the $R^1$ group is 2-(N-methyl-N-(ethynylcarbonyl)amino)ethoxy, 4-ethynylbenzyloxy, or 2-(4-ethynylphenoxy)ethoxy.

In certain embodiments, the $R^3$ moiety of the $R^1$ group of formula II is an optionally substituted aryl group. Examples include optionally substituted phenyl and optionally substituted pyridyl. When said $R^3$ moiety is a substituted aryl group, suitable substituents on $R^3$ include CN, $N_3$, $NO_2$, —$CH_3$, —$CH_2N_3$, —CH=$CH_2$, —C≡CH, Br, I, F, bis-(4-ethynylbenzyl)-amino, dipropargylamino, di-hex-5-ynyl-amino, di-pent-4-ynyl-amino, di-but-3-ynyl-amino, propargyloxy, hex-5-ynyloxy, pent-4-ynyloxy, di-but-3-ynyloxy, 2-hex-5-ynyloxy-ethyldisulfanyl, 2-pent-4-ynyloxy-ethyldisulfanyl, 2-but-3-ynyloxy-ethyldisulfanyl, 2-propargyloxy-ethyldisulfanyl, bis-benzyloxy-methyl, [1,3]dioxolan-2-yl, and [1,3]dioxan-2-yl.

In other embodiments, the $R^3$ moiety is an aryl group substituted with a suitably protected amino group. According to another aspect, the $R^3$ moiety is phenyl substituted with a suitably protected amino group.

In other embodiments, the $R^3$ moiety of the $R^1$ group of formula II is a protected hydroxyl group. In certain embodiments the protected hydroxyl of the $R^3$ moiety is an ester, carbonate, sulfonate, allyl ether, ether, silyl ether, alkyl ether, arylalkyl ether, or alkoxyalkyl ether. In certain embodiments, the ester is a formate, acetate, proprionate, pentanoate, crotonate, or benzoate. Exemplary esters include formate, benzoyl formate, chloroacetate, trifluoroacetate, methoxyacetate, triphenylmethoxyacetate, p-chlorophenoxyacetate, 3-phenylpropionate, 4-oxopentanoate, 4,4-(ethylenedithio) pentanoate, pivaloate(trimethylacetate), crotonate, 4-methoxy-crotonate, benzoate, p-benylbenzoate, 2,4,6-trimethylbenzoate. Exemplary carbonates include 9-fluorenylmethyl, ethyl, 2,2,2-trichloroethyl, 2-(trimethylsilyl)ethyl, 2-(phenylsulfonyl)ethyl, vinyl, allyl, and p-nitrobenzyl carbonate. Examples of suitable silyl ethers include trimethylsilyl, triethylsilyl, t-butyldimethylsilyl, t-butyldiphenylsilyl, triisopropylsilyl ether, and other trialkylsilyl ethers. Exemplary alkyl ethers include methyl, benzyl, p-methoxybenzyl, 3,4-dimethoxybenzyl, trityl, t-butyl, and allyl ether, or derivatives thereof. Exemplary alkoxyalkyl ethers include acetals such as methoxymethyl, methylthiomethyl, (2-methoxyethoxy)methyl, benzyloxymethyl, beta-(trimethylsilyl)ethoxymethyl, and tetrahydropyran-2-yl ether. Exemplary arylalkyl ethers include benzyl, p-methoxybenzyl (MPM), 3,4-dimethoxybenzyl, O-nitrobenzyl, p-nitrobenzyl, p-halobenzyl, 2,6-dichlorobenzyl, p-cyanobenzyl, 2- and 4-picolyl ethers.

In certain embodiments, the $R^3$ moiety of the $R^1$ group of formula II is a mono-protected or di-protected amino group. In certain embodiments $R^3$ is a mono-protected amine. In certain embodiments $R^3$ is a mono-protected amine selected from aralkylamines, carbamates, allyl amines, or amides. Exemplary mono-protected amino moieties include t-butyloxycarbonylamino, ethyloxycarbonylamino, methyloxycarbonylamino, trichloroethyloxycarbonylamino, allyloxycarbonylamino, benzyloxocarbonylamino, allylamino, benzylamino, fluorenylmethylcarbonyl, formamido, acetamido, chloroacetamido, dichloroacetamido, trichloroacetamido, phenylacetamido, trifluoroacetamido, benzamido, and t-butyldiphenylsilylamino. In other embodiments $R^3$ is a di-protected amine. Exemplary di-protected amines include dibenzylamine, di-allylamine, phthalimide, maleimide, succinimide, pyrrole, 2,2,5,5-tetramethyl-[1,2,5]azadisilolidine, and azide. In certain embodiments, the $R^3$ moiety is phthalimido. In other embodiments, the $R^3$ moiety is mono- or di-benzylamino or mono- or di-allylamino. In certain embodiments, the $R^1$ group is 2-dibenzylaminoethoxy.

In other embodiments, the $R^3$ moiety of the $R^1$ group of formula II is a protected aldehyde group. In certain embodiments the protected aldehydo moiety of $R^3$ is an acyclic acetal, a cyclic acetal, a hydrazone, or an imine. Exemplary $R^3$ groups include dimethyl acetal, diethyl acetal, diisopropyl acetal, dibenzyl acetal, bis(2-nitrobenzyl)acetal, 1,3-dioxane, 1,3-dioxolane, and semicarbazone. In certain embodiments, $R^3$ is an acyclic acetal or a cyclic acetal. In other embodiments, $R^3$ is a dibenzyl acetal.

In yet other embodiments, the $R^3$ moiety of the $R^1$ group of formula II is a protected carboxylic acid group. In certain embodiments, the protected carboxylic acid moiety of $R^3$ is an optionally substituted ester selected from $C_{1-6}$ aliphatic or aryl, or a silyl ester, an activated ester, an amide, or a hydrazide. Examples of such ester groups include methyl, ethyl, propyl, isopropyl, butyl, isobutyl, benzyl, and phenyl ester. In other embodiments, the protected carboxylic acid moiety of $R^3$ is an oxazoline or an ortho ester. Examples of such protected carboxylic acid moieties include oxazolin-2-yl and 2-methoxy-[1,3]dioxin-2-yl. In certain embodiments, the $R^1$ group is oxazolin-2-ylmethoxy or 2-oxazolin-2-yl-1-propoxy.

According to another embodiments, the $R^3$ moiety of the $R^1$ group of formula II is a protected thiol group. In certain embodiments, the protected thiol of $R^3$ is a disulfide, thioether, silyl thioether, thioester, thiocarbonate, or a thiocarbamate. Examples of such protected thiols include triisopropylsilyl thioether, t-butyldimethylsilyl thioether, t-butyl thioether, benzyl thioether, p-methylbenzyl thioether, triphenylmethyl thioether, and p-methoxyphenyldiphenylmethyl thioether. In other embodiments, $R^3$ is an optionally substituted thioether selected from alkyl, benzyl, or triphenylmethyl, or trichloroethoxycarbonyl thioester. In certain embodiments, $R^3$ is —S—S-pyridin-2-yl, —S—SBn, —S—SCH$_3$, or —S—S(p-ethynylbenzyl). In other embodiments, $R^3$ is —S—S-pyridin-2-yl. In still other embodiments, the $R^1$ group is 2-triphenylmethylsulfanyl-ethoxy.

In certain embodiments, the $R^3$ moiety of the $R^1$ group of formula II is a crown ether. Examples of such crown ethers include 12-crown-4, 15-crown-5, and 18-crown-6.

In still other embodiments, the $R^3$ moiety of the $R^1$ group of formula II is a detectable moiety. According to one aspect of the invention, the $R^3$ moiety of the $R^1$ group of formula II is a fluorescent moiety. Such fluorescent moieties are well known in the art and include coumarins, quinolones, benzoisoquinolones, hostasol, and Rhodamine dyes, to name but a few. Exemplary fluorescent moieties of the $R^3$ group of $R^1$ include anthracen-9-yl, pyren-4-yl, 9-H-carbazol-9-yl, the carboxylate of rhodamine B, and the carboxylate of coumarin 343.

As defined generally above, the Q group of formula II is a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—, wherein -Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur. In certain embodiments, Q is a valence bond. In other embodiments, Q is a bivalent, saturated $C_{1-12}$ alkylene chain, wherein 0-6 methylene units of Q are independently replaced by -Cy-, —O—, —NH—, —S—, —OC(O)—, —C(O)O—, or —C(O)—, wherein -Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur.

In certain embodiments, Q is -Cy- (i.e. a $C_1$ alkylene chain wherein the methylene unit is replaced by -Cy-), wherein -Cy- is an optionally substituted 5-8 membered bivalent, saturated, partially unsaturated, or aryl ring having 0-4 heteroatoms independently selected from nitrogen, oxygen, or sulfur. According to one aspect of the present invention, -Cy- is an optionally substituted bivalent aryl group. According to another aspect of the present invention, -Cy- is an optionally substituted bivalent phenyl group. In other embodiments, -Cy- is an optionally substituted 5-8 membered bivalent, saturated carbocyclic ring. In still other embodiments, -Cy- is an optionally substituted 5-8 membered bivalent, saturated heterocyclic ring having 1-2 heteroatoms independently selected from nitrogen, oxygen, or sulfur. Exemplary -Cy- groups include bivalent rings selected from phenyl, pyridyl, pyrimidinyl, cyclohexyl, cyclopentyl, or cyclopropyl.

In certain embodiments, the $R^3$ moiety of the $R^1$ group of formula II is a group suitable for Click chemistry. Click reactions tend to involve high-energy ("spring-loaded") reagents with well-defined reaction coordinates, giving rise to selective bond-forming events of wide scope. Examples include the nucleophilic trapping of strained-ring electrophiles (epoxide, aziridines, aziridinium ions, episulfonium ions), certain forms of carbonyl reactivity (aldehydes and hydrazines or hydroxylamines, for example), and several types of cycloaddition reactions. The azide-alkyne 1,3-dipolar cycloaddition is one such reaction. Click chemistry is known in the art and one of ordinary skill in the art would recognize that certain $R^3$ moieties of the present invention are suitable for Click chemistry.

Compounds of formula II having $R^3$ moieties suitable for Click chemistry are useful for conjugating said compounds to biological systems or macromolecules such as proteins, viruses, and cells, to name but a few. The Click reaction is known to proceed quickly and selectively under physiological conditions. In contrast, most conjugation reactions are carried out using the primary amine functionality on proteins (e.g. lysine or protein end-group). Because most proteins contain a multitude of lysines and arginines, such conjugation occurs uncontrollably at multiple sites on the protein. This is particularly problematic when lysines or arginines are located around the active site of an enzyme or other biomolecule. Thus, another embodiment of the present invention provides a method of conjugating the $R^1$ groups of a compound of formula II to a macromolecule via Click chemistry. Yet another embodiment of the present invention provides a macromolecule conjugated to a compound of formula II via the $R^1$ group.

After conjugation to a biomolecule, drug, cell, or the like, the other end-group functionality, corresponding to free amine or salt thereof, group of formula II, can be used to attach targeting groups for cell specific delivery including, but not limited to, detectable moieties, such as fluorescent dyes, covalent attachment to surfaces, and incorporation into hydrogels.

According to one embodiment, the $R^3$ moiety of the $R^1$ group of formula II is an azide-containing group. According to another embodiment, the $R^3$ moiety of the $R^1$ group of formula II is an alkyne-containing group. In certain embodiments, the $R^3$ moiety of the $R^1$ group of formula II has a terminal alkyne moiety. In other embodiments, $R^3$ moiety of the $R^1$ group of formula II is an alkyne moiety having an electron withdrawing group. Accordingly, in such embodiments, the $R^3$ moiety of the $R^1$ group of formula II is

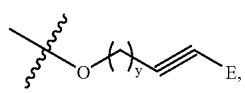

wherein E is an electron withdrawing group and y is 0-6. Such electron withdrawing groups are known to one of ordinary skill in the art. In certain embodiments, E is an ester. In other embodiments, the $R^3$ moiety of the $R^1$ group of formula II is

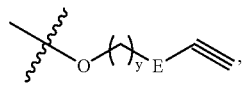

wherein E is an electron withdrawing group, such as a —C(O)O— group and y is 0-6.

Another aspect of the present invention provides a method for preparing a compound of formula II':

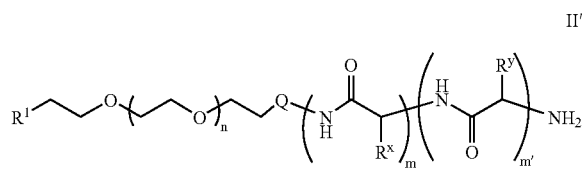

wherein:
  n is 10-2500;
  m is 1 to 1000;
  m' is 0 to 1000;
  $R^x$ and $R^y$ are each independently a natural or unnatural amino acid side-chain group, wherein $R^x$ and $R^y$ are different from each other;
  $R^1$ is -Z(CH$_2$CH$_2$Y)$_p$(CH$_2$)$_t$R$^3$, wherein:
    Z is —O—, —S—, —C≡C—, or —CH$_2$—;
    each Y is independently —O— or —S—;
    p is 0-10;
    t is 0-10; and
    $R^3$ is —N$_3$, —CN, a mono-protected amine, a di-protected amine, a protected aldehyde, a protected hydroxyl, a protected carboxylic acid, a protected thiol, a 9-30-membered crown ether, or an optionally substituted group selected from aliphatic, a 5-8 membered saturated, partially unsaturated, or aryl ring having 0-4 heteroatoms independently selected from nitrogen, oxygen, or sulfur, an 8-10 membered saturated, partially unsaturated, or aryl bicyclic ring having 0-5 heteroatoms independently selected from nitrogen, oxygen, or sulfur, or a detectable moiety; and
  Q is a valence bond or a bivalent, saturated or unsaturated, straight or branched C$_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—, wherein:
    -Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur, wherein said method comprises the steps of:
(a) providing a compound of formula I:

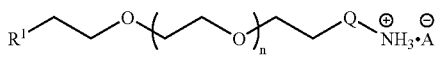

wherein:
  n is 10-2500;
  $R^1$ is $-Z(CH_2CH_2Y)_p(CH_2)_tR^3$, wherein:
    X is —O—, —S—, —C≡C—, or —CH$_2$—;
    each Y is independently —O— or —S—;
    p is 0-10;
    t is 0-10; and
    $R^3$ is —N$_3$, —CN, a mono-protected amine, a di-protected amine, a protected aldehyde, a protected hydroxyl, a protected carboxylic acid, a protected thiol, a 9-30-membered crown ether, or an optionally substituted group selected from aliphatic, a 5-8 membered saturated, partially unsaturated, or aryl ring having 0-4 heteroatoms independently selected from nitrogen, oxygen, or sulfur, an 8-10 membered saturated, partially unsaturated, or aryl bicyclic ring having 0-5 heteroatoms independently selected from nitrogen, oxygen, or sulfur, or a detectable moiety;
  Q is a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—, wherein:
    -Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur; and
  A is a suitable acid anion,
(b) polymerizing a first cyclic amino acid monomer onto the amine salt terminal end of formula I, wherein said first cyclic amino acid monomer comprises $R^x$;
(c) optionally polymerizing a second cyclic amino acid monomer, comprising $R^y$, onto the living polymer end, wherein said second cyclic amino acid monomer is different from said first cyclic amino acid monomer, to form a compound of formula II:

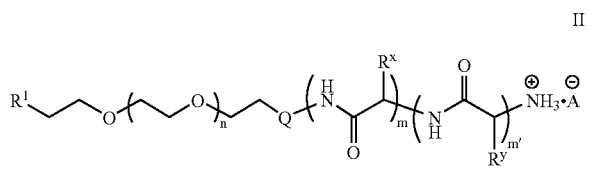

and
(d) treating said compound of formula II with a base to form a compound of formula II'.

One of ordinary skill in the art would appreciate that a variety of bases are suitable for forming the free-base compound of formula II' from the salt form of formula II. Such bases are well known in the art. In certain embodiments, the base utilized at step (d) is pyridine, or a derivative thereof, such as dimethylaminopyridine ("DMAP"), lutidine or collidine. In other embodiments, the base utilized at step (d) is dimethylaminopyridine ("DMAP"). In still other embodiments, inorganic bases are utilized and include ammonia, potassium hydroxide, sodium hydroxide, sodium carbonate, sodium bicarbonate, potassium carbonate, or potassium bicarbonate.

According to yet another embodiment, the present invention provides a compound of formula II':

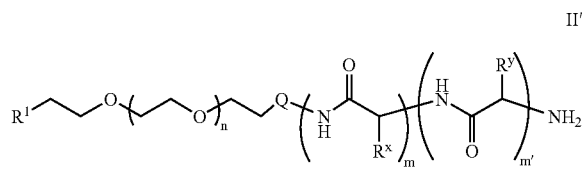

wherein:
  n is 10-2500;
  m is 1 to 1000;
  m' is 0 to 1000;
  $R^x$ and $R^y$ are each independently a natural or unnatural amino acid side-chain group, wherein $R^x$ and $R^y$ are different from each other;
  $R^1$ is $-Z(CH_2CH_2Y)_p(CH_2)_tR^3$, wherein:
    Z is —O—, —S—, —C≡C—, or —CH$_2$—;
    each Y is independently —O— or —S—;
    p is 0-10;
    t is 0-10; and
    $R^3$ is —N$_3$, —CN, a mono-protected amine, a di-protected amine, a protected aldehyde, a protected hydroxyl, a protected carboxylic acid, a protected thiol, a 9-30 membered crown ether, or an optionally substituted group selected from aliphatic, a 5-8 membered saturated, partially unsaturated, or aryl ring having 0-4 heteroatoms independently selected from nitrogen, oxygen, or sulfur, an 8-10 membered saturated, partially unsaturated, or aryl bicyclic ring having 0-5 heteroatoms independently selected from nitrogen, oxygen, or sulfur, or a detectable moiety; and
  Q is a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—, wherein:
    -Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur.

Each of the embodiments relating to the $R^1$, Q, n, m, m', $R^x$ and $R^y$ groups of formula II apply to the $R^1$, n, m, m', $R^x$ and $R^y$ groups of formula II' both singly and in combination.

It will be appreciated to one of ordinary skill in the art that a compound of formula II' may be further derivatized by treatment of that compound with a suitable terminating agent. Thus, another embodiment provides a method for preparing a compound of formula III:

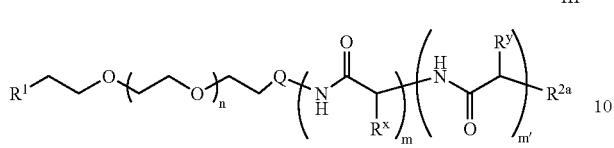

wherein:
n is 10-2500;
m is 1 to 1000;
m' is 0 to 1000;
$R^x$ and $R^y$ are each independently a natural or unnatural amino acid side-chain group, wherein $R^x$ and $R^y$ are different from each other;
$R^1$ is -Z(CH$_2$CH$_2$Y)$_p$(CH$_2$)$_t$R$^3$, wherein:
Z is —O—, —S—, —C≡C—, or —CH$_2$—;
each Y is independently —O— or —S—;
p is 0-10;
t is 0-10; and
$R^3$ is —N$_3$, —CN, a mono-protected amine, a di-protected amine, a protected aldehyde, a protected hydroxyl, a protected carboxylic acid, a protected thiol, a 9-30-membered crown ether, or an optionally substituted group selected from aliphatic, a 5-8 membered saturated, partially unsaturated, or aryl ring having 0-4 heteroatoms independently selected from nitrogen, oxygen, or sulfur, an 8-10 membered saturated, partially unsaturated, or aryl bicyclic ring having 0-5 heteroatoms independently selected from nitrogen, oxygen, or sulfur, or a detectable moiety;
Q is a valence bond or a bivalent, saturated or unsaturated, straight or branched C$_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—, wherein:
-Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur;
$R^{2a}$ is a mono-protected amine, a di-protected amine, —NHR$^4$, —N(R$^4$)$_2$, —NHC(O)R$^4$, —NR$^4$C(O)R$^4$, —NHC(O)NHR$^4$, —NHC(O)N(R$^4$)$_2$, —NR$^4$C(O)NHR$^4$, —NR$^4$C(O)N(R$^4$)$_2$, —NHC(O)OR$^4$, —NR$^4$C(O)OR$^4$, —NHSO$_2$R$^4$, or —NR$^4$SO$_2$R$^4$; and
each $R^4$ is independently an optionally substituted group selected from aliphatic, a 5-8 membered saturated, partially unsaturated, or aryl ring having 0-4 heteroatoms independently selected from nitrogen, oxygen, or sulfur, an 8-10-membered saturated, partially unsaturated, or aryl bicyclic ring having 0-5 heteroatoms independently selected from nitrogen, oxygen, or sulfur, or a detectable moiety, or:
two $R^4$ on the same nitrogen atom are taken together with said nitrogen atom to form an optionally substituted 4-7 membered saturated, partially unsaturated, or aryl ring having 1-4 heteroatoms independently selected from nitrogen, oxygen, or sulfur;

wherein said method comprises the steps of:
(a) providing a compound of formula I:

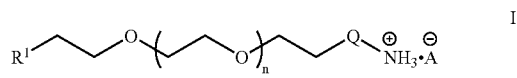

wherein:
n is 10-2500;
$R^1$ is —Z(CH$_2$CH$_2$Y)$_p$(CH$_2$)$_t$R$^3$, wherein:
Z is —O—, —S—, —C≡C—, or —CH$_2$—;
each Y is independently —O— or —S—;
p is 0-10;
t is 0-10; and
$R^3$ is —N$_3$, —CN, a mono-protected amine, a di-protected amine, a protected aldehyde, a protected hydroxyl, a protected carboxylic acid, a protected thiol, a 9-30-membered crown ether, or an optionally substituted group selected from aliphatic, a 5-8 membered saturated, partially unsaturated, or aryl ring having 0-4 heteroatoms independently selected from nitrogen, oxygen, or sulfur, an 8-10 membered saturated, partially unsaturated, or aryl bicyclic ring having 0-5 heteroatoms independently selected from nitrogen, oxygen, or sulfur, or a detectable moiety;
Q is a valence bond or a bivalent, saturated or unsaturated, straight or branched C$_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—, wherein:
-Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur; and
A is a suitable acid anion,
(b) polymerizing a first cyclic amino acid monomer onto the amine salt terminal end of formula I, wherein said first cyclic amino acid monomer comprises $R^x$;
(c) optionally polymerizing a second cyclic amino acid monomer, comprising $R^y$, onto the living polymer end, wherein said second cyclic amino acid monomer is different from said first cyclic amino acid monomer, to form a compound of formula II:

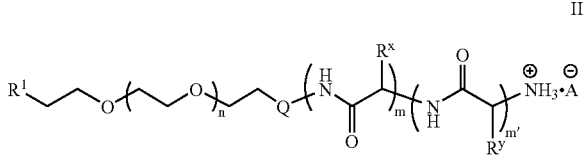

(d) treating said compound of formula II with a base to form a compound of formula II':

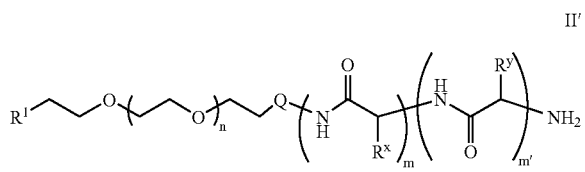

and (e) treating said compound of formula II' with a suitable terminating agent to form the compound of formula III.

In certain embodiments, the m' group of formula III is 1-1000. In certain embodiments, the m' group of formula III is 0. In other embodiments, m' is 1-1000. According to other embodiments, m and m' are independently 10 to 100 repeat units. In still other embodiments, m is 1-20 repeat units and m' is 10-50 repeat units.

As described generally above, $R^1$ is $-Z(CH_2CH_2Y)_p(CH_2)_y R^3$, wherein Z is $-O-$, $-S-$, $-C\equiv C-$, or $-CH_2-$; each Y is independently $-O-$ or $-S-$; p is 0-10; y is 0-10; and $R^3$ is $-N_3$, $-CN$, a mono-protected amine, a di-protected amine, a protected aldehyde, a protected hydroxyl, a protected carboxylic acid, a protected thiol, a 9-30-membered crown ether, an optionally substituted aliphatic group, an optionally substituted 5-8-membered saturated, partially unsaturated, or aryl ring having 0-4 heteroatoms independently selected from nitrogen, oxygen, or sulfur, an optionally substituted 8-10-membered saturated, partially unsaturated, or aryl bicyclic ring having 0-5 heteroatoms independently selected from nitrogen, oxygen, or sulfur, or a detectable moiety.

In certain embodiments, the $R^3$ moiety of the $R^1$ group of formula III is $-N_3$.

In other embodiments, the $R^3$ moiety of the $R^1$ group of formula III is $-CN$.

In certain embodiments, the $R^3$ moiety of the $R^1$ group of formula III is an optionally substituted aliphatic group. Examples include t-butyl, 5-norbornene-2-yl, octane-5-yl, acetylenyl, trimethylsilylacetylenyl, triisopropylsilylacetylenyl, and t-butyldimethylsilylacetylenyl. In some embodiments, said $R^3$ moiety is an optionally substituted alkyl group. In other embodiments, said $R^3$ moiety is an optionally substituted alkynyl or alkenyl group. When said $R^3$ moiety is a substituted aliphatic group, suitable substituents on $R^3$ include CN, $N_3$, trimethylsilyl, triisopropylsilyl, t-butyldimethylsilyl, N-methyl propiolamido, N-methyl-4-acetylenylanilino, N-methyl-4-acetylenylbenzoamido, bis-(4-ethynylbenzyl)-amino, dipropargylamino, di-hex-5-ynyl-amino, di-pent-4-ynyl-amino, di-but-3-ynyl-amino, propargyloxy, hex-5-ynyloxy, pent-4-ynyloxy, di-but-3-ynyloxy, N-methyl-propargylamino, N-methyl-hex-5-ynyl-amino, N-methyl-pent-4-ynyl-amino, N-methyl-but-3-ynyl-amino, 2-hex-5-ynyldisulfanyl, 2-pent-4-ynyldisulfanyl, 2-but-3-ynyldisulfanyl, and 2-propargyldisulfanyl. In certain embodiments, the $R^1$ group is 2-(N-methyl-N-(ethynylcarbonyl)amino)ethoxy, 4-ethynylbenzyloxy, or 2-(4-ethynylphenoxy)ethoxy. In certain embodiments, $R^1$ is other than $-OMe$.

In certain embodiments, the $R^3$ moiety of the $R^1$ group of formula III is an optionally substituted aryl group. Examples include optionally substituted phenyl and optionally substituted pyridyl. When said $R^3$ moiety is a substituted aryl group, suitable substituents on $R^3$ include CN, $N_3$, $NO_2$, $-CH_3$, $-CH_2N_3$, $-CH=CH_2$, $-C\equiv CH$, Br, I, F, bis-(4-ethynylbenzyl)-amino, dipropargylamino, di-hex-5-ynyl-amino, di-pent-4-ynyl-amino, di-but-3-ynyl-amino, propargyloxy, hex-5-ynyloxy, pent-4-ynyloxy, di-but-3-ynyloxy, 2-hex-5-ynyloxy-ethyldisulfanyl, 2-pent-4-ynyloxy-ethyldisulfanyl, 2-but-3-ynyloxy-ethyldisulfanyl, 2-propargyloxy-ethyldisulfanyl, bis-benzyloxy-methyl, [1,3]dioxolan-2-yl, and [1,3]dioxan-2-yl.

In other embodiments, the $R^3$ moiety of the $R^1$ group of formula III is a protected hydroxyl group. In certain embodiments the protected hydroxyl of the $R^3$ moiety is an ester, carbonate, sulfonate, allyl ether, ether, silyl ether, alkyl ether, arylalkyl ether, or alkoxyalkyl ether. In certain embodiments, the ester is a formate, acetate, proprionate, pentanoate, crotonate, or benzoate. Exemplary esters include formate, benzoyl formate, chloroacetate, trifluoroacetate, methoxyacetate, triphenylmethoxyacetate, p-chlorophenoxyacetate, 3-phenylpropionate, 4-oxopentanoate, 4,4-(ethylenedithio) pentanoate, pivaloate(trimethylacetate), crotonate, 4-methoxy-crotonate, benzoate, p-benylbenzoate, 2,4,6-trimethylbenzoate. Exemplary carbonates include 9-fluorenylmethyl, ethyl, 2,2,2-trichloroethyl, 2-(trimethylsilyl)ethyl, 2-(phenylsulfonyl)ethyl, vinyl, allyl, and p-nitrobenzyl carbonate. Examples of suitable silyl ethers include trimethylsilyl, triethylsilyl, t-butyldimethylsilyl, t-butyldiphenylsilyl, triisopropylsilyl ether, and other trialkylsilyl ethers. Exemplary alkyl ethers include methyl, benzyl, p-methoxybenzyl, 3,4-dimethoxybenzyl, trityl, t-butyl, and allyl ether, or derivatives thereof. Exemplary alkoxyalkyl ethers include acetals such as methoxymethyl, methylthiomethyl, (2-methoxyethoxy)methyl, benzyloxymethyl, beta-(trimethylsilyl)ethoxymethyl, and tetrahydropyran-2-yl ether. Exemplary arylalkyl ethers include benzyl, p-methoxybenzyl (MPM), 3,4-dimethoxybenzyl, O-nitrobenzyl, p-nitrobenzyl, p-halobenzyl, 2,6-dichlorobenzyl, p-cyanobenzyl, 2- and 4-picolyl ethers.

In certain embodiments, the $R^3$ moiety of the $R^1$ group of formula III is a mono-protected or di-protected amino group. In certain embodiments $R^3$ is a mono-protected amine. In certain embodiments $R^3$ is a mono-protected amine selected from aralkylamines, carbamates, allyl amines, or amides. Exemplary mono-protected amino moieties include t-butyloxycarbonylamino, ethyloxycarbonylamino, methyloxycarbonylamino, trichloroethyloxycarbonylamino, allyloxycarbonylamino, benzyloxocarbonylamino, allylamino, benzylamino, fluorenylmethylcarbonyl, formamido, acetamido, chloroacetamido, dichloroacetamido, trichloroacetamido, phenylacetamido, trifluoroacetamido, benzamido, and t-butyldiphenylsilylamino. In other embodiments $R^3$ is a di-protected amine. Exemplary di-protected amines include dibenzylamine, di-allylamine, phthalimide, maleimide, succinimide, pyrrole, 2,2,5,5-tetramethyl-[1,2,5]azadisilolidine, and azide. In certain embodiments, the $R^3$ moiety is phthalimido. In other embodiments, the $R^3$ moiety is mono- or di-benzylamino or mono- or di-allylamino. In certain embodiments, the $R^1$ group is 2-dibenzylaminoethoxy.

In other embodiments, the $R^3$ moiety of the $R^1$ group of formula III is a protected aldehyde group. In certain embodiments the protected aldehydo moiety of $R^3$ is an acyclic acetal, a cyclic acetal, a hydrazone, or an imine. Exemplary $R^3$ groups include dimethyl acetal, diethyl acetal, diisopropyl acetal, dibenzyl acetal, bis(2-nitrobenzyl)acetal, 1,3-dioxane, 1,3-dioxolane, and semicarbazone. In certain embodiments, $R^3$ is an acyclic acetal or a cyclic acetal. In other embodiments, $R^3$ is a dibenzyl acetal.

In yet other embodiments, the $R^3$ moiety of the $R^1$ group of formula III is a protected carboxylic acid group. In certain embodiments, the protected carboxylic acid moiety of $R^3$ is an optionally substituted ester selected from $C_{1-6}$ aliphatic or aryl, or a silyl ester, an activated ester, an amide, or a hydrazide. Examples of such ester groups include methyl, ethyl, propyl, isopropyl, butyl, isobutyl, benzyl, and phenyl ester. In other embodiments, the protected carboxylic acid moiety of $R^3$ is an oxazoline or an ortho ester. Examples of such protected carboxylic acid moieties include oxazolin-2-yl and 2-methoxy-[1,3]dioxin-2-yl. In certain embodiments, the $R^1$ group is oxazolin-2-ylmethoxy or 2-oxazolin-2-yl-1-propoxy.

According to another embodiments, the $R^3$ moiety of the $R^1$ group of formula III is a protected thiol group. In certain embodiments, the protected thiol of $R^3$ is a disulfide, thioether, silyl thioether, thioester, thiocarbonate, or a thiocarbamate. Examples of such protected thiols include triisopropylsilyl thioether, t-butyldimethylsilyl thioether, t-butyl thioether, benzyl thioether, p-methylbenzyl thioether, triphenylmethyl thioether, and p-methoxyphenyldiphenylmethyl thioether. In other embodiments, $R^3$ is an optionally substituted thioether selected from alkyl, benzyl, or triphenylmethyl, or trichloroethoxycarbonyl thioester. In certain embodiments, $R^3$ is —S—S-pyridin-2-yl, —S—SBn, —S—SCH$_3$, or —S—S(p-ethynylbenzyl). In other embodiments, $R^3$ is —S—S-pyridin-2-yl. In still other embodiments, the $R^1$ group is 2-triphenylmethylsulfanyl-ethoxy.

In certain embodiments, the $R^3$ moiety of the $R^1$ group of formula III is a crown ether. Examples of such crown ethers include 12-crown-4, 15-crown-5, and 18-crown-6.

In still other embodiments, the $R^3$ moiety of the $R^1$ group of either of formula III is a detectable moiety. According to one aspect of the invention, the $R^3$ moiety of the $R^1$ group of formula III is a fluorescent moiety. Such fluorescent moieties are well known in the art and include coumarins, quinolones, benzoisoquinolones, hostasol, and Rhodamine dyes, to name but a few. Exemplary fluorescent moieties of the $R^3$ group of $R^1$ include anthracen-9-yl, pyren-4-yl, 9-H-carbazol-9-yl, the carboxylate of rhodamine B, and the carboxylate of coumarin 343.

In certain embodiments, the $R^3$ moiety of the $R^1$ group of formula III is a group suitable for Click chemistry. Click reactions tend to involve high-energy ("spring-loaded") reagents with well-defined reaction coordinates, that give rise to selective bond-forming events of wide scope. Examples include nucleophilic trapping of strained-ring electrophiles (epoxide, aziridines, aziridinium ions, episulfonium ions), certain carbonyl reactivity (e.g., the reaction between aldehydes and hydrazines or hydroxylamines), and several cycloaddition reactions. The azide-alkyne 1,3-dipolar cycloaddition is one such reaction. Click chemistry is known in the art and one of ordinary skill in the art would recognize that certain $R^3$ moieties of the present invention are suitable for Click chemistry.

Compounds of formula III having $R^3$ moieties suitable for Click chemistry are useful for conjugating said compounds to biological systems or macromolecules such as proteins, viruses, and cells, to name but a few. The Click reaction is known to proceed quickly and selectively under physiological conditions. In contrast, most conjugation reactions are carried out using the primary amine functionality on proteins (e.g. lysine or protein end-group). Because most proteins contain a multitude of lysines and arginines, such conjugation occurs uncontrollably at multiple sites on the protein. This is particularly problematic when lysines or arginines are located around the active site of an enzyme or other biomolecule. Thus, another embodiment of the present invention provides a method of conjugating the $R^1$ groups of a compound of formula III to a macromolecule via Click chemistry. Yet another embodiment of the present invention provides a macromolecule conjugated to a compound of formula III via the $R^1$ group.

After conjugation to a biomolecule, drug, cell, substrate, or the like, the other end-group functionality, corresponding to the $R^{2a}$ moiety of formula III, can be used to attach targeting groups for cell-specific delivery including, but not limited to, detectable moieties, such as fluorescent dyes, covalent attachment to surfaces, and incorporation into hydrogels.

According to one embodiment, the $R^3$ moiety of the $R^1$ group of either of formula III is an azide-containing group. According to another embodiment, the $R^3$ moiety of the $R^1$ group of either of formula III is an alkyne-containing group. In certain embodiments, the $R^3$ moiety of the $R^1$ group of formula III has a terminal alkyne moiety. In other embodiments, the $R^3$ moiety of the $R^1$ group of formula III is an alkyne moiety having an electron withdrawing group. Accordingly, in such embodiments, the $R^3$ moiety of the $R^1$ group of formula III is

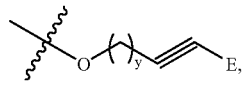

wherein E is an electron withdrawing group and y is 0-6. Such electron withdrawing groups are known to one of ordinary skill in the art. In certain embodiments, E is an ester. In other embodiments, the $R^3$ moiety of the $R^1$ group of formula III is

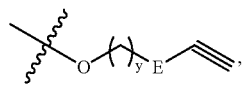

wherein E is an electron withdrawing group, such as a —C(O)O— group and y is 0-6.

Exemplary $R^1$ groups of compounds of the present invention are set forth in Table 1, below.

TABLE 1

Representative $R^1$ Groups

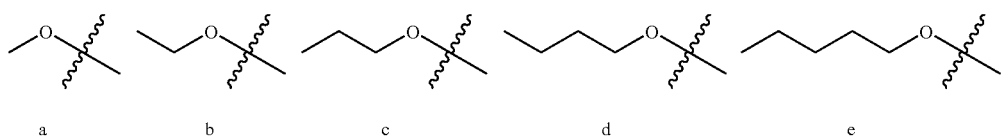

a  b  c  d  e

TABLE 1-continued
Representative R[1] Groups
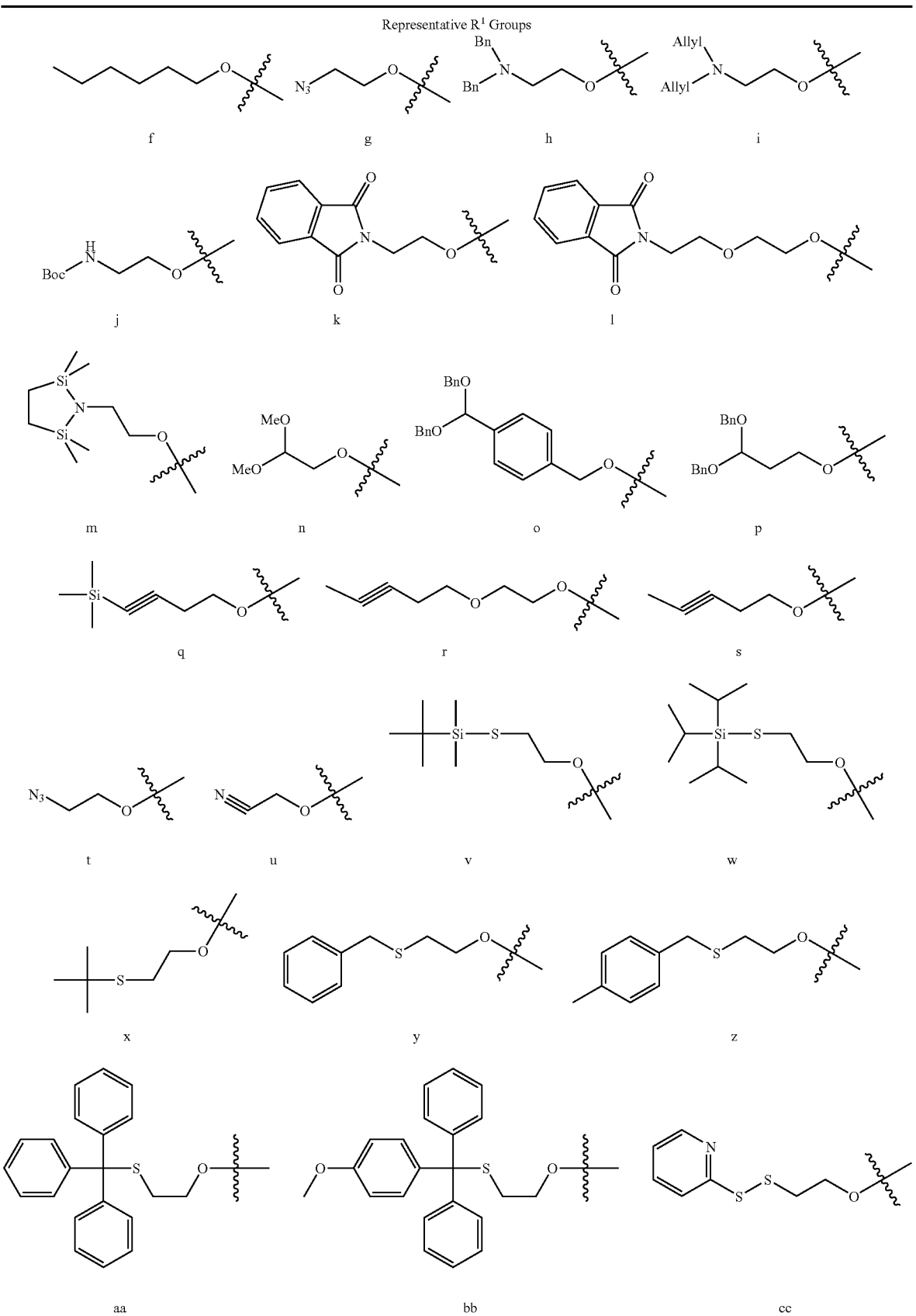

TABLE 1-continued
Representative R¹ Groups
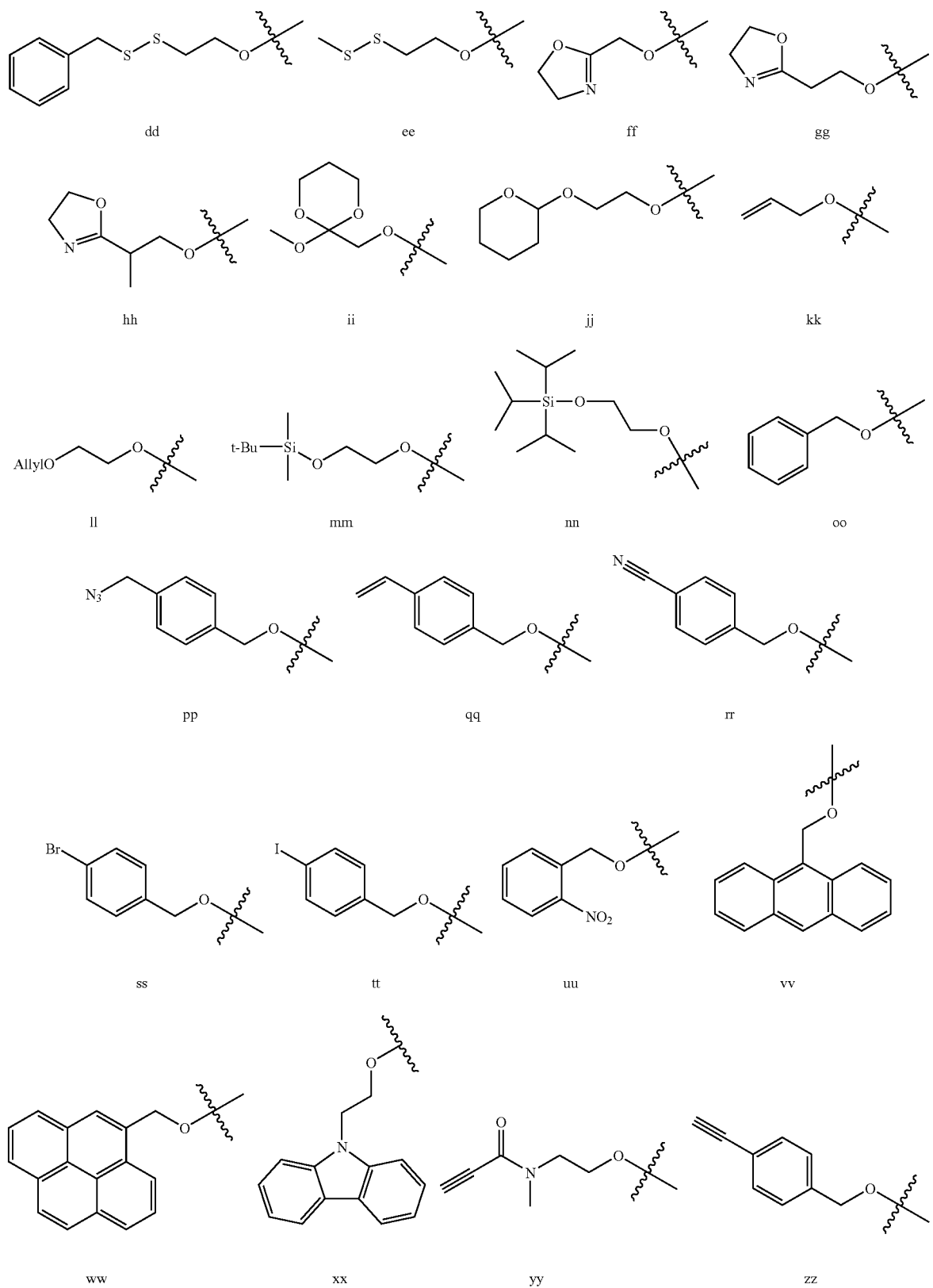

TABLE 1-continued
Representative R[1] Groups
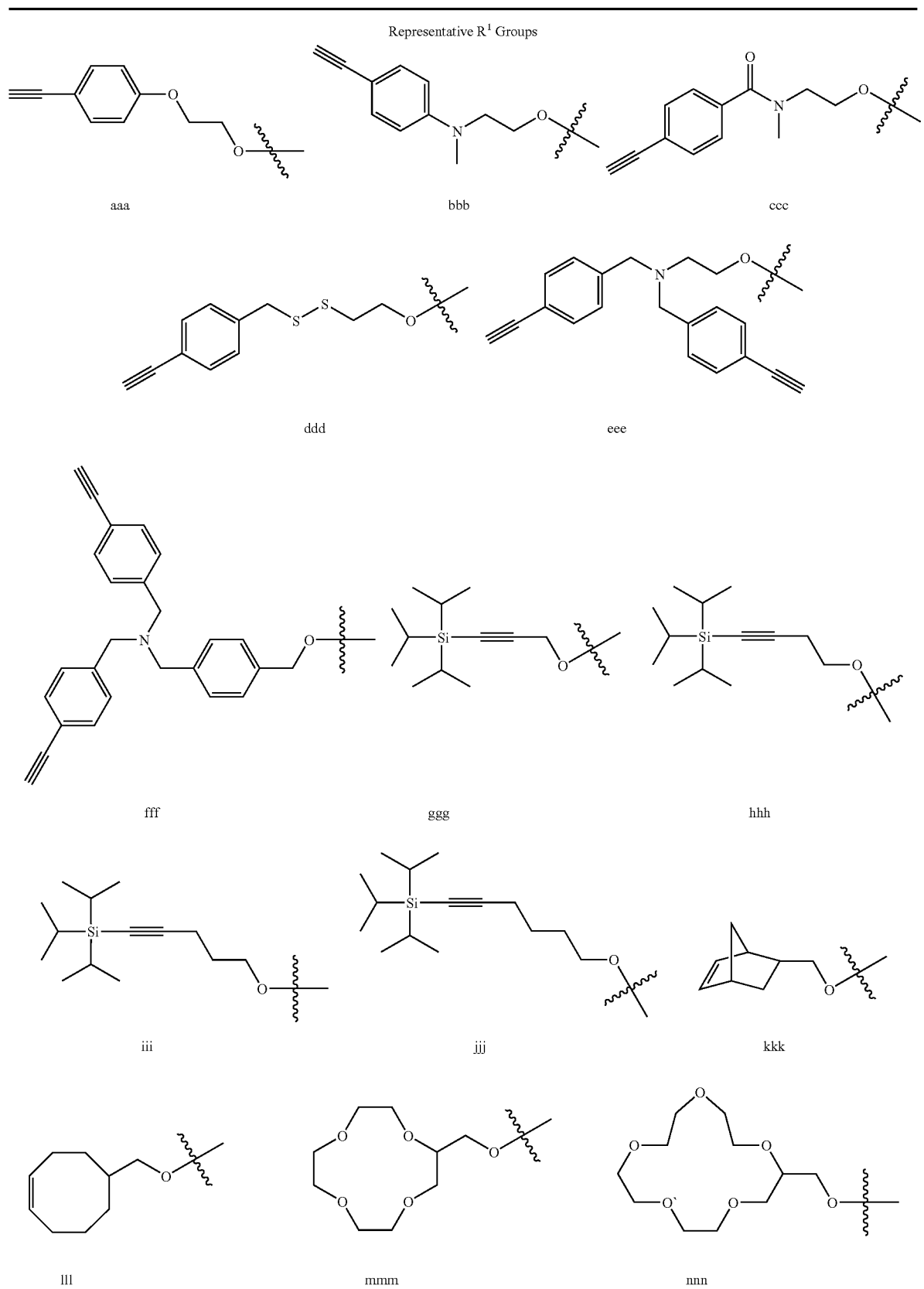

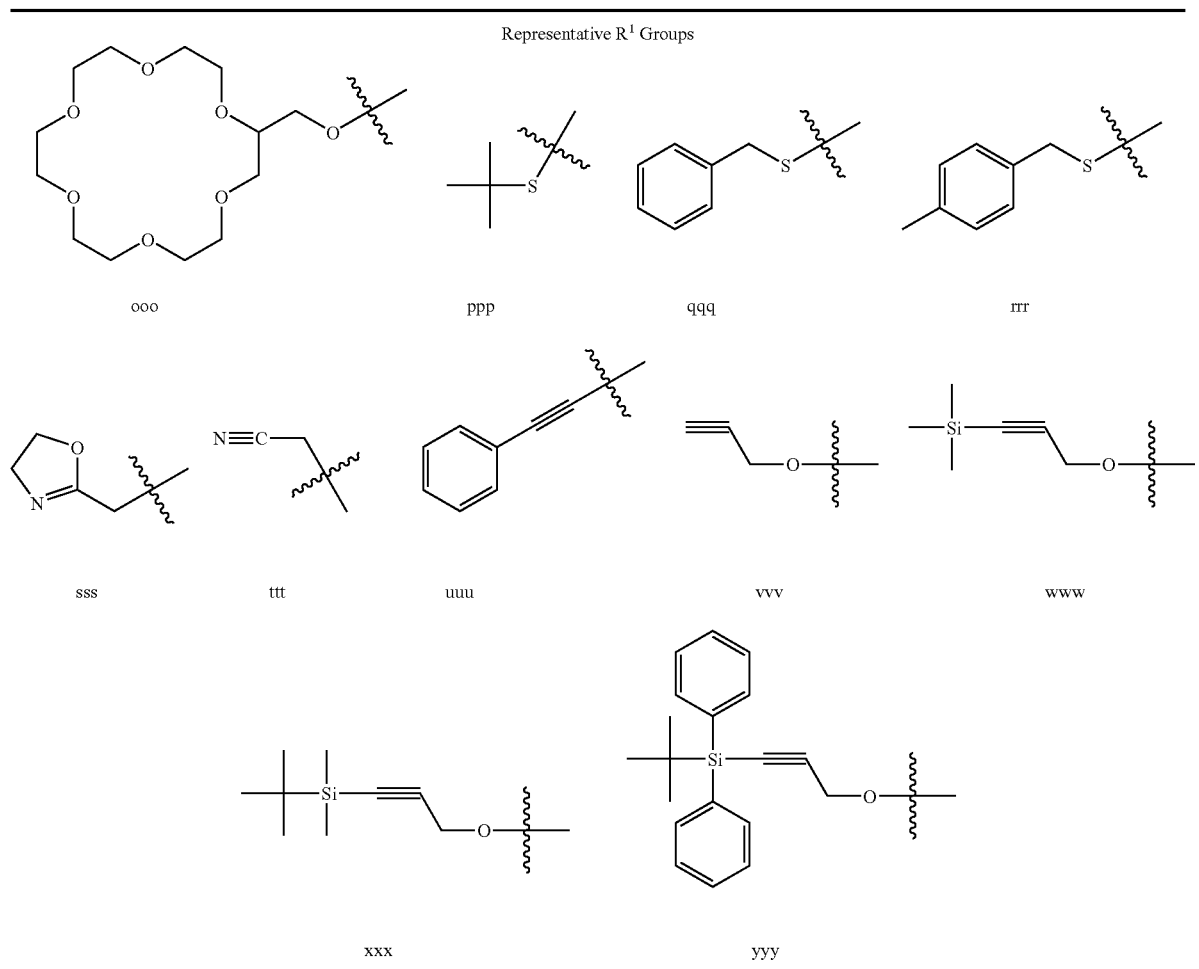

In certain embodiments, the $R^1$ group of any of formulae I, II, II', and III is selected from any of those $R^1$ groups depicted in Table 1, supra. In other embodiments, the $R^1$ group of any of formulae I, II, II', and III is group k or l. In yet other embodiments, the $R^1$ group of any of formulae I, II, II', and III is n, o, cc, dd, ee, f, hh, h, ii, jj, ll, or uu. In still other embodiments, the $R^1$ group of any of formulae I, II, II', and III is h, aa, yy, zz, or aaa.

According to another aspect of the present invention, the $R^1$ group of any of formulae I, II, II', and III is q, r, s, t, www, xxx, or yyy.

In certain embodiments, methods of the present invention are performed in a suitable medium. According to one embodiment, a suitable medium for the preparation of compounds of formula III includes a polar aprotic solvent or a mixture thereof. Examples of polar aprotic solvents include, but are not limited to, DMF, DMSO, THF, hexamethylphosphoramide, glyme, diglyme, MTBE, N-methyl pyrrolidone, and acetonitrile.

As defined generally above, the Q group of formula III is a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—, wherein -Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur. In certain embodiments, Q is a valence bond. In other embodiments, Q is a bivalent, saturated $C_{1-12}$ alkylene chain, wherein 0-6 methylene units of Q are independently replaced by -Cy-, —O—, —NH—, —S—, —OC(O)—, —C(O)O—, or —C(O)—, wherein -Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur.

In certain embodiments, Q is -Cy- (i.e. a $C_1$ alkylene chain wherein the methylene unit is replaced by -Cy-), wherein -Cy- is an optionally substituted 5-8 membered bivalent, saturated, partially unsaturated, or aryl ring having 0-4 heteroatoms independently selected from nitrogen, oxygen, or sulfur. According to one aspect of the present invention, -Cy- is an optionally substituted bivalent aryl group. According to another aspect of the present invention, -Cy- is an optionally substituted bivalent phenyl group. In other embodiments, -Cy- is an optionally substituted 5-8 membered bivalent, saturated carbocyclic ring. In still other embodiments, -Cy- is an optionally substituted 5-8 membered bivalent, saturated heterocyclic ring having 1-2 heteroatoms independently selected from nitrogen, oxygen, or sulfur. Exemplary -Cy- groups include bivalent rings selected from phenyl, pyridyl, pyrimidinyl, cyclohexyl, cyclopentyl, or cyclopropyl.

As defined generally above, the $R^{2a}$ group of formula III is a mono-protected amine, a di-protected amine, —NHR$^4$, —N(R$^4$)$_2$, —NHC(O)R$^4$, —NR$^4$C(O)R$^4$, —NHC(O)NHR$^4$, —NHC(O)N(R$^4$)$_2$, —NR$^4$C(O)NHR$^4$, —NR$^4$C(O)N(R$^4$)$_2$, —NHC(O)OR$^4$, —NR$^4$C(O)OR$^4$, —NHSO$_2$R$^4$, or —NR$^4$SO$_2$R$^4$, wherein each R$^4$ is independently an optionally substituted group selected from aliphatic, a 5-8 membered saturated, partially unsaturated, or aryl ring having 0-4 heteroatoms independently selected from nitrogen, oxygen, or sulfur, an 8-10-membered saturated, partially unsaturated, or aryl bicyclic ring having 0-5 heteroatoms independently selected from nitrogen, oxygen, or sulfur, or a detectable moiety, or two R$^4$ on the same nitrogen atom are taken together with said nitrogen atom to form an optionally substituted 4-7 membered saturated, partially unsaturated, or aryl ring having 1-4 heteroatoms independently selected from nitrogen, oxygen, or sulfur.

In certain embodiments, the $R^{2a}$ group of formula III is —NHR$^4$ or —N(R$^4$)$_2$ wherein each R$^4$ is an optionally substituted aliphatic group. One exemplary R$^4$ group is 5-norbornen-2-yl-methyl. According to yet another aspect of the present invention, the $R^{2a}$ group of formula III is —NHR$^4$ wherein R$^4$ is a C$_{1-6}$ aliphatic group substituted with N$_3$. Examples include —CH$_2$N$_3$. In some embodiments, R$^4$ is an optionally substituted C$_{1-6}$ alkyl group. Examples include methyl, ethyl, propyl, butyl, pentyl, hexyl, 2-(tetrahydropyran-2-yloxy)ethyl, pyridin-2-yldisulfanylmethyl, methyldisulfanylmethyl, (4-acetylenylphenyl)methyl, 3-(methoxycarbonyl)-prop-2-ynyl, methoxycarbonylmethyl, 2-(N-methyl-N-(4-acetylenylphenyl)carbonylamino)-ethyl, 2-phthalimidoethyl, 4-bromobenzyl, 4-chlorobenzyl, 4-fluorobenzyl, 4-iodobenzyl, 4-propargyloxybenzyl, 2-nitrobenzyl, 4-(bis-4-acetylenylbenzyl)aminomethyl-benzyl, 4-propargyloxy-benzyl, 4-dipropargylamino-benzyl, 4-(2-propargyloxy-ethyldisulfanyl)benzyl, 2-propargyloxy-ethyl, 2-propargyldisulfanyl-ethyl, 4-propargyloxy-butyl, 2-(N-methyl-N-propargylamino)ethyl, and 2-(2-dipropargylaminoethoxy)-ethyl. In other embodiments, R$^4$ is an optionally substituted C$_{2-6}$ alkenyl group. Examples include vinyl, allyl, crotyl, 2-propenyl, and but-3-enyl. When R$^4$ group is a substituted aliphatic group, suitable substituents on R$^4$ include N$_3$, CN, and halogen. In certain embodiments, R$^4$ is —CH$_2$CN, —CH$_2$CH$_2$CN, —CH$_2$CH(OCH$_3$)$_2$, 4-(bisbenzyloxymethyl)phenylmethyl, and the like.

According to another aspect of the present invention, the $R^{2a}$ group of formula III is —NHR$^4$ wherein R$^4$ is an optionally substituted C$_{2-6}$ alkynyl group. Examples include —CC≡CH, —CH$_2$C≡CH, —CH$_2$C≡CCH$_3$, and —CH$_2$CH$_2$C≡CH.

In certain embodiments, the R$^2$ group of formula III is —NHR$^4$ wherein R$^4$ is an optionally substituted 5-8-membered aryl ring. In certain embodiments, R$^4$ is optionally substituted phenyl or optionally substituted pyridyl. Examples include phenyl, 4-t-butoxycarbonylaminophenyl, 4-azidomethylphenyl, 4-propargyloxyphenyl, 2-pyridyl, 3-pyridyl, and 4-pyridyl. In certain embodiments, $R^{2a}$ is 4-t-butoxycarbonylaminophenylamino, 4-azidomethylphenamino, or 4-propargyloxyphenylamino.

In certain embodiments, the $R^{2a}$ group of formula III is —NHR$^4$ wherein R$^4$ is an optionally substituted phenyl ring. Suitable substituents on the R$^4$ phenyl ring include halogen; —(CH$_2$)$_{0-4}$R°; —(CH$_2$)$_{0-4}$OR°; —(CH$_2$)$_{0-4}$CH(OR°)$_2$; —(CH$_2$)$_{0-4}$SR°; —(CH$_2$)$_{0-4}$Ph, which may be substituted with R°; —(CH$_2$)$_{0-4}$O(CH$_2$)$_{0-1}$Ph which may be substituted with R°; —CH=CHPh, which may be substituted with R°; —NO$_2$; —CN; —N$_3$; —(CH$_2$)$_{0-4}$N(R°)$_2$; —(CH$_2$)$_{0-4}$N(R°)C(O)R°; —N(R°)C(S)R°; —(CH$_2$)$_{0-4}$N(R°)C(O)NR°$_2$; —N(R°)C(S)NRO$_2$; —(CH$_2$)$_{0-4}$N(R°)C(O)OR°; —N(R°)N(R°)C(O)R°; —N(R°)N(R°)C(O)NR°$_2$; —N(R°)N(R°)C(O)OR°; —(CH$_2$)$_{0-4}$C(O)R°; —C(S)R°; —(CH$_2$)$_{0-4}$C(O)OR°; —(CH$_2$)$_{0-4}$C(O)SR°; —(CH$_2$)$_{0-4}$C(O)OSiR°$_3$; —(CH$_2$)$_{0-4}$OC(O)R°; —(CH$_2$)$_{0-4}$SC(O)R°; —(CH$_2$)$_{0-4}$C(O)NR°$_2$; —C(S)NR°$_2$; —(CH$_2$)$_{0-4}$OC(O)NR°$_2$; —C(O)N(OR°)R°; —C(O)C(O)R°; —C(O)CH$_2$C(O)R°; —C(NOR°)R°; —(CH$_2$)$_{0-4}$SSR°; —(CH$_2$)$_{0-4}$S(O)$_2$R°; —(CH$_2$)$_{0-4}$S(O)$_2$OR°; —(CH$_2$)$_{0-4}$OS(O)$_2$R°; —S(O)$_2$NR°$_2$; —(CH$_2$)$_{0-4}$S(O)R°; —N(R°)S(O)$_2$NR°$_2$; —N(R°)S(O)$_2$R°; —N(OR°)R°; —C(NH)NR°$_2$; —P(O)$_2$R°; —P(O)R°$_2$; —OP(O)R°$_2$; SiR°$_3$; wherein each independent occurrence of R° is as defined herein supra. In other embodiments, the $R^{2a}$ group of formula III is —NHR$^4$ wherein R$^4$ is phenyl substituted with one or more optionally substituted C$_{1-6}$ aliphatic groups. In still other embodiments, R$^4$ is phenyl substituted with vinyl, allyl, acetylenyl, —CH$_2$N$_3$, —CH$_2$CH$_2$N$_3$, —CH$_2$C≡CCH$_3$, or —CH$_2$C≡CH.

In certain embodiments, the $R^{2a}$ group of formula III is —NHR$^4$ wherein R$^4$ is phenyl substituted with N$_3$, N(R°)$_2$, CO$_2$R°, or C(O)R° wherein each R° is independently as defined herein supra.

In certain embodiments, the $R^{2a}$ group of formula III is —N(R$^4$)$_2$ wherein each R$^4$ is independently an optionally substituted group selected from aliphatic, phenyl, naphthyl, a 5-6 membered aryl ring having 1-4 heteroatoms independently selected from nitrogen, oxygen, or sulfur, or a 8-10 membered bicyclic aryl ring having 1-5 heteroatoms independently selected from nitrogen, oxygen, or sulfur, or a detectable moiety.

In other embodiments, the $R^{2a}$ group of formula III is —N(R$^4$)$_2$ wherein the two R$^4$ groups are taken together with said nitrogen atom to form an optionally substituted 4-7 membered saturated, partially unsaturated, or aryl ring having 1-4 heteroatoms independently selected from nitrogen, oxygen, or sulfur. According to another embodiment, the two R$^4$ groups are taken together to form a 5-6-membered saturated or partially unsaturated ring having one nitrogen wherein said ring is substituted with one or two oxo groups. Such $R^{2a}$ groups include, but are not limited to, phthalimide, maleimide and succinimide.

In certain embodiments, the $R^{2a}$ group of formula III is a mono-protected or di-protected amino group. In certain embodiments $R^{2a}$ is a mono-protected amine. In certain embodiments $R^{2a}$ is a mono-protected amine selected from aralkylamines, carbamates, allyl amines, or amides. Exemplary mono-protected amino moieties include t-butyloxycarbonylamino, ethyloxycarbonylamino, methyloxycarbonylamino, trichloroethyloxycarbonylamino, allyloxycarbonylamino, benzyloxocarbonylamino, allylamino, benzylamino, fluorenylmethylcarbonyl, formamido, acetamido, chloroacetamido, dichloroacetamido, trichloroacetamido, phenylacetamido, trifluoroacetamido, benzamido, and t-butyldiphenylsilylamino. In other embodiments $R^{2a}$ is a di-protected amine. Exemplary di-protected amino moieties include di-benzylamino, di-allylamino, phthalimide, maleimido, succinimido, pyrrolo, 2,2,5,5-tetramethyl-[1,2,5]azadisilolidino, and azido. In certain embodiments, the $R^{2a}$ moiety is phthalimido. In other embodiments, the $R^{2a}$ moiety is mono- or di-benzylamino or mono- or di-allylamino.

In certain embodiments, the $R^{2a}$ group of formula III comprises a group suitable for Click chemistry. One of ordinary skill in the art would recognize that certain $R^{2a}$ groups of the present invention are suitable for Click chemistry.

Compounds of formula III having $R^{2a}$ groups comprising groups suitable for Click chemistry are useful for conjugating said compounds to biological systems such as proteins, viruses, and cells, to name but a few. After conjugation to a biomolecule, drug, cell, substrate, or the like, the other end-group functionality, corresponding to the $R^1$ moiety of formula III, can be used to attach targeting groups for cell specific delivery including, but not limited to, fluorescent dyes, covalent attachment to surfaces, and incorporation into hydrogels. Thus, another embodiment of the present invention provides a method of conjugating the $R^{2a}$ group of a compound of formula III to a macromolecule via Click chemistry. Yet another embodiment of the present invention provides a macromolecule conjugated to a compound of formula III via the $R^{2a}$ group.

According to one embodiment, the $R^{2a}$ group of formula III is an azide-containing group. According to another embodiment, the $R^{2a}$ group of formula III is an alkyne-containing group.

In certain embodiments, the $R^{2a}$ group of formula III has a terminal alkyne moiety. In other embodiments, the $R^{2a}$ group of formula III is an alkyne-containing moiety having an electron withdrawing group. Accordingly, in such embodiments, the $R^{2a}$ group of formula III is

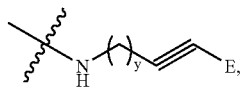

wherein E is an electron withdrawing group and y is 0-6. Such electron withdrawing groups are known to one of ordinary skill in the art. In certain embodiments, E is an ester. In other embodiments, the $R^{2a}$ group of formula III is

wherein E is an electron withdrawing group, such as a —C(O)O— group and y is 0-6.

According to another embodiment, the present invention provides compounds of formula III, as described above, wherein said compounds have a polydispersity index ("PDI") of about 1.0 to about 1.2. According to another embodiment, the present invention provides compounds of formula III, as described above, wherein said compound has a polydispersity index ("PDI") of about 1.03 to about 1.15. According to yet another embodiment, the present invention provides compounds of formula III, as described above, wherein said compound has a polydispersity index ("PDI") of about 1.10 to about 1.12. According to other embodiments, the present invention provides compounds of formula III having a PDI of less than about 1.10.

In certain embodiments, the present invention provides compounds of formula III, as described above, wherein n is about 225. In other embodiments, n is about 200 to about 300. In still other embodiments, n is about 200 to about 250. In still other embodiments, n is about 100 to about 150. In still other embodiments, n is about 400 to about 500.

Exemplary $R^{2a}$ groups of formula III are set forth in Table 2, below.

TABLE 2

Representative $R^{2a}$ Groups

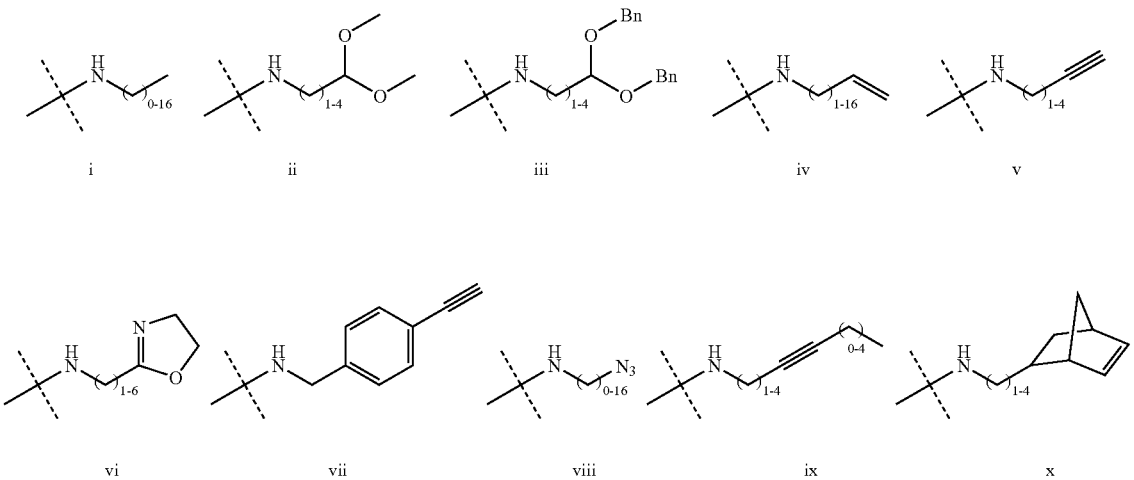

TABLE 2-continued
Representative $R^{2a}$ Groups
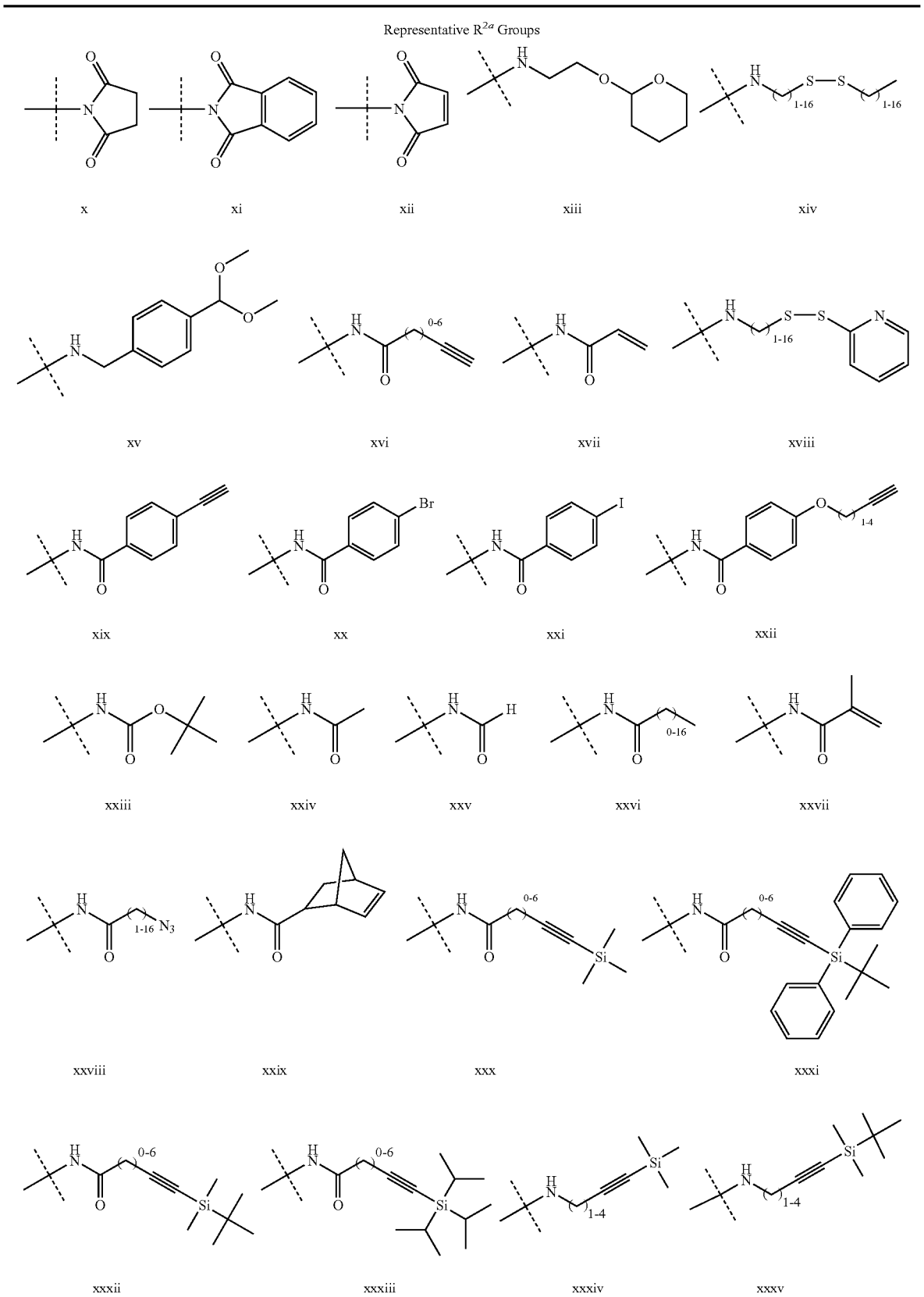

TABLE 2-continued

Representative R$^{2a}$ Groups

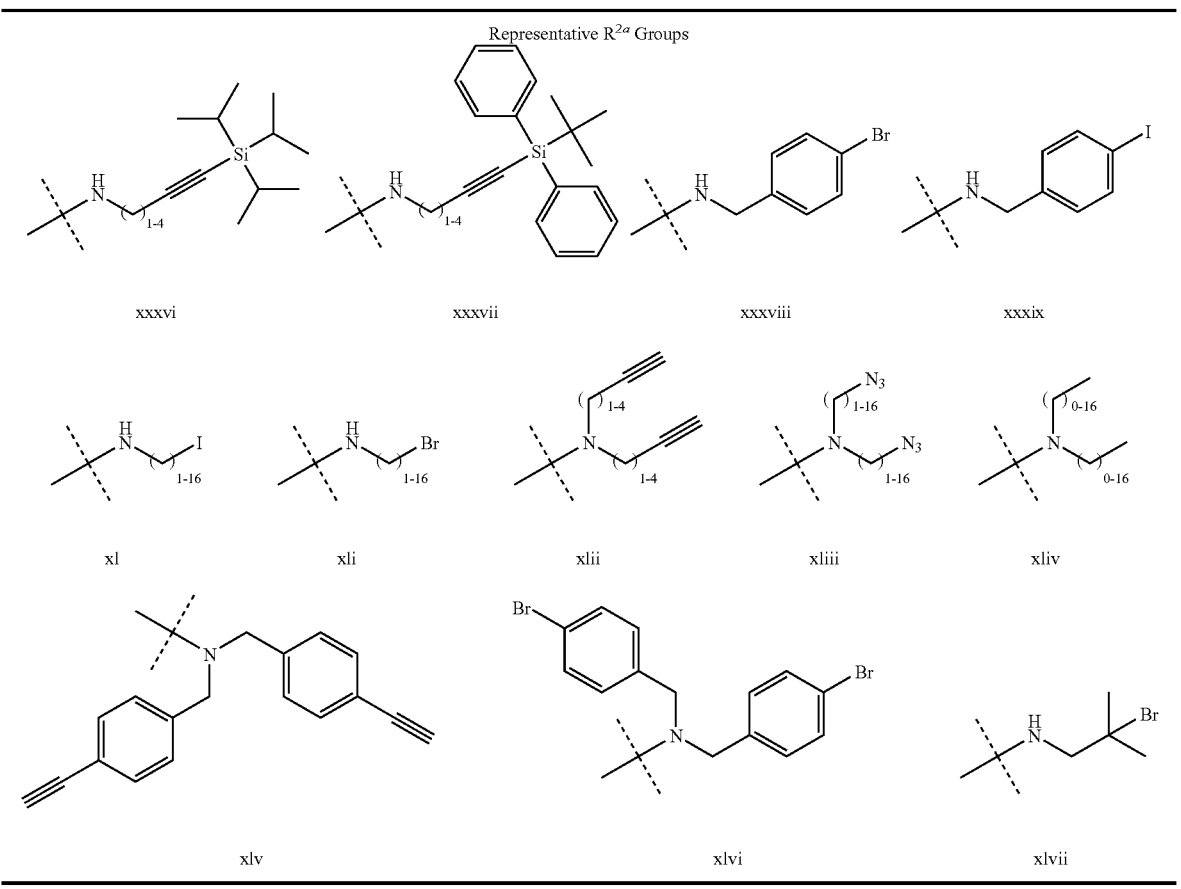

In certain embodiments, the R$^{2a}$ group of formula III is selected from any of those R$^{2a}$ groups depicted in Table 2, supra. In other embodiments, the R$^{2a}$ group of formula III is group v, viii, xvi, xix, xxii, xxx, xxxi, xxxii, xxxiii, xxxiv, xxxv, xxxvi, xxxvii, or xlii. In yet other embodiments, the R$^{2a}$ group of formula III is xv, xviii, xx, xxi, xxxviii, or xxxix.

As described above, one step in the preparation of a compound of formula III comprises terminating the living polymer chain-end of the compound of formula II' with a suitable polymerization terminator to afford a compound of formula III. One of ordinary skill in the art would recognize that the polymerization terminator provides the R$^{2a}$ group of formula III. Accordingly, embodiments directed to the R$^{2a}$ group of formula III, as set forth above and herein, are also directed to the suitable polymerization terminator itself, and similarly, embodiments directed to the suitable polymerization terminator, as set forth above and herein, are also directed to the R$^{2a}$ group of formula III.

As described above, compounds of formula III are prepared from compounds of formula II' by treatment with a suitable terminating agent. One of ordinary skill in the art would recognize that compounds of formula III are also readily prepared directly from compounds of formula II. In such cases, and in certain embodiments, the compound of formula II is treated with a base to form the freebase compound prior to, or concurrent with, treatment with the suitable terminating agent. For example, it is contemplated that a compound of formula II is treated with a base and suitable terminating agent in the same reaction to form a compound of formula III. In such cases, it is also contemplated that the base may also serve as the reaction medium.

One of ordinary skill in the art would also recognize that the above method for preparing a compound of formula III may be performed as a "one-pot" synthesis of compounds of formula III that utilizes the living polymer chain-end to incorporate the R$^2$ group of formula III. Alternatively, compounds of formula III may also be prepared in a multi-step fashion. For example, the living polymer chain-end of a compound of formula II may be quenched to afford an amino group which may then be further derivatized, according to known methods, to afford a compound of formula III.

One of ordinary skill in the art will recognize that a variety of polymerization terminating agents are suitable for the present invention. Such polymerization terminating agents include any R$^{2a}$-containing group capable of reacting with the living polymer chain-end of a compound of formula II, or the free-based amino group of formula II', to afford a compound of formula III. Thus, polymerization terminating agents include anhydrides, and other acylating agents, and groups that contain a suitable leaving group L that is subject to nucleophilic displacement.

Alternatively, compounds of formula II or II' may be coupled to carboxylic acid-containing groups to form an amide thereof. Thus, it is contemplated that the amine group of formula II or II' may be coupled with a carboxylic acid moiety to afford compounds of formula III wherein R$^{2a}$ is —NHC(O)R$^4$. Such coupling reactions are well known in the art. In certain embodiments, the coupling is achieved with a suitable coupling reagent. Such reagents are well known in the art and include, for example, DCC and EDC, among others. In other embodiments, the carboxylic acid moiety is activated for use in the coupling reaction. Such activation includes formation of an acyl halide, use of a Mukaiyama reagent, and the like. These methods, and others, are known to one of ordinary skill in the art, e.g., see, "Advanced Organic Chemistry," Jerry March, $5^{th}$ Ed., pp. 351-357, John Wiley and Sons, N.Y.

A "suitable leaving group that is subject to nucleophilic displacement" is a chemical group that is readily displaced by a desired incoming chemical moiety. Suitable leaving groups are well known in the art, e.g., see, March. Such leaving groups include, but are not limited to, halogen, alkoxy, sulphonyloxy, optionally substituted alkylsulphonyloxy, optionally substituted alkenylsulfonyloxy, optionally substituted arylsulfonyloxy, and diazonium moieties. Examples of suitable leaving groups include chloro, iodo, bromo, fluoro, methanesulfonyloxy(mesyloxy), tosyloxy, triflyloxy, nitrophenylsulfonyloxy(nosyloxy), and bromo-phenylsulfonyloxy(brosyloxy).

According to an alternate embodiment, the suitable leaving group may be generated in situ within the reaction medium.

III is performed by methods suitable for that protecting group. Such methods are described in detail in Green.

In other embodiments, the $R^{2a}$ group of formula III is incorporated by derivatization of the amino group of formula II or II' via anhydride coupling, optionally in the presence of base as appropriate. One of ordinary skill in the art would recognize that anhydride polymerization terminating agents containing an azide, an aldehyde, a hydroxyl, an alkyne, and other groups, or protected forms thereof, may be used to incorporate said azide, said aldehyde, said protected hydroxyl, said alkyne, and other groups into the $R^{2a}$ group of compounds of formula III. It will also be appreciated that such anhydride polymerization terminating agents are also suitable for terminating the living polymer chain-end of a compound of formula II. Such anhydride polymerization terminating agents include, but are not limited to, those set forth in Table 3, below.

TABLE 3

Representative Anhydride Polymerization Terminating Agents

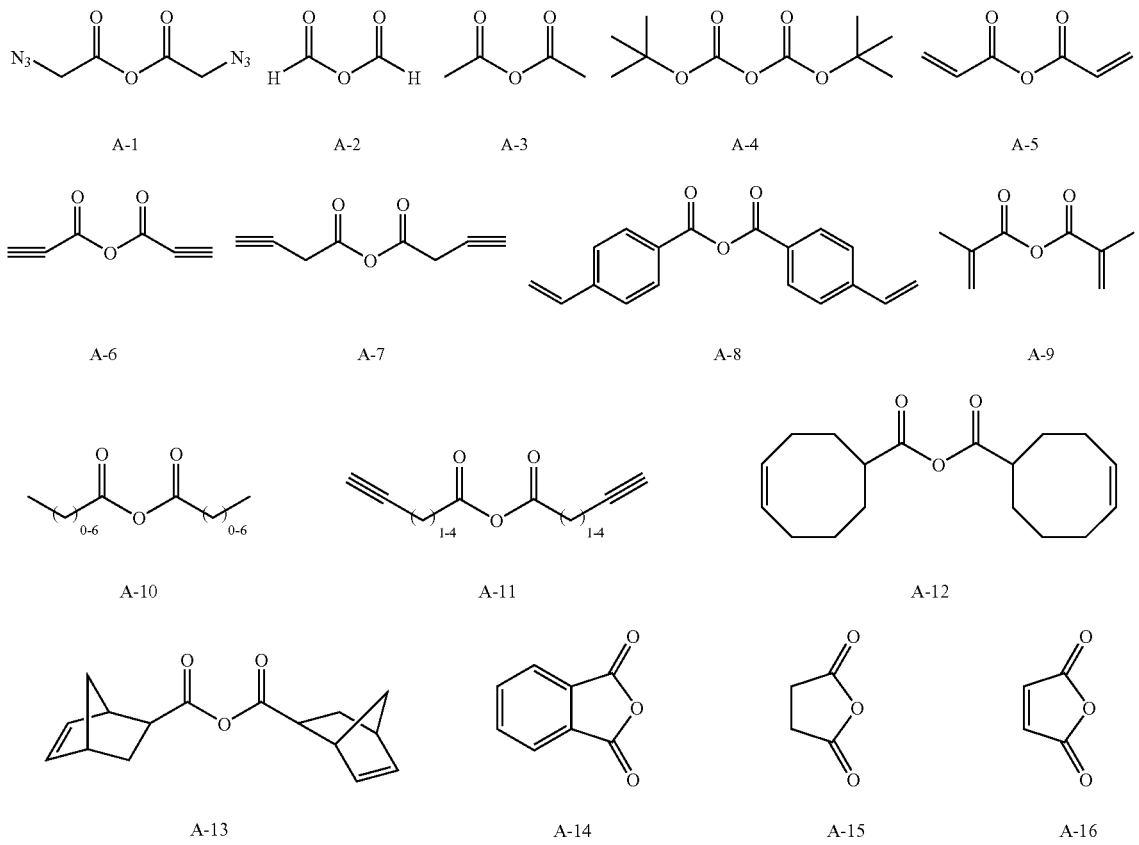

For example, a leaving group may be generated in situ from a precursor of that compound wherein said precursor contains a group readily replaced by said leaving group in situ.

Alternatively, when the $R^{2a}$ group of formula III is a mono- or di-protected amine, the protecting group(s) is removed and that functional group may be derivatized or protected with a different protecting group. It will be appreciated that the removal of any protecting group of the $R^{2a}$ group of formula In other embodiments, the $R^4$ moiety of the $R^{2a}$ group of formula III is incorporated by derivatization of the amino group of formula II or II' via reaction with a polymerization terminating agent having a suitable leaving group. It will also be appreciated that such polymerization terminating agents are also suitable for terminating the living polymer chain-end of a compound of formula II. Examples of these polymerization terminating agents include, but are not limited to, those set forth in Table 4, below.

TABLE 4
Representative Polymerization Terminating Agents
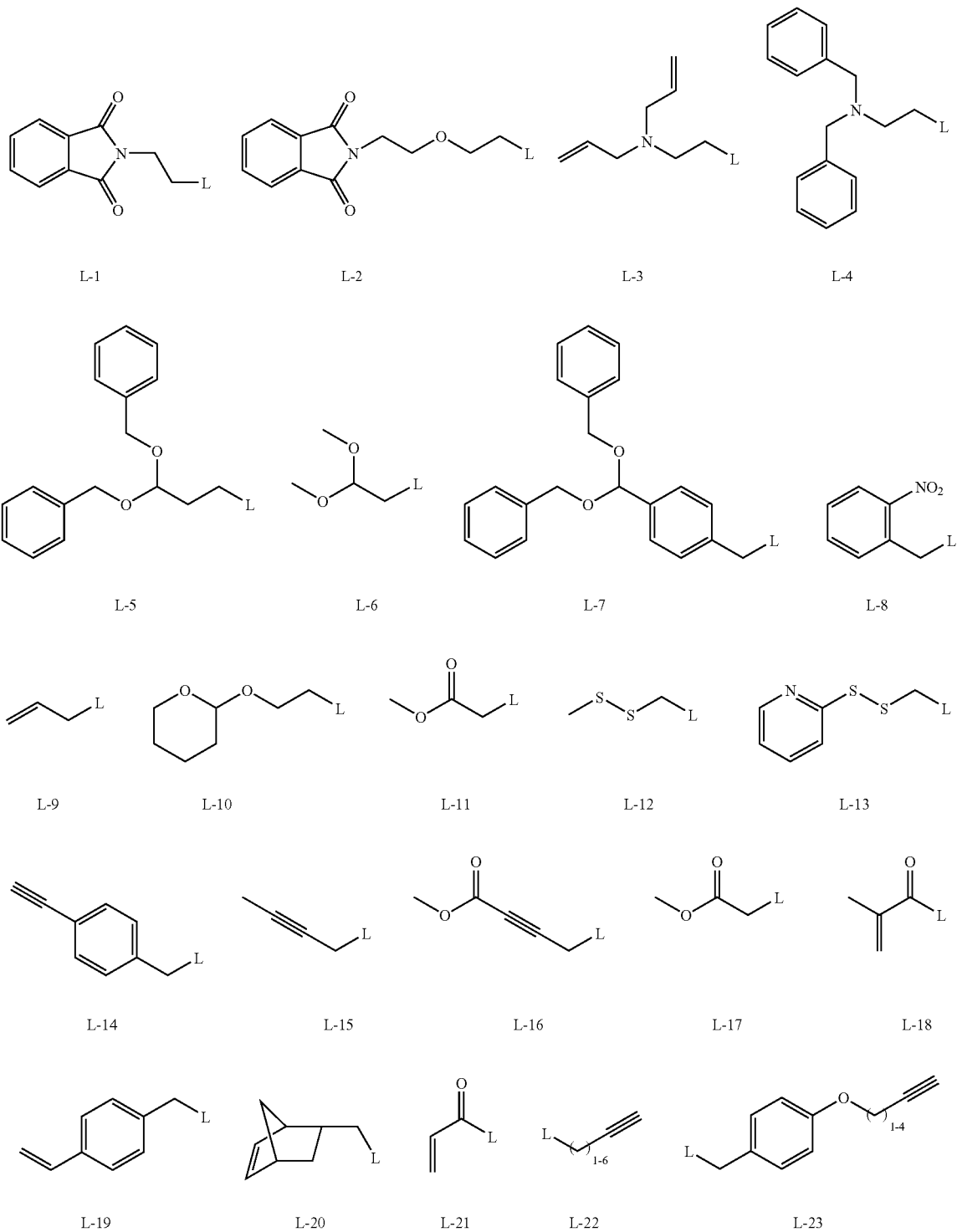

TABLE 4-continued
Representative Polymerization Terminating Agents
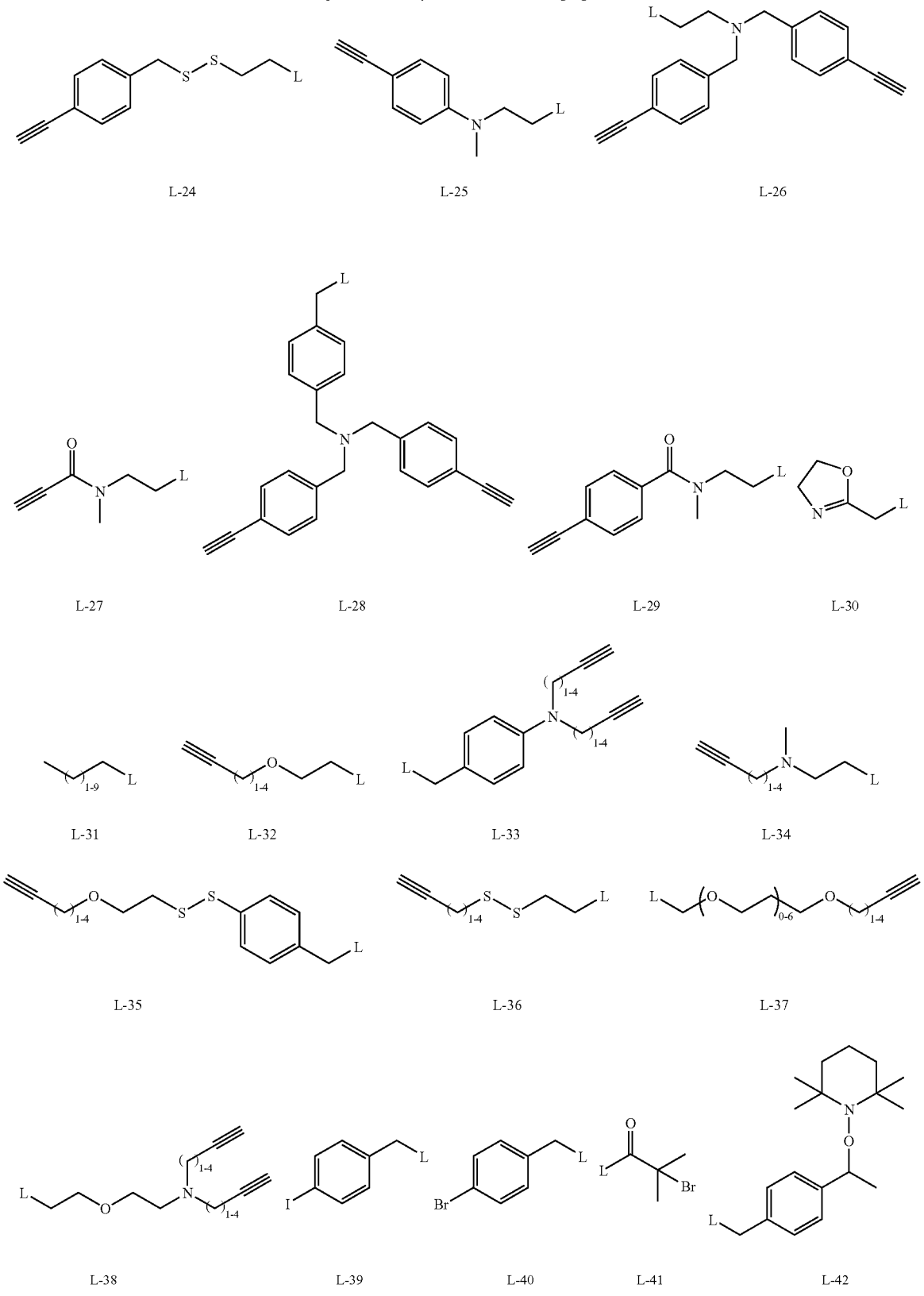

wherein each L is a suitable leaving group as defined above and in classes and subclasses as described above and herein.
Exemplary compounds of formula II are set forth in Table 5, below.
TABLE 5
Representative compounds of formula II
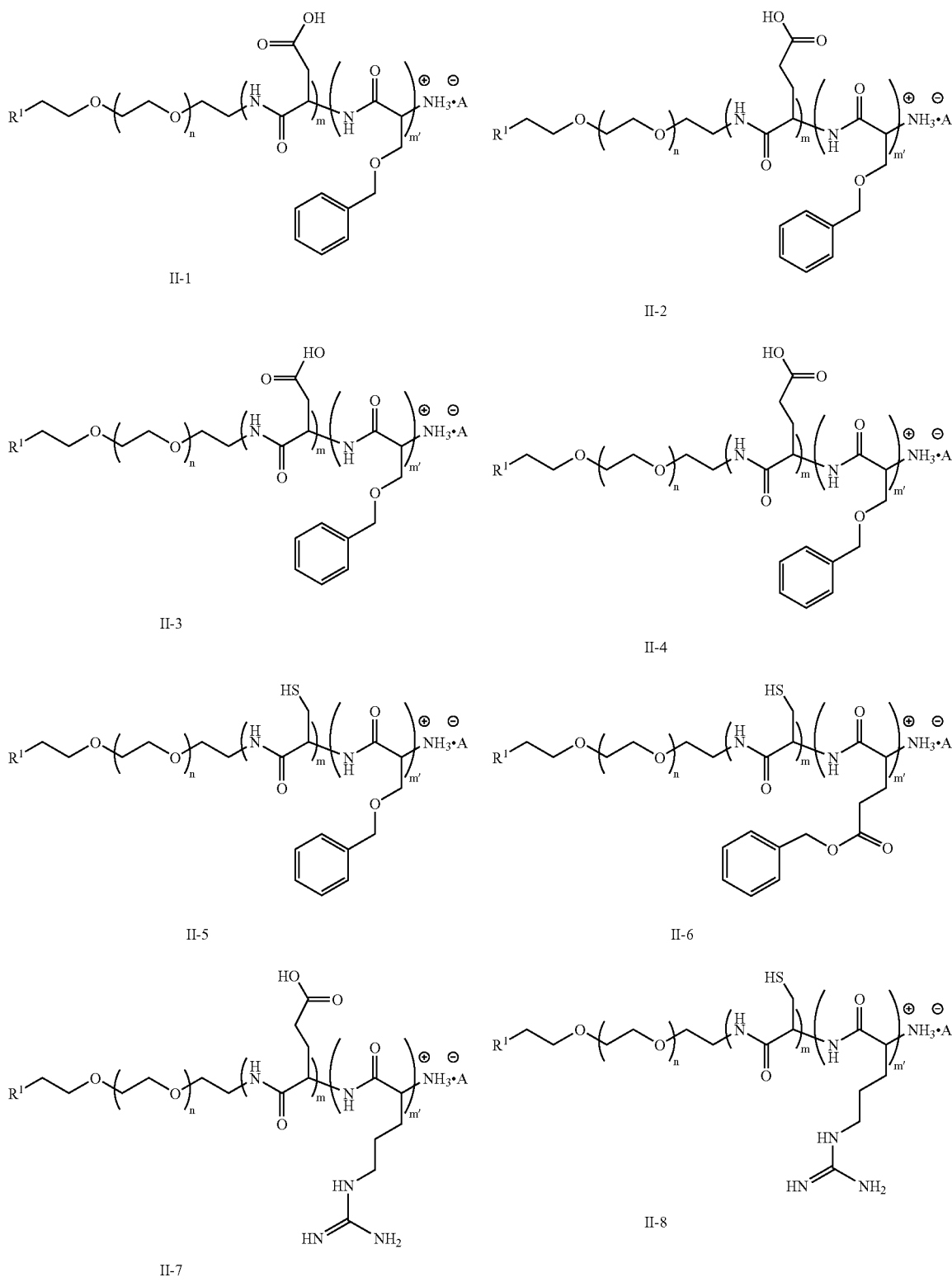

TABLE 5-continued
Representative compounds of formula II
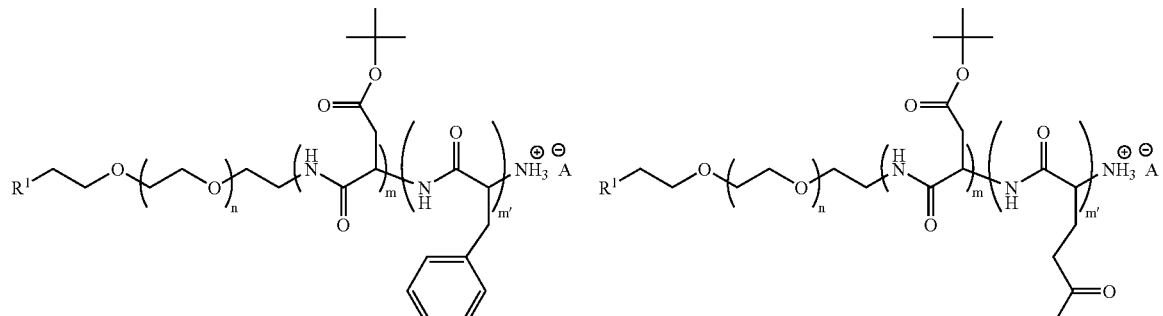
II-9
II-10
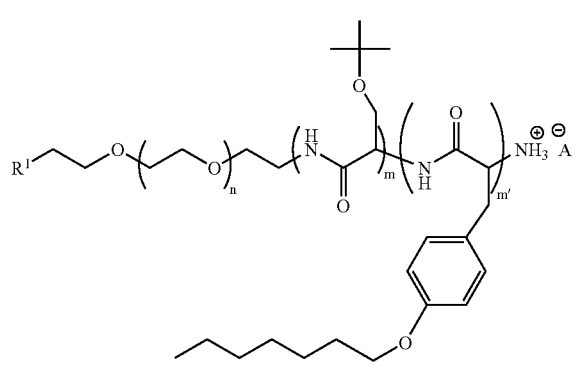
II-11
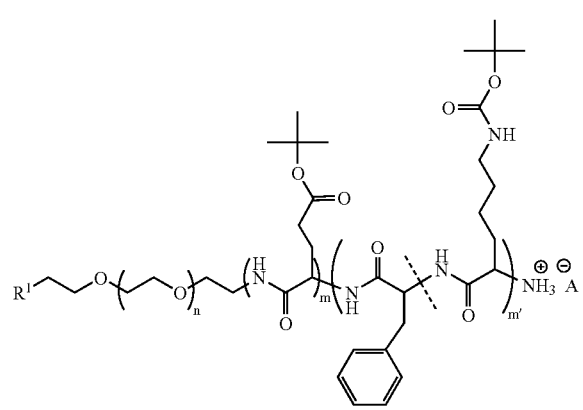
II-12
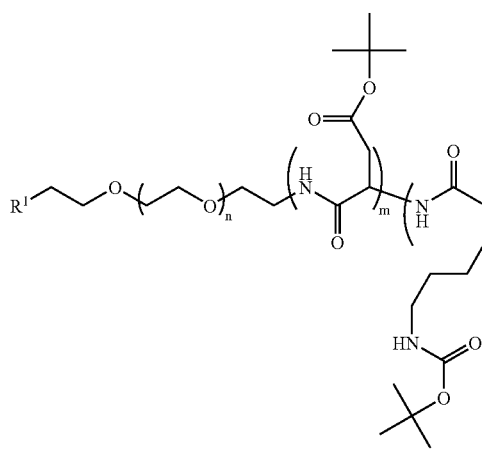
II-13
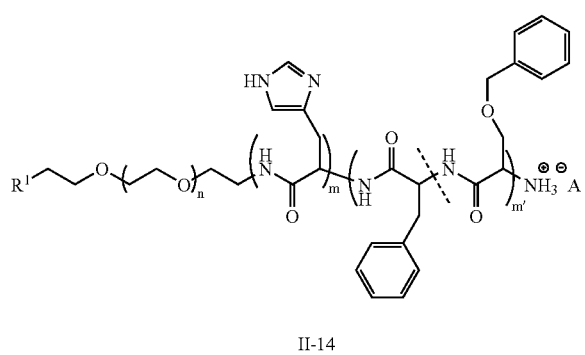
II-14

TABLE 5-continued

Representative compounds of formula II

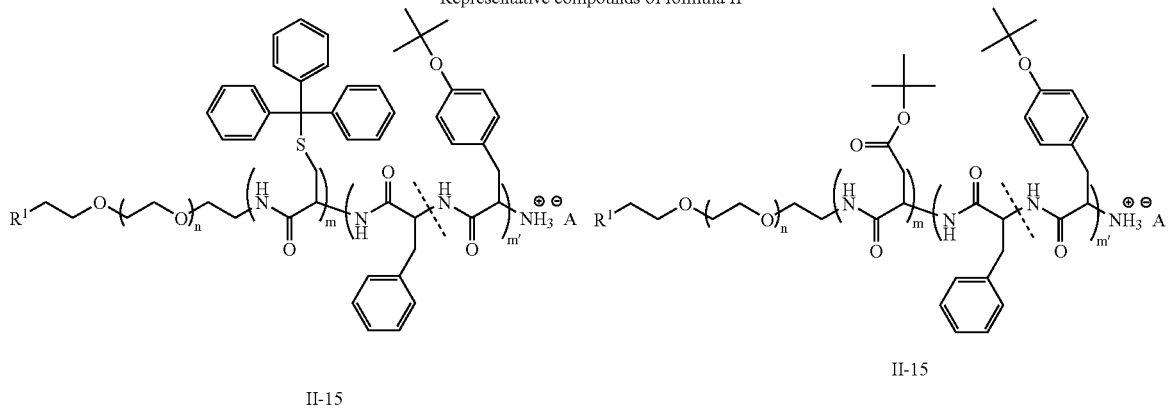

II-15

II-15 wherein each $R^1$, n, m, m', and A are as defined above and in classes and subclasses as described above and herein.

According to another embodiment, the present invention provides compounds of formula II, as described above, wherein said compounds have a polydispersity index ("PDI") of about 1.0 to about 1.2. According to another embodiment, the present invention provides compounds of formula II, as described above, wherein said compound has a polydispersity index ("PDI") of about 1.03 to about 1.15. According to yet another embodiment, the present invention provides compounds of formula II, as described above, wherein said compound has a polydispersity index ("PDI") of about 1.10 to about 1.12. According to other embodiments, the present invention provides compounds of formula II having a PDI of less than about 1.10.

In certain embodiments, the present invention provides compounds of formula II, as described above, wherein n is about 225. In other embodiments, n is about 200 to about 300. In still other embodiments, n is about 200 to about 250. In still other embodiments, n is about 100 to about 150. In still other embodiments, n is about 400 to about 500.

Exemplary compounds of formula II' are set forth in Table 6, below.

TABLE 6

Representative compounds of formula II'

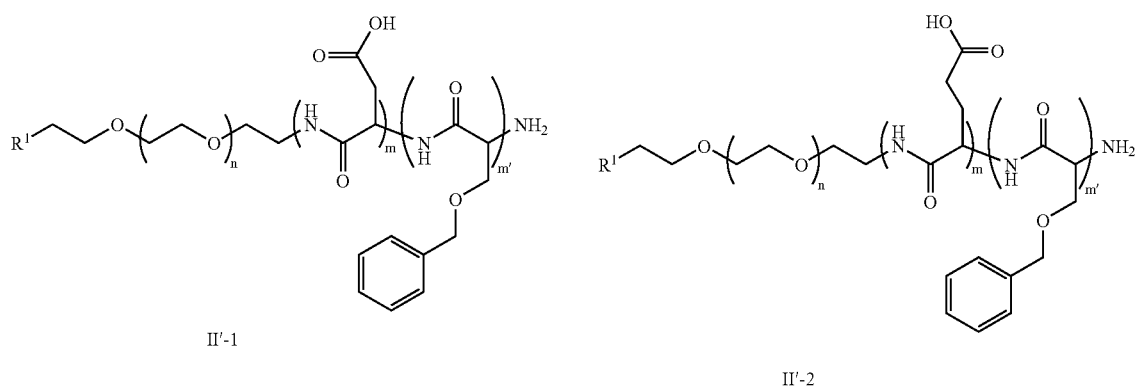

II'-1

II'-2

TABLE 6-continued
Representative compounds of formula II'
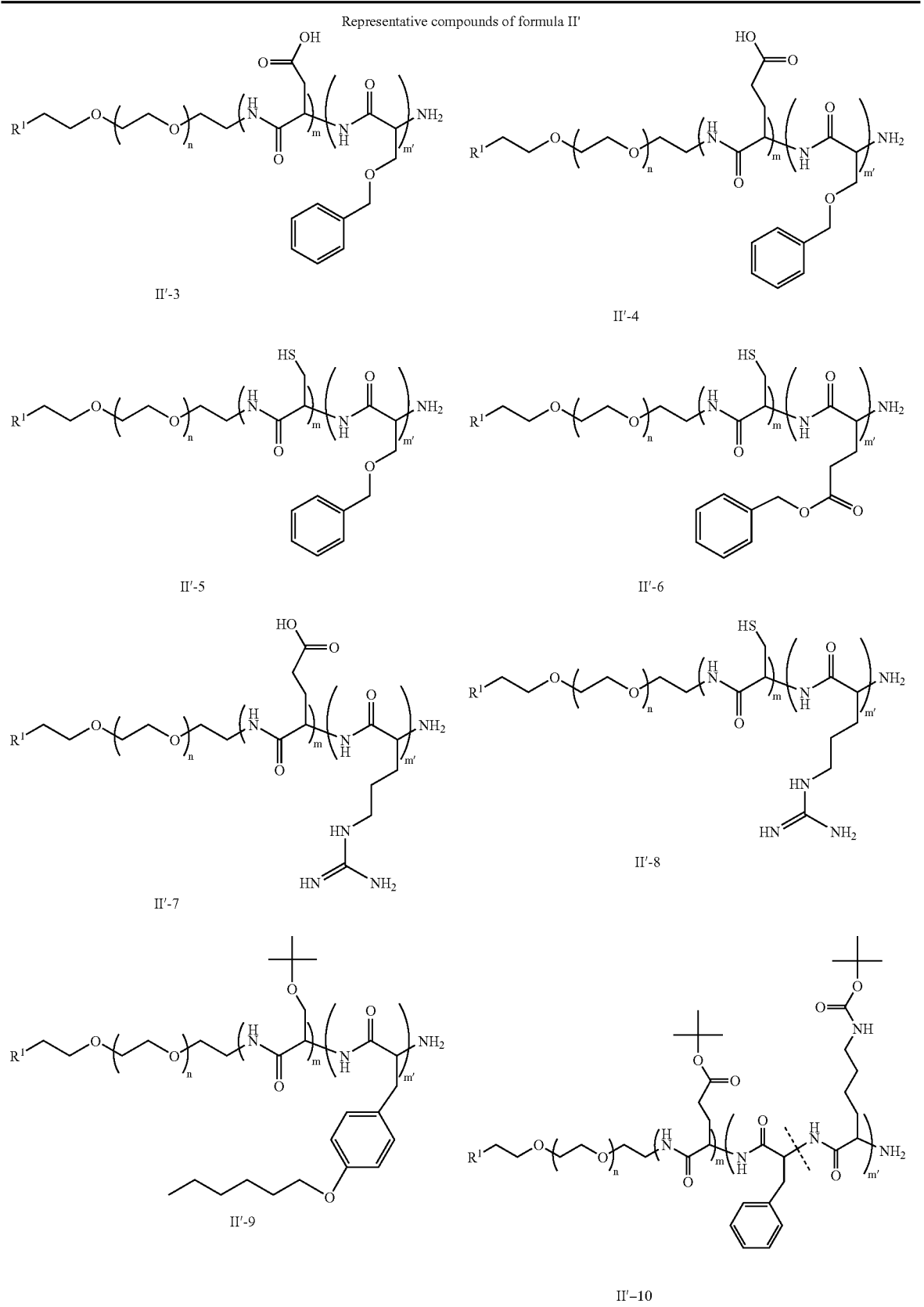

TABLE 6-continued

Representative compounds of formula II'

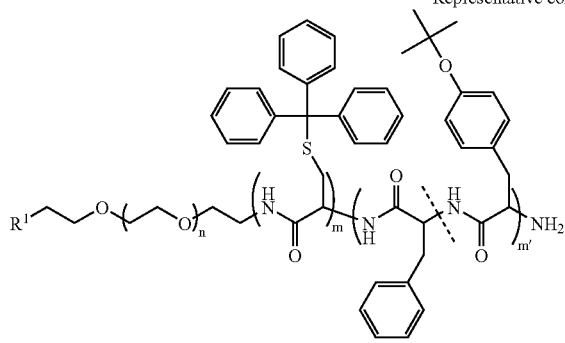

II'-11

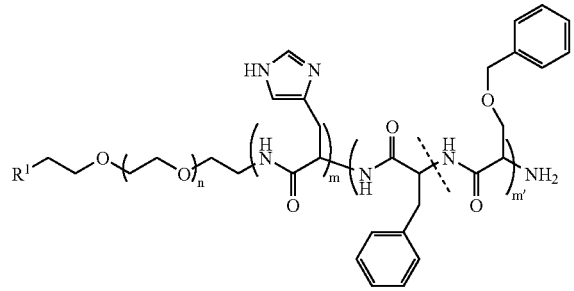

II'-12

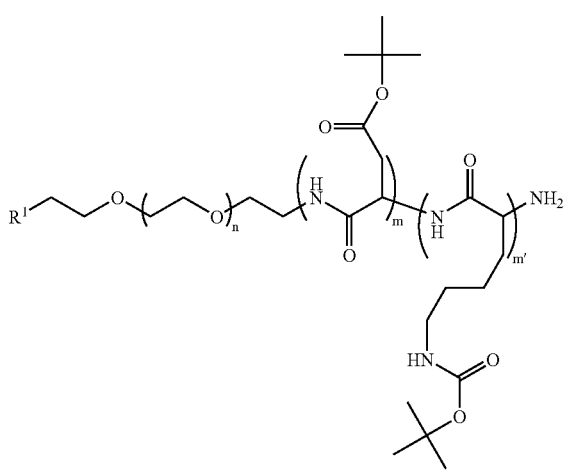

II'-13

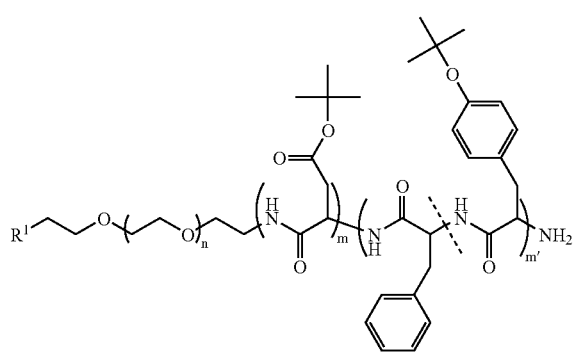

II'-14

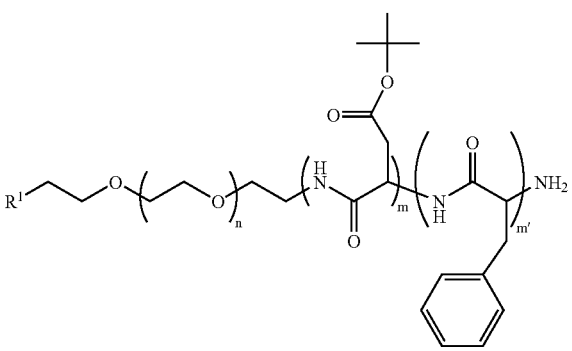

II'-15

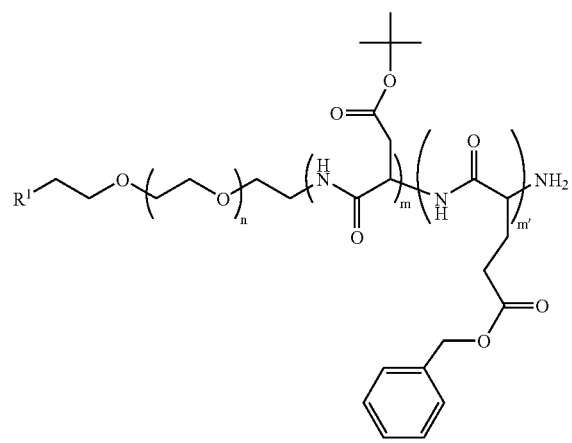

II'-16 wherein each $R^1$, n, m, and m' are as defined above and in classes and subclasses as described above and herein.

According to another embodiment, the present invention provides compounds of formula II', as described above, wherein said compounds have a polydispersity index ("PDI") of about 1.0 to about 1.2. According to another embodiment, the present invention provides compounds of formula II', as described above, wherein said compound has a polydispersity index ("PDI") of about 1.03 to about 1.15. According to yet another embodiment, the present invention provides compounds of formula II', as described above, wherein said compound has a polydispersity index ("PDI") of about 1.10 to about 1.12. According to other embodiments, the present invention provides compounds of formula II' having a PDI of less than about 1.10.

In certain embodiments, the present invention provides compounds of formula II', as described above, wherein n is about 225. In other embodiments, n is about 200 to about 300. In still other embodiments, n is about 200 to about 250. In still other embodiments, n is about 100 to about 150. In still other embodiments, n is about 400 to about 500.

Alternatively, and as described in detail in U.S. Ser. No. 11/256,735, suitably protected PEG-amines may be formed by initiating the polymerization of ethylene oxide with a compound that contains a suitably protected amino moiety. The PEG formed therefrom may be terminated by any manner known in the art, including those described in U.S. Ser. No. 11/256,735. Upon termination of the polymerization, the protected amino moiety is then deprotected and an amine salt formed. This amine salt is then used to initiate the polymerization of NCAs as described herein.

Accordingly, an alternate method of the present invention provides a method of preparing a compound of formula IV:

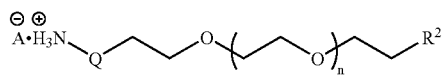

wherein:

A is a suitable acid anion;

n is 10-2500;

Q is a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—, wherein:

-Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur;

$R^2$ is halogen, $N_3$, CN, a mono-protected amine, a di-protected amine, a protected hydroxyl, a protected aldehyde, a protected thiol, —NHR$^4$, —N(R$^4$)$_2$, —SR$^4$, —O(CH$_2$CH$_2$O)$_q$(CH$_2$)$_r$R$^5$, —OC(O)R$^4$, or —OS(O)$_2$R$^4$;

q and r are each independently 0-4;

each $R^4$ is independently an optionally substituted group selected from aliphatic, a 5-8 membered saturated, partially unsaturated, or aryl ring having 0-4 heteroatoms independently selected from nitrogen, oxygen, or sulfur, an 8-10-membered saturated, partially unsaturated, or aryl bicyclic ring having 0-5 heteroatoms independently selected from nitrogen, oxygen, or sulfur, or a detectable moiety, or:

two $R^4$ on the same nitrogen atom are taken together with said nitrogen atom to form an optionally substituted 4-7 membered saturated, partially unsaturated, or aryl ring having 1-4 heteroatoms independently selected from nitrogen, oxygen, or sulfur; and $R^5$ is hydrogen, halogen, CN, a mono-protected amine, a di-protected amine, a protected aldehyde, a protected hydroxyl, a protected carboxylic acid, a protected thiol, or an optionally substituted group selected from aliphatic, a 5-8 membered saturated, partially unsaturated, or aryl ring having 0-4 heteroatoms independently selected from nitrogen, oxygen, or sulfur, an 8-10 membered saturated, partially unsaturated, or aryl bicyclic ring having 0-5 heteroatoms independently selected from nitrogen, oxygen, or sulfur, or a detectable moiety, comprising the steps of:

(a) providing a compound of formula A:

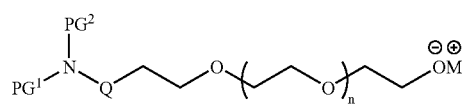

wherein:

n is 10-2500;

M is the cation of a suitable metal;

each of $PG^1$ and $PG^2$ is hydrogen or a suitable amino protecting group, or $PG^1$ and $PG^2$ are taken together to form a cyclic amino protecting group, provided that at least one of $PG^1$ and $PG^2$ is a suitable amino protecting group; and Q is a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—, wherein:

-Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur;

(b) terminating the living polymer chain-end of the compound of formula A with a suitable polymerization terminator; and (c) deprotecting the amino group and forming a salt thereof to form a compound of formula IV.

As described generally above, the M moiety of formula A is the cation of a metal capable, with its corresponding anion, of affecting the polymerization of ethylene oxide. In certain embodiments, M is K$^+$, Cs$^+$, Na$^+$, Al$^{(3+)}$, or Y$^+$. In other embodiments, M is K$^+$ or Na$^+$. According to another aspect of the present invention, M is K$^+$. In other embodiments M is a transition metal such as Sn, Pb, Zn, Cd, Cu, Pd, Mn, Cr, Mo, W, Fe, Co or organometallic complexes of these metals. In yet other embodiments, M is a rare-earth metal such as Sc, La, Pr, Nd, Sm, Eu, Gd, Dy, Yb or organometallic complexes of these metals.

In another embodiment, the present invention provides a method for preparing a compound of formula IV:

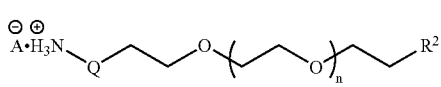

A is a suitable acid anion;

n is 10-2500;

Q is a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—, wherein:

-Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur;

$R^2$ is halogen, $N_3$, CN, a mono-protected amine, a di-protected amine, a protected hydroxyl, a protected aldehyde, a protected thiol, —NHR$^4$, —N(R$^4$)$_2$, —SR$^4$, —O(CH$_2$CH$_2$O)$_q$(CH$_2$)$_r$R$^5$, —OC(O)R$^4$, or —OS(O)$_2$R$^4$;

q and r are each independently 0-4;

each $R^4$ is independently an optionally substituted group selected from aliphatic, a 5-8 membered saturated, partially unsaturated, or aryl ring having 0-4 heteroatoms independently selected from nitrogen, oxygen, or sulfur, an 8-10-membered saturated, partially unsaturated, or aryl bicyclic ring having 0-5 heteroatoms independently selected from nitrogen, oxygen, or sulfur, or a detectable moiety, or:

two $R^4$ on the same nitrogen atom are taken together with said nitrogen atom to form an optionally substituted 4-7 membered saturated, partially unsaturated, or aryl ring having 1-4 heteroatoms independently selected from nitrogen, oxygen, or sulfur; and $R^5$ is hydrogen, halogen, CN, a mono-protected amine, a di-protected amine, a protected aldehyde, a protected hydroxyl, a protected carboxylic acid, a protected thiol, or an optionally substituted group selected from aliphatic, a 5-8 membered saturated, partially unsaturated, or aryl ring having 0-4 heteroatoms independently selected from nitrogen, oxygen, or sulfur, an 8-10 membered saturated, partially unsaturated, or aryl bicyclic ring having 0-5 heteroatoms independently selected from nitrogen, oxygen, or sulfur, or a detectable moiety, comprising the steps of:

(a) providing a polymerization initiator of formula B:

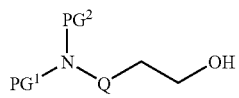

B wherein:

each of $PG^1$ and $PG^2$ is hydrogen or a suitable amino protecting group, or $PG^1$ and $PG^2$ are taken together to form a cyclic amino protecting group, provided that at least one of $PG^1$ and $PG^2$ is a suitable amino protecting group; and Q is a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—, wherein:

-Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur;

(b) polymerizing ethylene oxide onto said polymerization initiator to provide a compound of formula A:

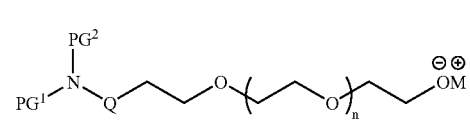

A wherein:

n is 10-2500;

M is the cation of a suitable metal;

each of $PG^1$ and $PG^2$ is hydrogen or a suitable amino protecting group, or $PG^1$ and $PG^2$ are taken together to form a cyclic amino protecting group, provided that at least one of $PG^1$ and $PG^2$ is a suitable amino protecting group; and Q is a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—, wherein:

-Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur;

(c) terminating the living polymer chain-end of the compound of formula A with a suitable polymerization terminator to afford a compound of formula C:

C

A is a suitable acid anion;

n is 10-2500;

each of $PG^1$ and $PG^2$ is hydrogen or a suitable amino protecting group, or $PG^1$ and $PG^2$ are taken together to form a cyclic amino protecting group, provided that at least one of $PG^1$ and $PG^2$ is a suitable amino protecting group Q is a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—, wherein:
- -Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur;
- $R^2$ is halogen, $N_3$, CN, a mono-protected amine, a di-protected amine, a protected hydroxyl, a protected aldehyde, a protected thiol, —NHR$^4$, —N(R$^4$)$_2$, —SR$^4$, —O(CH$_2$CH$_2$O)$_q$(CH$_2$)$_r$R$^5$, —OC(O)R$^4$, or —OS(O)$_2$R$^4$;
- q and r are each independently 0-4;
- each R$^4$ is independently an optionally substituted group selected from aliphatic, a 5-8 membered saturated, partially unsaturated, or aryl ring having 0-4 heteroatoms independently selected from nitrogen, oxygen, or sulfur, an 8-10-membered saturated, partially unsaturated, or aryl bicyclic ring having 0-5 heteroatoms independently selected from nitrogen, oxygen, or sulfur, or a detectable moiety, or:
  - two R$^4$ on the same nitrogen atom are taken together with said nitrogen atom to form an optionally substituted 4-7 membered saturated, partially unsaturated, or aryl ring having 1-4 heteroatoms independently selected from nitrogen, oxygen, or sulfur; and
- R$^5$ is hydrogen, halogen, CN, a mono-protected amine, a di-protected amine, a protected aldehyde, a protected hydroxyl, a protected carboxylic acid, a protected thiol, or an optionally substituted group selected from aliphatic, a 5-8 membered saturated, partially unsaturated, or aryl ring having 0-4 heteroatoms independently selected from nitrogen, oxygen, or sulfur, an 8-10 membered saturated, partially unsaturated, or aryl bicyclic ring having 0-5 heteroatoms independently selected from nitrogen, oxygen, or sulfur, or a detectable moiety,
(d) removal of the PG$^1$ and/or PG$^2$ protecting groups; and
(e) treatment with an acid to form the compound of formula IV.

Embodiments, classes, and subclasses described herein for the Q and n groups of formulae I, II, II', and III apply singly and in combination to compounds of formulae IV, A, B, and C.

As defined generally above, PG$^1$ and PG$^2$ are suitable amino protecting groups. Suitably protected amines include, but are not limited to, aralkylamines, carbamates, cyclic imides, allyl amines, amides, and the like. Examples of amino protecting groups include t-butyloxycarbonyl (BOC), ethyloxycarbonyl, methyloxycarbonyl, trichloroethyloxycarbonyl, allyloxycarbonyl (Alloc), benzyloxocarbonyl (CBZ), allyl, phthalimide, benzyl (Bn), fluorenylmethylcarbonyl (Fmoc), formyl, acetyl, chloroacetyl, dichloroacetyl, trichloroacetyl, phenylacetyl, trifluoroacetyl, benzoyl, and the like. In certain embodiments, the protected amine is phthalimido. In other embodiments, the amino protecting group is benzyl or allyl. In still other embodiments, the amino protecting group is a tert-butyloxycarbonyl (BOC) group. In certain embodiments, PG$^1$ and PG$^2$ are taken together to form a cyclic amino protecting group. Such cyclic amino protecting groups include phthalimide, maleimide, succinimide, and the like.

As defined generally above, the R$^2$ group of formulae IV and C is halogen, $N_3$, CN, a mono-protected amine, a di-protected amine, a protected hydroxyl, a protected aldehyde, a protected thiol, —NHR$^4$, —N(R$^4$)$_2$, —SR$^4$, —O(CH$_2$CH$_2$O)$_q$(CH$_2$)$_r$R$^5$, —OC(O)R$^4$, or —OS(O)$_2$R$^4$, wherein q and r are each independently 0-4, each R$^4$ is independently an optionally substituted group selected from aliphatic, a 5-8-membered saturated, partially unsaturated, or aryl ring having 0-4 heteroatoms independently selected from nitrogen, oxygen, or sulfur, an 8-10-membered saturated, partially unsaturated, or aryl bicyclic ring having 0-5 heteroatoms independently selected from nitrogen, oxygen, or sulfur, or a detectable moiety, or two R$^4$ on the same nitrogen atom are taken together with said nitrogen atom to form an optionally substituted 4-7-membered saturated, partially unsaturated, or aryl ring having 1-4 heteroatoms independently selected from nitrogen, oxygen, or sulfur; and R$^5$ is hydrogen, halogen, CN, a mono-protected amine, a di-protected amine, a protected aldehyde, a protected hydroxyl, a protected carboxylic acid, a protected thiol, or an optionally substituted group selected from aliphatic, a 5-8-membered saturated, partially unsaturated, or aryl ring having 0-4 heteroatoms independently selected from nitrogen, oxygen, or sulfur, an 8-10-membered saturated, partially unsaturated, or aryl bicyclic ring having 0-5 heteroatoms independently selected from nitrogen, oxygen, or sulfur, or a detectable moiety, In certain embodiments, the R$^2$ group of either of formulae IV and C is —N$_3$.

In other embodiments, the R$^2$ group of either of formulae IV and C is —CN.

In other embodiments, the R$^2$ group of either of formulae IV and C is —Br, —Cl, —F, or –1.

In certain embodiments, the R$^2$ group of either of formulae IV and C is —OS(O)$_2$R$^4$, wherein R$^4$ is an optionally substituted aliphatic group, or an optionally substituted 5-8-membered aryl ring. Exemplary R$^4$ groups include p-tolyl and methyl. In certain embodiments, R$^2$ is p-toluenesulfonyloxy or methanesulfonyloxy.

In certain embodiments, the R$^2$ group of either of formulae IV and C is —OR$^4$ wherein R$^4$ is an optionally substituted aliphatic group. One exemplary R$^4$ group is 5-norbornen-2-yl-methyl. According to yet another aspect of the present invention, the R$^2$ group of either of formulae IV and C is –OR$^4$ wherein R$^4$ is a C$_{1-6}$ aliphatic group substituted with N$_3$. Examples include –CH$_2$N$_3$. In some embodiments, R$^4$ is an optionally substituted C$_{1-6}$ alkyl group. Examples include methyl, ethyl, propyl, butyl, pentyl, hexyl, 2-(tetrahydropyran-2-yloxy)ethyl, pyridin-2-yldisulfanylmethyl, methyldisulfanylmethyl, (4-acetylenylphenyl)methyl, 3-(methoxycarbonyl)-prop-2-ynyl, methoxycarbonylmethyl, 2-(N-methyl-N-(4-acetylenylphenyl)carbonylamino)-ethyl, 2-phthalimidoethyl, 4-bromobenzyl, 4-chlorobenzyl, 4-fluorobenzyl, 4-iodobenzyl, 4-propargyloxybenzyl, 2-nitrobenzyl, 4-(bis-4-acetylenylbenzyl)aminomethyl-benzyl, 4-propargyloxy-benzyl, 4-dipropargylamino-benzyl, 4-(2-propargyloxy-ethyldisulfanyl)benzyl, 2-propargyloxy-ethyl, 2-propargyldisulfanyl-ethyl, 4-propargyloxy-butyl, 2-(N-methyl-N-propargylamino)ethyl, and 2-(2-dipropargylaminoethoxy)-ethyl. In other embodiments, R$^4$ is an optionally substituted C$_{2-6}$ alkenyl group. Examples include vinyl, allyl, crotyl, 2-propenyl, and but-3-enyl. When R$^4$ group is a substituted aliphatic group, suitable substituents on R$^4$ include N$_3$, CN, and halogen. In certain embodiments, R$^4$ is —CH$_2$CN, —CH$_2$CH$_2$CN, —CH$_2$CH(OCH$_3$)$_2$, 4-(bisbenzyloxymethyl)phenylmethyl, and the like.

According to another aspect of the present invention, the R$^2$ group of either of formulae IV and C is —OR$^4$ wherein R$^4$ is an optionally substituted C$_{2-6}$ alkynyl group. Examples include —CC≡CH, —CH$_2$C≡CH, —CH$_2$C≡CCH$_3$, and —CH$_2$CH$_2$C≡CH. In certain embodiments, R$^2$ is propargyloxy.

In other embodiments, the R$^2$ group of either of formulae IV and C is —OC(O)R$^4$ wherein R$^4$ is an optionally substituted aliphatic group. Examples include methyl, ethyl, propyl, butyl, pentyl, hexyl, acetylenyl, propargyl, but-3-ynyl, vinyl, crotyl, 2-propenyl, azidomethyl, 5-norbornen-2-yl, octen-5-yl, triisopropylsilylacetylenyl, 4-vinylphenyl, 4-dipropargylaminophenyl, 4-propargyloxyphenyl, 4-(2-propargyldisulfanyl)methyl-phenyl, and 2-(propargyloxycarbonyl)ethyl.

In certain embodiments, the R$^2$ group of either of formulae IV and C is —OR$^4$ wherein R$^4$ is an optionally substituted 5-8-membered aryl ring. In certain embodiments, R$^4$ is optionally substituted phenyl or optionally substituted pyridyl. Examples include phenyl, 4-t-butoxycarbonylaminophenyl, 4-azidomethylphenyl, 4-propargyloxyphenyl, 2-pyridyl, 3-pyridyl, and 4-pyridyl. In certain embodiments, R$^2$ is 4-t-butoxycarbonylaminophenoxy, 4-azidomethylphenoxy, or 4-propargyloxyphenoxy.

In certain embodiments, the R$^2$ group of either of formulae IV and C is —OR$^4$ wherein R$^4$ is an optionally substituted phenyl ring. Suitable substituents on the R$^4$ phenyl ring include halogen; —(CH$_2$)$_{0-4}$R°; —(CH$_2$)$_{0-4}$OR°; —(CH$_2$)$_{0-4}$CH(OR°)$_2$; —(CH$_2$)$_{0-4}$SR°; —(CH$_2$)$_{0-4}$Ph, which may be substituted with R°; —(CH$_2$)$_{0-4}$O(CH$_2$)$_{0-1}$Ph which may be substituted with R°; —CH=CHPh, which may be substituted with R°; —NO$_2$; —CN; —N$_3$; —(CH$_2$)$_{0-4}$N(R°)$_2$; —(CH$_2$)$_{0-4}$N(R°)C(O)R°; —N(R°)C(S)R°; —(CH$_2$)$_{0-4}$N(R°)C(O)NR°$_2$; —N(R°)C(S)NR°$_2$; —(CH$_2$)$_{0-4}$N(R°)C(O)OR°; —N(R°)N(R°)C(O)R°; —N(R°)N(R°)C(O)NR°$_2$; —N(R°)N(R°)C(O)OR°; —(CH$_2$)$_{0-4}$C(O)R°; —C(S)R°; —(CH$_2$)$_{0-4}$C(O)OR°; —(CH$_2$)$_{0-4}$C(O)SR°; —(CH$_2$)$_{0-4}$C(O)OSiR°$_3$; —(CH$_2$)$_{0-4}$OC(O)R°; —(CH$_2$)$_{0-4}$SC(O)R°; —(CH$_2$)$_{0-4}$C(O)NR°$_2$; —C(S)NR°$_2$; —(CH$_2$)$_{0-4}$OC(O)NR°$_2$; —C(O)N(OR°)R°; —C(O)C(O)R°; —C(O)CH$_2$C(O)R°; —C(NOR°)R°; —(CH$_2$)$_{0-4}$SSR°; —(CH$_2$)$_{0-4}$S(O)$_2$R°; —(CH$_2$)$_{0-4}$S(O)$_2$OR°; —(CH$_2$)$_{0-4}$OS(O)$_2$R°; —S(O)$_2$NR°$_2$; —(CH$_2$)$_{0-4}$S(O)R°; —N(R°)S(O)$_2$NR°$_2$; —N(R°)S(O)$_2$R°; —N(OR°)R°; —C(NH)NR°$_2$; —P(O)$_2$R°; —P(O)R°$_2$; —OP(O)R°$_2$; SiR°$_3$; wherein each independent occurrence of R° is as defined herein supra. In other embodiments, the R$^2$ group of either of formulae IV and C is —OR$^4$ wherein R$^4$ is phenyl substituted with one or more optionally substituted C$_{1-6}$ aliphatic groups. In still other embodiments, R$^4$ is phenyl substituted with vinyl, allyl, acetylenyl, —CH$_2$N$_3$, —CH$_2$CH$_2$N$_3$, —CH$_2$C≡CCH$_3$, or —CH$_2$C≡CH.

In certain embodiments, the R$^2$ group of either of formulae IV and C is —OR$^4$ wherein R$^4$ is phenyl substituted with N$_3$, N(R○)$_2$, CO$_2$R°, or C(O)R° wherein each R° is independently as defined herein supra.

In other embodiments, the R$^2$ group of either of formulae IV and C is a protected hydroxyl group. In certain embodiments the protected hydroxyl of the R$^2$ moiety is an ester, carbonate, sulfonate, allyl ether, ether, silyl ether, alkyl ether, arylalkyl ether, or alkoxyalkyl ether. In certain embodiments, the ester is a formate, acetate, proprionate, pentanoate, crotonate, or benzoate. Exemplary esters include formate, benzoyl formate, chloroacetate, trifluoroacetate, methoxyacetate, triphenylmethoxyacetate, p-chlorophenoxyacetate, 3-phenylpropionate, 4-oxopentanoate, 4,4-(ethylenedithio)pentanoate, pivaloate (trimethylacetate), crotonate, 4-methoxy-crotonate, benzoate, p-benylbenzoate, 2,4,6-trimethylbenzoate. Exemplary carbonates include 9-fluorenylmethyl, ethyl, 2,2,2-trichloroethyl, 2-(trimethylsilyl)ethyl, 2-(phenylsulfonyl)ethyl, vinyl, allyl, and p-nitrobenzyl carbonate.

Examples of suitable silyl ethers include trimethylsilyl, triethylsilyl, t-butyldimethylsilyl, t-butyldiphenylsilyl, triisopropylsilyl ether, and other trialkylsilyl ethers. Exemplary alkyl ethers include methyl, benzyl, p-methoxybenzyl, 3,4-dimethoxybenzyl, trityl, t-butyl, and allyl ether, or derivatives thereof. Exemplary alkoxyalkyl ethers include acetals such as methoxymethyl, methylthiomethyl, (2-methoxyethoxy)methyl, benzyloxymethyl, beta-(trimethylsilyl)ethoxymethyl, and tetrahydropyran-2-yl ether. Exemplary arylalkyl ethers include benzyl, p-methoxybenzyl (MPM), 3,4-dimethoxybenzyl, O-nitrobenzyl, p-nitrobenzyl, p-halobenzyl, 2,6-dichlorobenzyl, p-cyanobenzyl, 2- and 4-picolyl ethers.

In certain embodiments, the R$^2$ group of either of formulae IV and C is —N(R$^4$)$_2$ wherein each R$^4$ is independently an optionally substituted group selected from aliphatic, phenyl, naphthyl, a 5-6 membered aryl ring having 1-4 heteroatoms independently selected from nitrogen, oxygen, or sulfur, or a 8-10 membered bicyclic aryl ring having 1-5 heteroatoms independently selected from nitrogen, oxygen, or sulfur, or a detectable moiety.

In other embodiments, the R$^2$ group of either of formulae IV and C is —N(R$^4$)$_2$ wherein the two R$^4$ groups are taken together with said nitrogen atom to form an optionally substituted 4-7 membered saturated, partially unsaturated, or aryl ring having 1-4 heteroatoms independently selected from nitrogen, oxygen, or sulfur. According to another embodiment, the two R$^4$ groups are taken together to form a 5-6-membered saturated or partially unsaturated ring having one nitrogen wherein said ring is substituted with one or two oxo groups. Such R$^2$ groups include, but are not limited to, phthalimide, maleimide and succinimide.

In certain embodiments, the R$^2$ group of either of formulae IV and C is a mono-protected or di-protected amino group. In certain embodiments R$^2$ is a mono-protected amine. In certain embodiments R$^2$ is a mono-protected amine selected from aralkylamines, carbamates, allyl amines, or amides. Exemplary mono-protected amino moieties include t-butyloxycarbonylamino, ethyloxycarbonylamino, methyloxycarbonylamino, trichloroethyloxy-carbonylamino, allyloxycarbonylamino, benzyloxocarbonylamino, allylamino, benzylamino, fluorenylmethylcarbonyl, formamido, acetamido, chloroacetamido, dichloroacetamido, trichloroacetamido, phenylacetamido, trifluoroacetamido, benzamido, and t-butyldiphenylsilylamino. In other embodiments R$^2$ is a di-protected amine. Exemplary di-protected amino moieties include di-benzylamino, di-allylamino, phthalimide, maleimido, succinimido, pyrrolo, 2,2,5,5-tetramethyl-[1,2,5]azadisilolidino, and azido. In certain embodiments, the R$^2$ moiety is phthalimido. In other embodiments, the R$^2$ moiety is mono- or di-benzylamino or mono- or di-allylamino.

In other embodiments, the R$^2$ group of either of formulae IV and C is a protected aldehyde group. In certain embodiments the protected aldehydo moiety of R$^2$ is an acyclic acetal, a cyclic acetal, a hydrazone, or an imine. Exemplary R$^2$ groups include dimethyl acetal, diethyl acetal, diisopropyl acetal, dibenzyl acetal, bis(2-nitrobenzyl) acetal, 1,3-dioxane, 1,3-dioxolane, and semicarbazone. In certain embodiments, R$^2$ is an acyclic acetal or a cyclic acetal. In other embodiments, R$^2$ is a dibenzyl acetal.

In yet other embodiments, the R$^2$ group of either of formulae IV and C is a protected carboxylic acid group. In certain embodiments, the protected carboxylic acid moiety of R$^2$ is an optionally substituted ester selected from C$_{1-6}$ aliphatic or aryl, or a silyl ester, an activated ester, an amide, or a hydrazide. Examples of such ester groups include methyl, ethyl, propyl, isopropyl, butyl, isobutyl, benzyl, and phenyl ester. In other embodiments, the protected carboxylic acid moiety of $R^2$ is an oxazoline or an ortho ester. Examples of such protected carboxylic acid moieties include oxazolin-2-yl and 2-methoxy-[1,3]dioxin-2-yl.

According to another embodiment, the $R^2$ group of either of formulae IV and C is a protected thiol group. In certain embodiments, the protected thiol of $R^2$ is a disulfide, thioether, silyl thioether, thioester, thiocarbonate, or a thiocarbamate. Examples of such protected thiols include triisopropylsilyl thioether, t-butyldimethylsilyl thioether, t-butyl thioether, benzyl thioether, p-methylbenzyl thioether, triphenylmethyl thioether, and p-methoxyphenyldiphenylmethyl thioether. In other embodiments, $R^2$ is an optionally substituted thioether selected from alkyl, benzyl, or triphenylmethyl, or trichloroethoxycarbonyl thioester. In certain embodiments, $R^3$ is —S—S-pyridin-2-yl, —S—SBn, —S—SCH$_3$, or —S—S(p-ethynylbenzyl). In certain embodiments, $R^3$ is —S—S-pyridin-2-yl.

In still other embodiments, the $R^2$ group of either of formulae IV and C is a detectable moiety. According to another aspect of the invention, the $R^2$ group of either of formulae IV and C is a fluorescent moiety. Such fluorescent moieties are well known in the art and include coumarins, quinolones, benzoisoquinolones, hostasol, and Rhodamine dyes, to name but a few. Exemplary fluorescent moieties comprising $R^2$ include anthracen-9-yl-methoxy, pyren-4-yl-methoxy, 2-(9-H-carbazol-9-yl)-ethoxy, the carboxylate of rhodamine B, and the carboxylate of coumarin 343.

In certain embodiments, the $R^2$ group of either of formulae IV and C is a group suitable for Click chemistry. One of ordinary skill in the art would recognize that certain $R^2$ groups of the present invention are suitable for Click chemistry.

Compounds of either of formulae IV and C having $R^2$ groups suitable for Click chemistry are useful for conjugating said compounds to biological systems such as proteins, viruses, and cells, to name but a few. After conjugation to a biomolecule, drug, cell, substrate, or the like, the other end-group functionality, corresponding to the $R^1$ moiety of either of formulae IV and C, can be used to attach targeting groups for cell specific delivery including, but not limited to, fluorescent dyes, covalent attachment to surfaces, and incorporation into hydrogels. Thus, another embodiment of the present invention provides a method of conjugating the $R^2$ group of a compound of either of formulae IV and C to a macromolecule via Click chemistry. Yet another embodiment of the present invention provides a macromolecule conjugated to a compound of either of formulae IV and C via the $R^2$ group.

According to one embodiment, the $R^2$ group of either of formulae IV and C is an azide-containing group. According to another embodiment, the $R^2$ group of either of formulae IV and C is an alkyne-containing group.

In certain embodiments, the $R^2$ group of either of formulae IV and C has a terminal alkyne moiety. In other embodiments, the $R^2$ group of either of formulae IV and C is an alkyne-containing moiety having an electron withdrawing group. Accordingly, in such embodiments, the $R^2$ group of either of formulae IV and C is

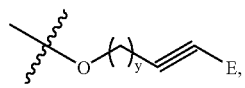

wherein E is an electron withdrawing group and y is 0-6. Such electron withdrawing groups are known to one of ordinary skill in the art. In certain embodiments, E is an ester. In other embodiments, the $R^2$ group of either of formulae IV and C is

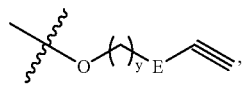

wherein E is an electron withdrawing group, such as a —C(O)O-group and y is 0-6.

Exemplary $R^2$ groups of either of formulae IV and C are set forth in Table 7, below.

TABLE 7

Representative $R^2$ Groups

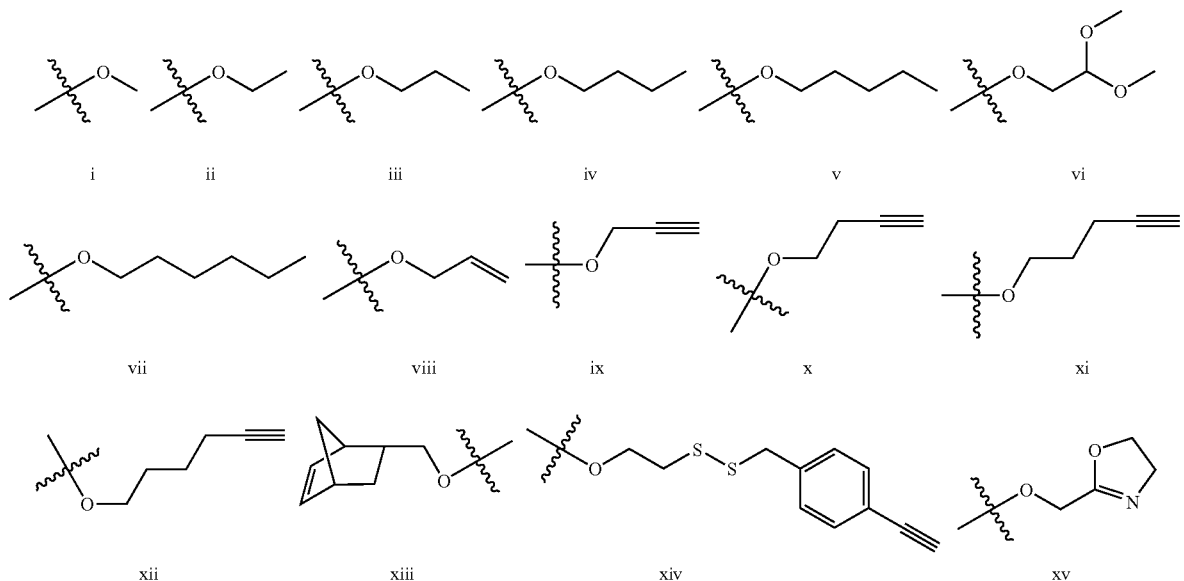

TABLE 7-continued
Representative R[2] Groups
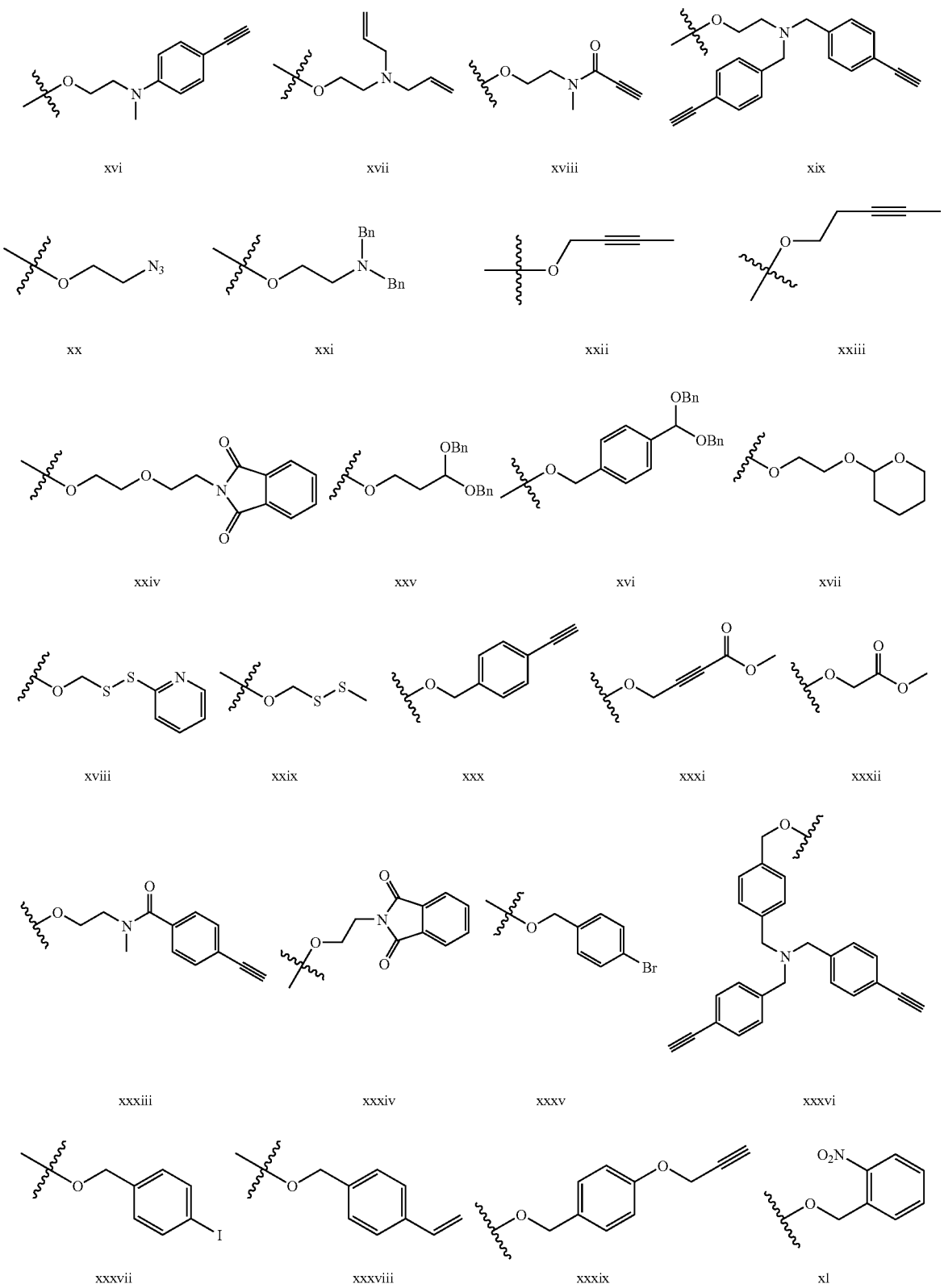

TABLE 7-continued
Representative R² Groups
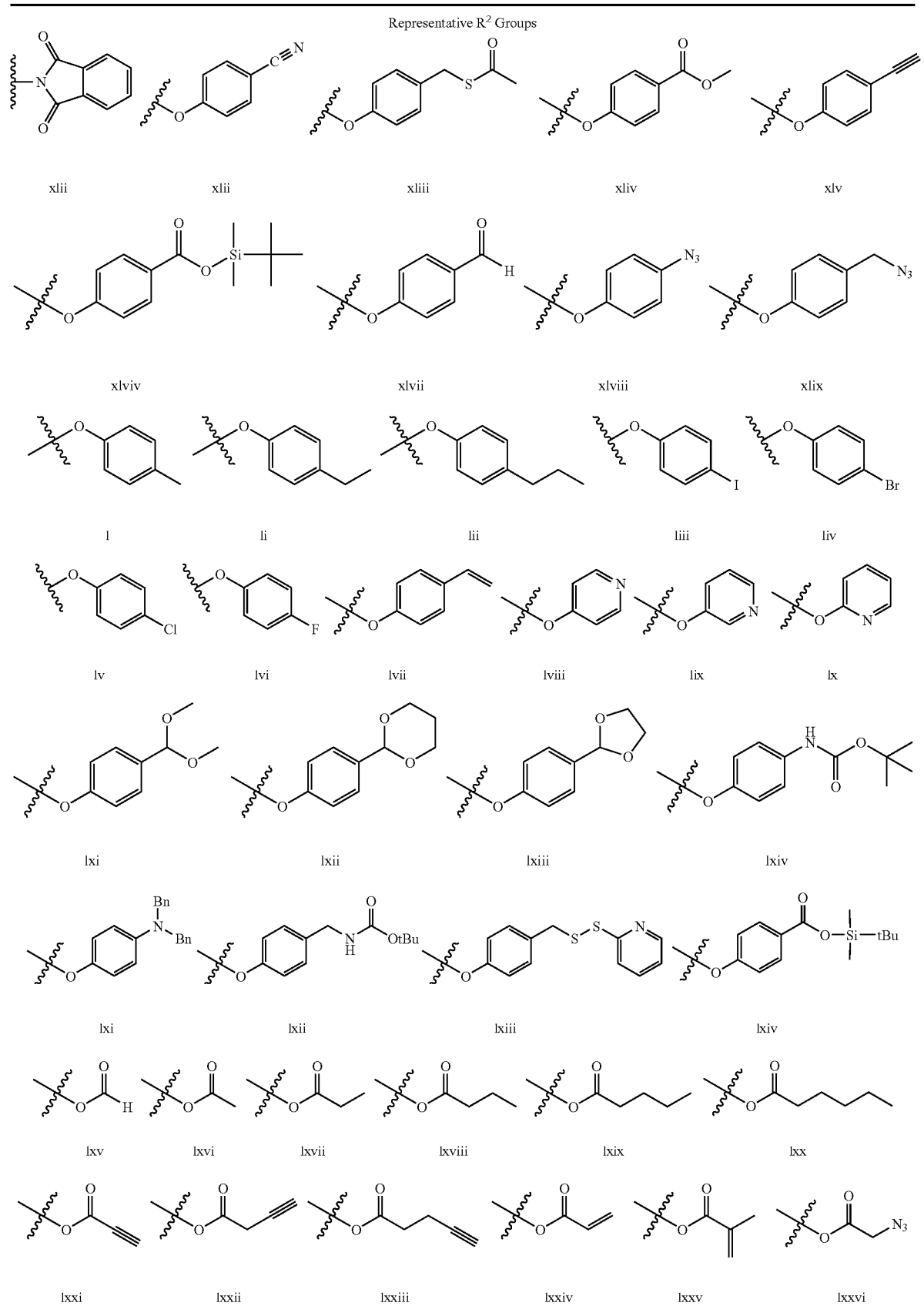

TABLE 7-continued
Representative R² Groups
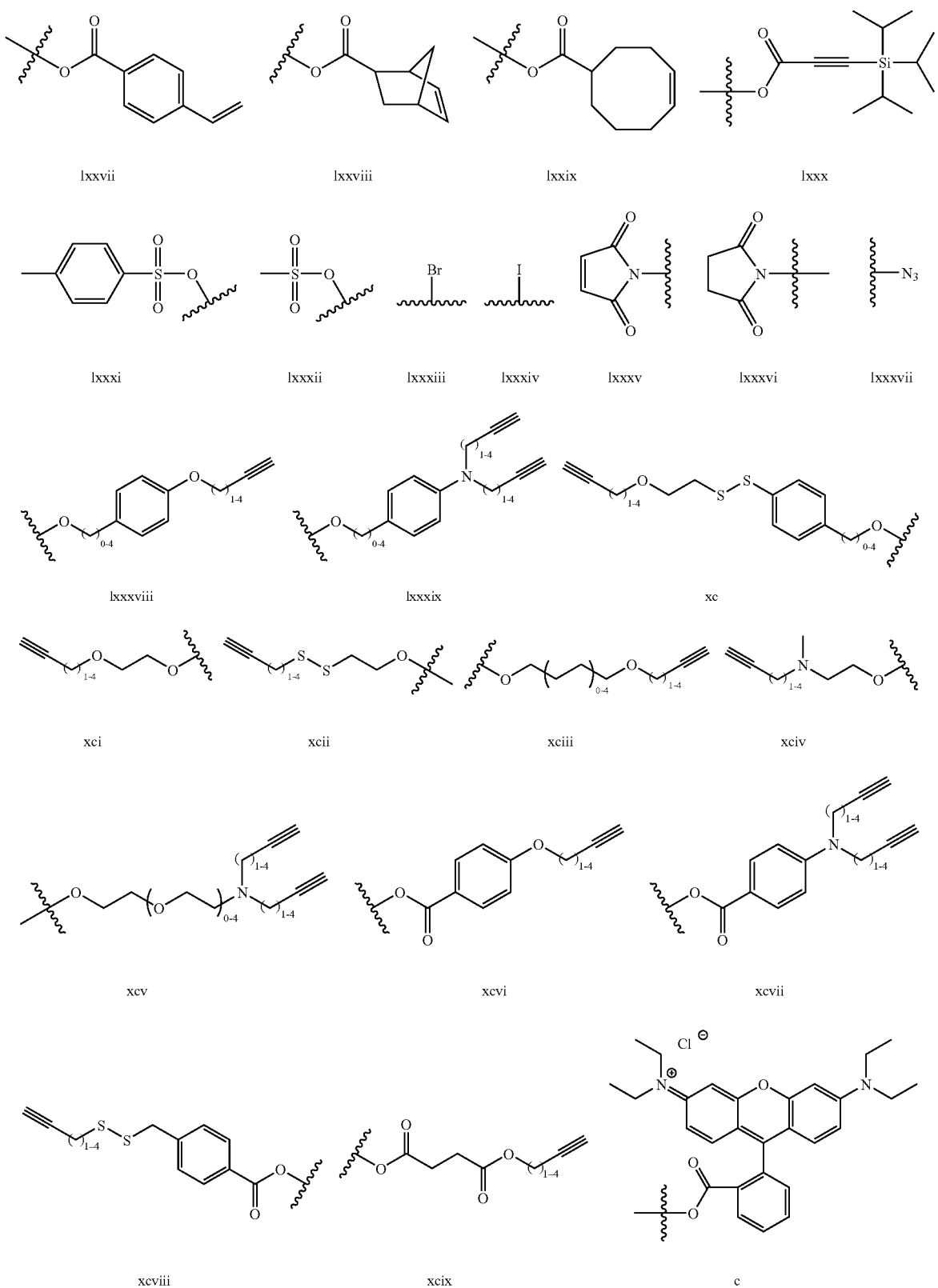

TABLE 7-continued

Representative R² Groups

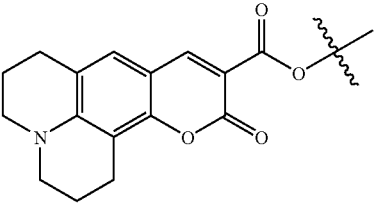

ci

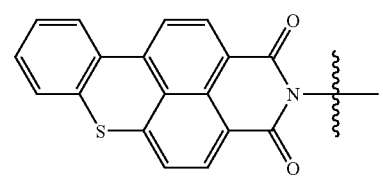

cii

In certain embodiments, the R² group of either of formulae IV and C is selected from any of those R² groups depicted in Table 2, supra. In other embodiments, the R² group of either of formulae IV and C is group xlii or xxiv. In yet other embodiments, the R² group of either of formulae IV and C is xix, xvii, xviii, xxix, xxxii, xlviv, xlvii, or xlviii.

According to another aspect of the present invention, the R² group of either of formulae IV and C is ix, xxii, xxx, xxxi, xlv, xlviii, xlix, lxxi.

As described above, one step in the preparation of a compound of either of formulae IV and C comprises terminating the living polymer chain-end of the compound of formula A with a suitable polymerization terminator to afford a compound of formula C. One of ordinary skill in the art would recognize that the polymerization terminator provides the R² group of either of formulae IV and C. Accordingly, embodiments directed to the R² group of either of formulae IV and C, as set forth above and herein, are also directed to the suitable polymerization terminator itself, and similarly, embodiments directed to the suitable polymerization terminator, as set forth above and herein, are also directed to the R² group of either of formulae IV and C.

One of ordinary skill in the art would also recognize that the above method for preparing a compound of formula C may be performed as a "one-pot" synthesis of compounds of formula C that utilizes the living polymer chain-end to incorporate the R² group of formula IV. Alternatively, compounds of formula C may also be prepared in a multi-step fashion. For example, the living polymer chain-end of a compound of formula A may be quenched to afford a hydroxyl group which may then be further derivatized, according to known methods, to afford a compound of formula C.

One of ordinary skill in the art will recognize that a variety of polymerization terminating agents are suitable for the present invention. Such polymerization terminating agents include any R²-containing group capable of reacting with the living polymer chain-end of a compound of formula A to afford a compound of formula C. Thus, polymerization terminating agents include anhydrides, suitable Mitsunobu reactants, and groups that contain a suitable leaving group, L, that is subject to nucleophilic displacement.

A "suitable leaving group that is subject to nucleophilic displacement" is a chemical group that is readily displaced by a desired incoming chemical moiety. Suitable leaving groups are well known in the art, e.g., see, March. Such leaving groups include, but are not limited to, halogen, alkoxy, sulphonyloxy, optionally substituted alkylsulphonyloxy, optionally substituted alkenylsulfonyloxy, optionally substituted arylsulfonyloxy, and diazonium moieties. Examples of suitable leaving groups include chloro, iodo, bromo, fluoro, methanesulfonyloxy (mesyloxy), tosyloxy, triflyloxy, nitrophenylsulfonyloxy (nosyloxy), and bromo-phenylsulfonyloxy (brosyloxy).

According to an alternate embodiment, the suitable leaving group may be generated in situ within the reaction medium. For example, a leaving group may be generated in situ from a precursor of that compound wherein said precursor contains a group readily replaced by said leaving group in situ.

Alternatively, when the R² group of either of formulae IV and C is a protected functional group, such as a protected amine, protected thiol, protected carboxylylic acid, protected acetylene, protected aldehyde, etc., the protecting group may be removed and that functional group may be derivatized or protected with a different protecting group. It will be appreciated that the removal of any protecting group of the R² group of either of formulae IV and C is performed by methods suitable for that protecting group. Such methods are described in detail in Green.

In other embodiments, the R² group of formula C is incorporated by derivatization of the hydroxyl group of formula A via anhydride coupling, optionally in the presence of base as appropriate. One of ordinary skill in the art would recognize that anhydride polymerization terminating agents containing an azide, an aldehyde, a hydroxyl, an alkyne, and other groups, or protected forms thereof, may be used to incorporate said azide, said aldehyde, said protected hydroxyl, said alkyne, and other groups into the R² group of compounds of formula C. It will also be appreciated that such anhydride polymerization terminating agents are also suitable for terminating the living polymer chain-end of a compound of formula A. Such anhydride polymerization terminating agents include, but are not limited to, those set forth in Table 8, below.

TABLE 8

Representative Anhydride Polymerization Terminating Agents

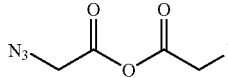

A-1

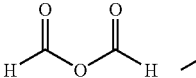

A-2

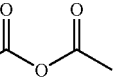

A-3

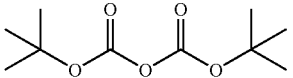

A-4

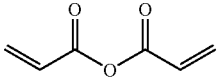

A-5

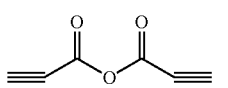

A-6

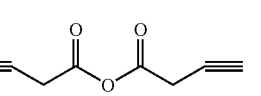

A-7

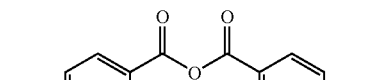

A-8

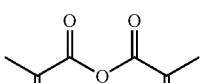

A-9

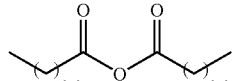

A-10

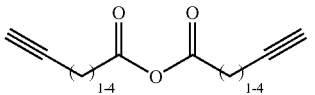

A-11

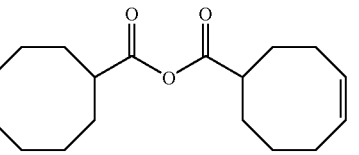

A-12

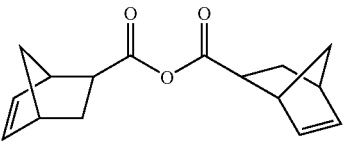

A-13

In other embodiments, the $R^2$ group of either of formulae IV and C is incorporated by derivatization of the hydroxyl group of formula A via reaction with a polymerization terminating agent having a suitable leaving group. It will also be appreciated that such polymerization terminating agents are also suitable for terminating the living polymer chain-end of a compound of formula A. Examples of these polymerization terminating agents include, but are not limited to, those set forth in Table 9, below.

TABLE 9

Representative Polymerization Terminating Agents

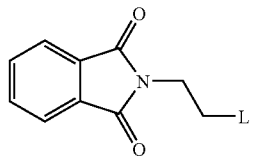

L-1

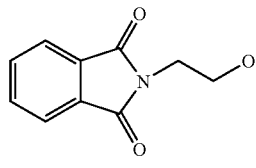

L-2

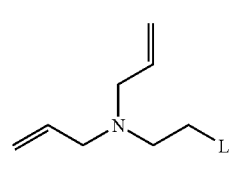

L-3

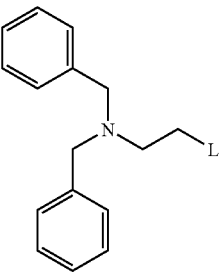

L-4

TABLE 9-continued
Representative Polymerization Terminating Agents
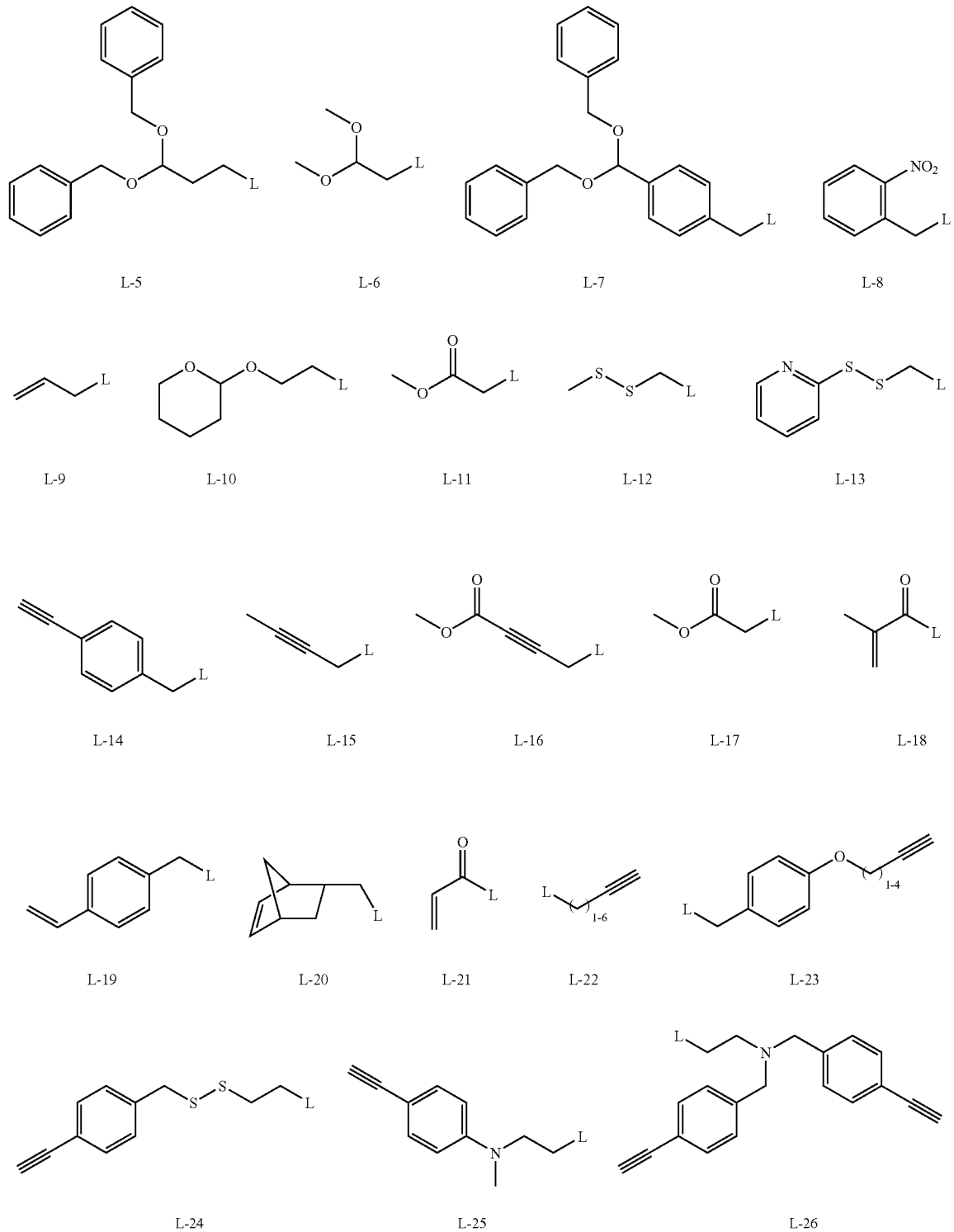

TABLE 9-continued
Representative Polymerization Terminating Agents
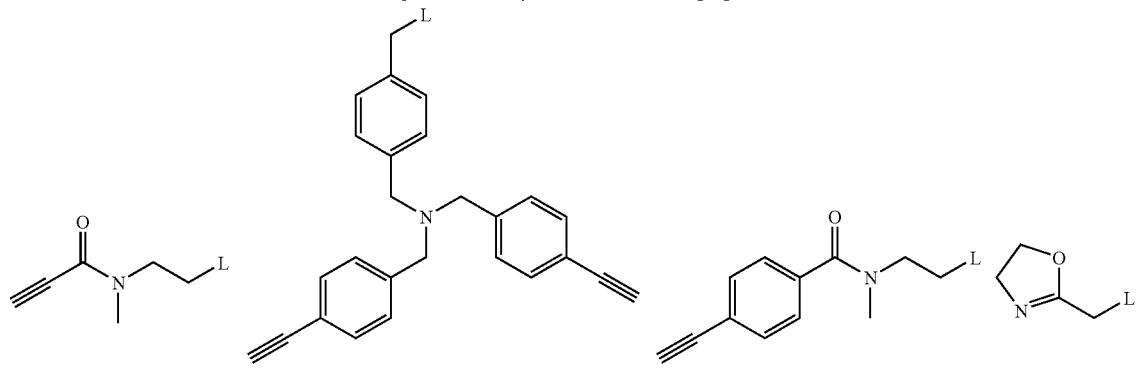
L-27  L-28  L-29  L-30
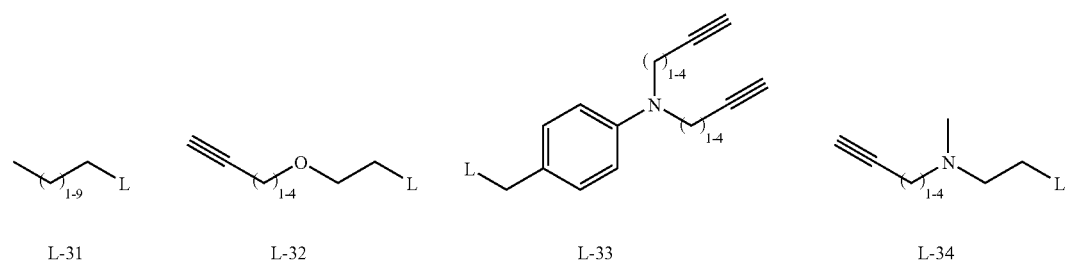
L-31  L-32  L-33  L-34
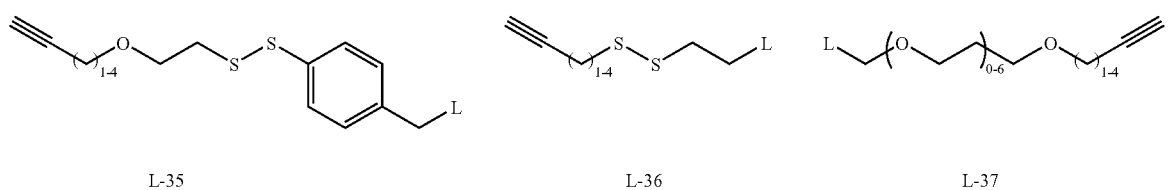
L-35  L-36  L-37
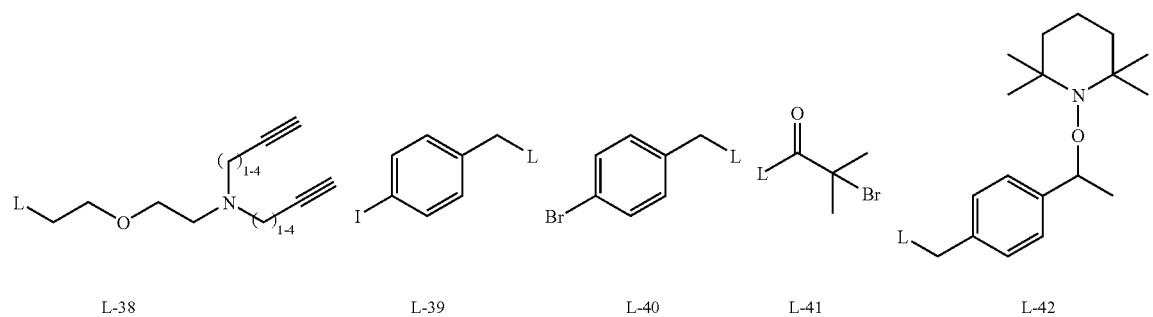
L-38  L-39  L-40  L-41  L-42 wherein each L is a suitable leaving group as defined above and in classes and subclasses as described above and herein.

As described above, a compound of formula A is treated with a polymerization terminating agent to form a compound of formula C. Such terminating agents include those described herein and in detail in U.S. Ser. No. 11/256,735. In certain embodiments, the R² group of formula IV or C is incorporated by derivatization of the hydroxyl group of formula A or B via Mitsunobu coupling. The Mitsunobu reaction is a mild method for achieving formal substitution of the hydroxyl group using azodicarboxylic esters/amides and triphenylphosphine (TPP) or trialkylphosphines or phosphites. In addition, other azo compounds have been developed as alternatives to the traditional azodicarboxylic esters diethylazodicarboxylate (DEAD) and diisopropylazodicarboxylate (DIAD). These include dibenzyl azodicarboxylate (DBAD), N,N,N',N'-tetramethylazodicarbonamide (TMAD), and dipiperidyl azodicarboxylate (DPAD). Mitsunobu coupling provides access to terminal groups including, but not limited to, halides, azide, amines, esters, ethers, thioethers and isothiocyanates. Accordingly, it will be appreciated that a variety of compounds of formulae IV and C are obtained by the derivatization of the hydroxyl group of formula A by Mitsunobu reaction.

In certain embodiments, the polymerization terminating agent is one that is capable of Mistunobu coupling. These include optionally substituted phenols, optionally substituted thiophenols, cyclic imides, carboxylic acids, azide, and other reagents capable of Mitsunobu coupling. Such Mitsunobu terminating agents include, but are not limited to, those set forth in Table 10, below.

TABLE 10

Representative Mitsunobu Polymerization Terminating Agents

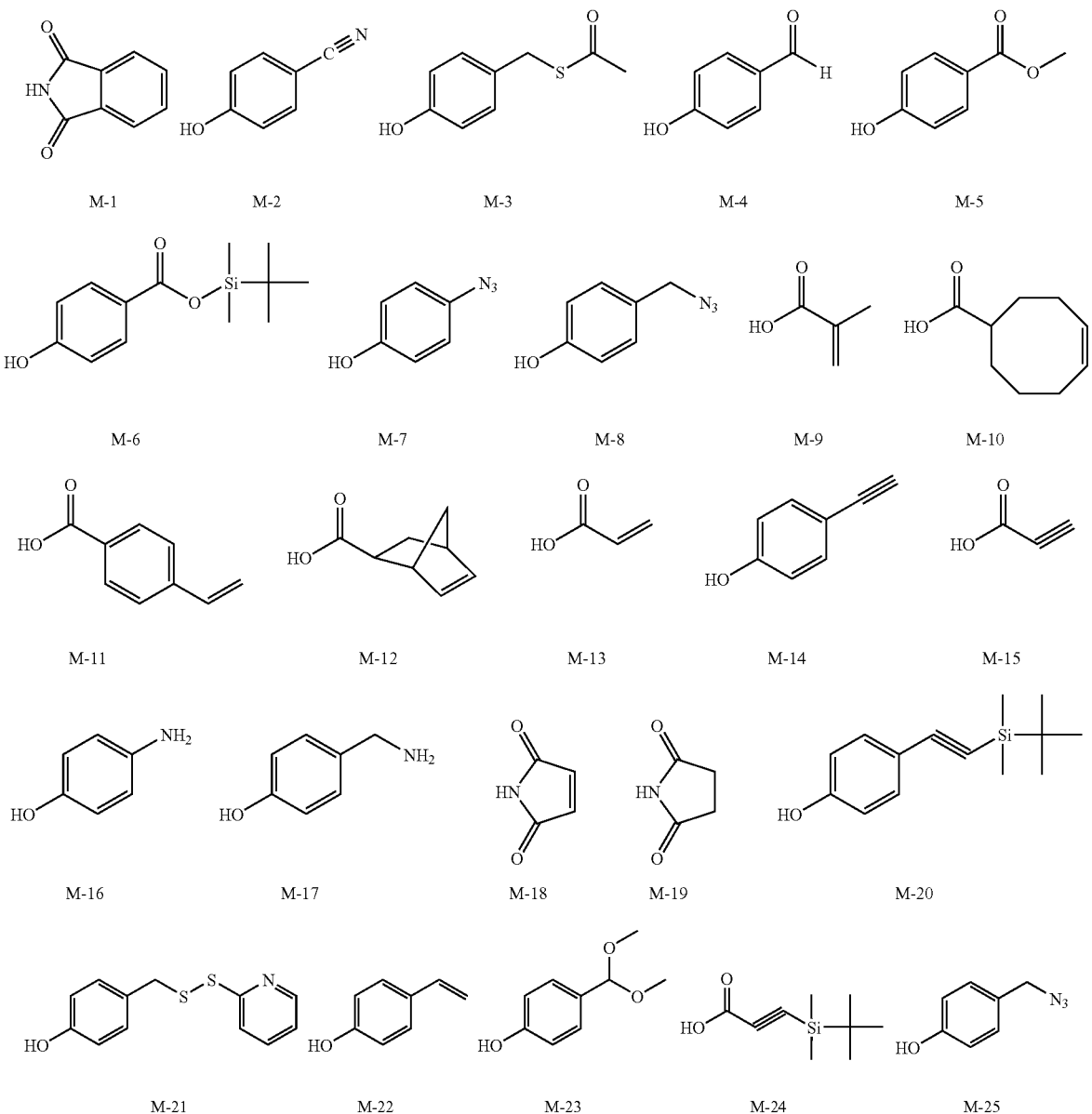

TABLE 10-continued
Representative Mitsunobu Polymerization Terminating Agents
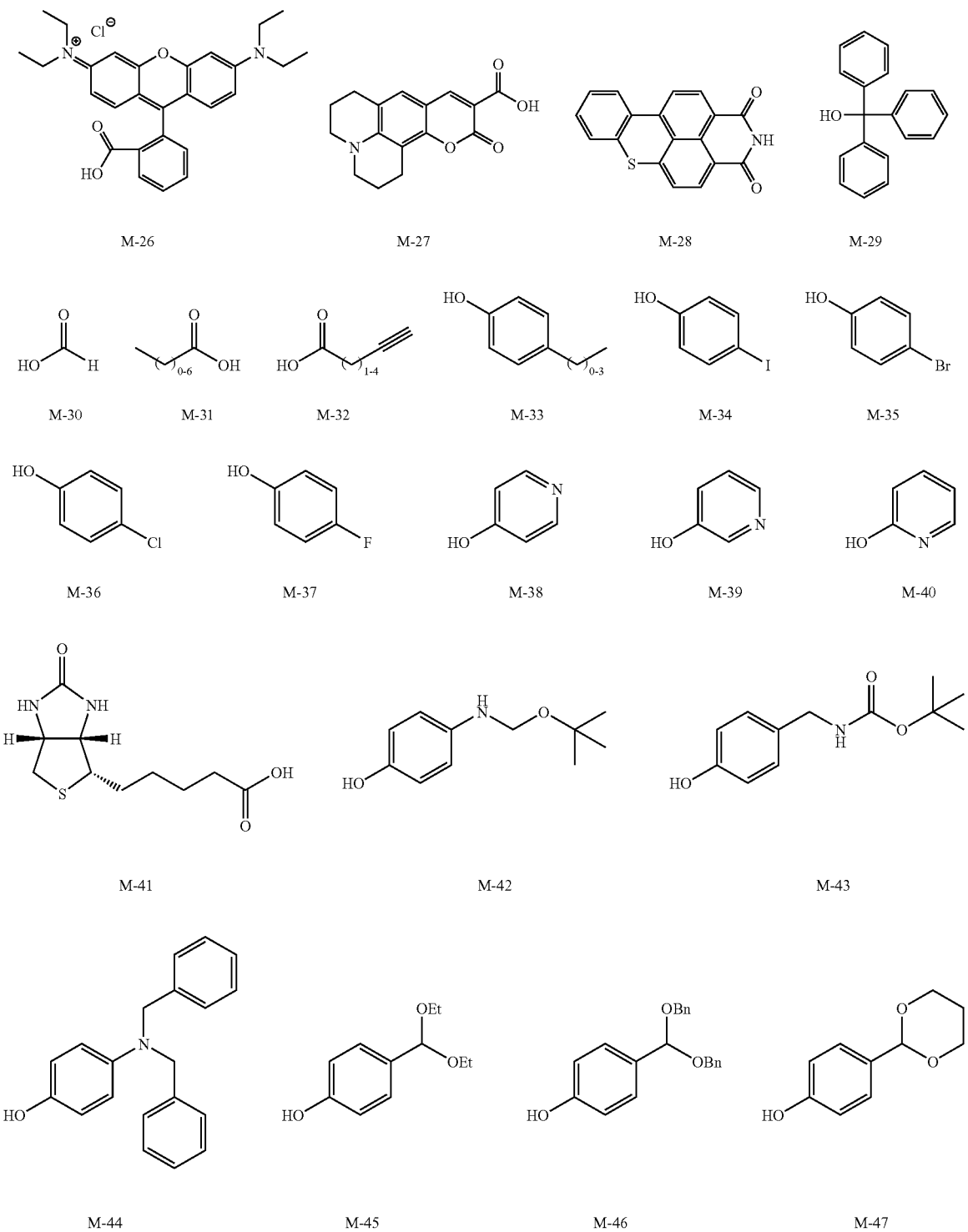

TABLE 10-continued
Representative Mitsunobu Polymerization Terminating Agents
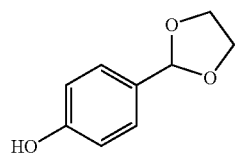 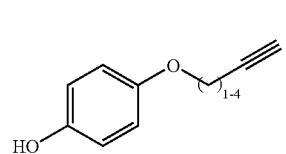 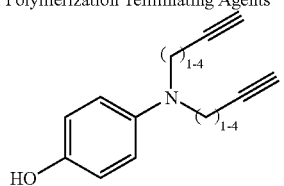 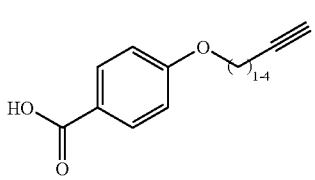
M-48　　　　M-49　　　　M-50　　　　M-51
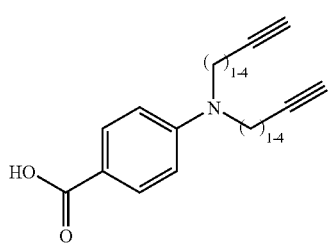 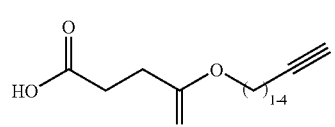 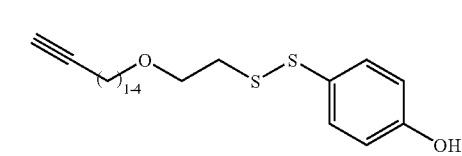
M-52　　　　M-53　　　　M-54
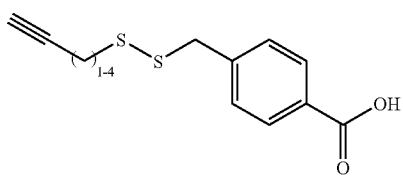 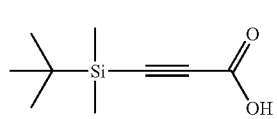 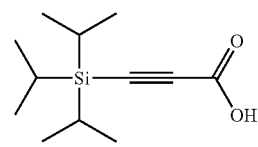
M-55　　　　M-56　　　　M-57
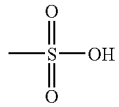 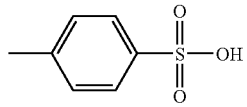 NaBr　　Nal　　H—N$_3$　　Na—N$_3$
M-58　　　　M-59　　　　M-60　　M-61　　M-62　　M-63
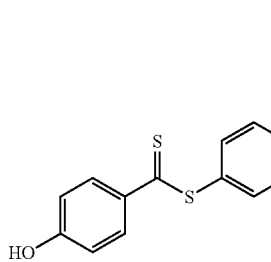 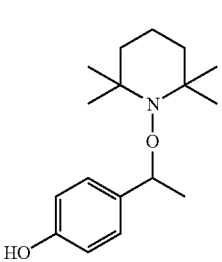 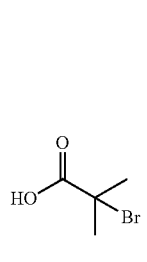 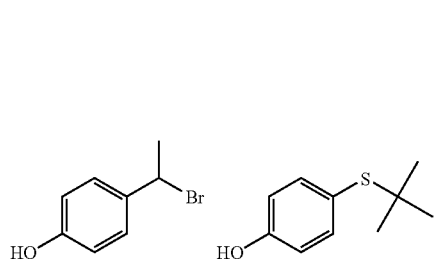
M-64　　　M-65　　　M-66　　M-67　　M-68
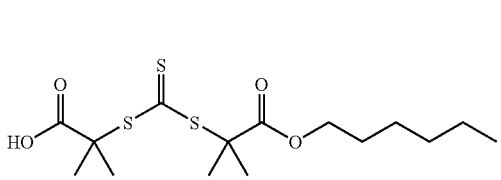 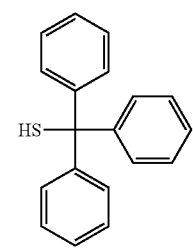 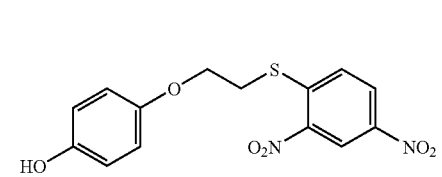
M-69　　　　　M-70　　　　　M-71

TABLE 10-continued

Representative Mitsunobu Polymerization Terminating Agents

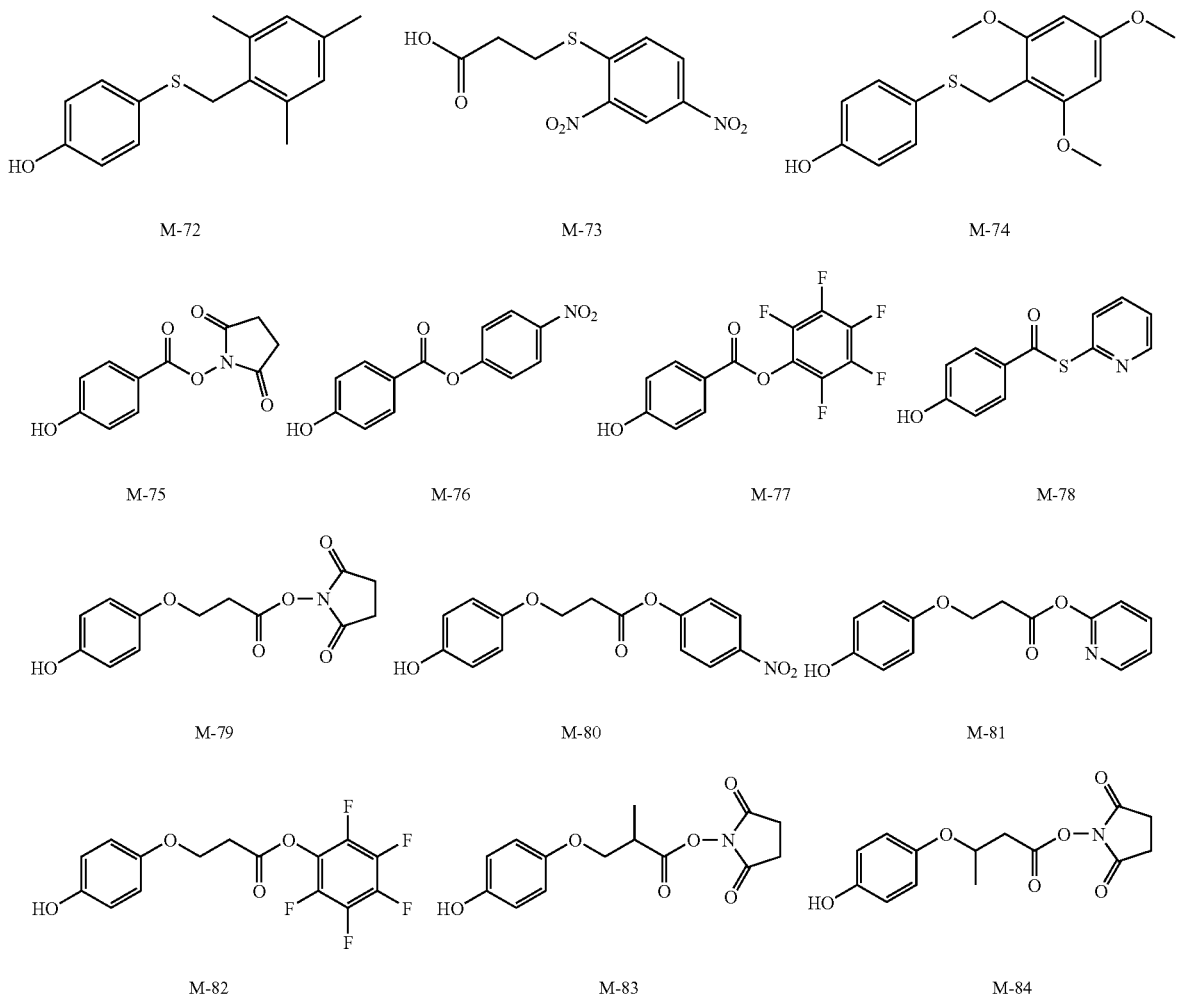

According to yet another embodiment, the present invention provides a method for preparing a compound of formula V:

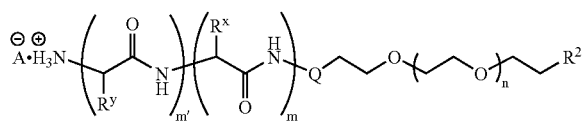

V wherein:
n is 10-2500;
m is 1 to 1000;
m' is 0 to 1000;
$R^x$ and $R^y$ are each independently a natural or unnatural amino acid side-chain group, wherein $R^x$ and $R^y$ are different from each other;
Q is a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—, wherein:

-Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur;

$R^2$ is halogen, $N_3$, CN, a mono-protected amine, a di-protected amine, a protected hydroxyl, a protected aldehyde, a protected thiol, —NHR$^4$, —N(R$^4$)$_2$, —SR$^4$, —O(CH$_2$CH$_2$O)$_q$(CH$_2$)$_r$R$^5$, —OC(O)R$^4$, or —OS(O)$_2$R$^4$;

q and r are each independently 0-4;

each R$^4$ is independently an optionally substituted group selected from aliphatic, a 5-8 membered saturated, partially unsaturated, or aryl ring having 0-4 heteroatoms independently selected from nitrogen, oxygen, or sulfur, an 8-10-membered saturated, partially unsaturated, or aryl bicyclic ring having 0-5 heteroatoms independently selected from nitrogen, oxygen, or sulfur, or a detectable moiety, or:
  two $R^4$ on the same nitrogen atom are taken together with said nitrogen atom to form an optionally substituted 4-7 membered saturated, partially unsaturated, or aryl ring having 1-4 heteroatoms independently selected from nitrogen, oxygen, or sulfur; and
$R^5$ is hydrogen, halogen, CN, a mono-protected amine, a di-protected amine, a protected aldehyde, a protected hydroxyl, a protected carboxylic acid, a protected thiol, or an optionally substituted group selected from aliphatic, a 5-8 membered saturated, partially unsaturated, or aryl ring having 0-4 heteroatoms independently selected from nitrogen, oxygen, or sulfur, an 8-10 membered saturated, partially unsaturated, or aryl bicyclic ring having 0-5 heteroatoms independently selected from nitrogen, oxygen, or sulfur, or a detectable moiety, wherein said method comprises the steps of:
(a) providing a compound of formula IV:

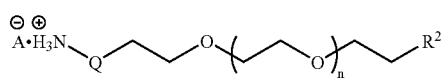

IV

A is a suitable acid anion;
n is 10-2500;
Q is a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—, wherein:
  -Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur;
$R^2$ is halogen, $N_3$, CN, a mono-protected amine, a di-protected amine, a protected hydroxyl, a protected aldehyde, a protected thiol, —NHR$^4$, —N(R$^4$)$_2$, —SR$^4$, —O(CH$_2$CH$_2$O)$_q$(CH$_2$)$_r$R$^5$, —OC(O)R$^4$, or —OS(O)$_2$R$^4$;
q and r are each independently 0-4;
each $R^4$ is independently an optionally substituted group selected from aliphatic, a 5-8 membered saturated, partially unsaturated, or aryl ring having 0-4 heteroatoms independently selected from nitrogen, oxygen, or sulfur, an 8-10-membered saturated, partially unsaturated, or aryl bicyclic ring having 0-5 heteroatoms independently selected from nitrogen, oxygen, or sulfur, or a detectable moiety, or:
  two $R^4$ on the same nitrogen atom are taken together with said nitrogen atom to form an optionally substituted 4-7 membered saturated, partially unsaturated, or aryl ring having 1-4 heteroatoms independently selected from nitrogen, oxygen, or sulfur; and $R^5$ is hydrogen, halogen, CN, a mono-protected amine, a di-protected amine, a protected aldehyde, a protected hydroxyl, a protected carboxylic acid, a protected thiol, or an optionally substituted group selected from aliphatic, a 5-8 membered saturated, partially unsaturated, or aryl ring having 0-4 heteroatoms independently selected from nitrogen, oxygen, or sulfur, an 8-10 membered saturated, partially unsaturated, or aryl bicyclic ring having 0-5 heteroatoms independently selected from nitrogen, oxygen, or sulfur, or a detectable moiety, (b) polymerizing a first cyclic amino acid monomer onto the amine salt terminal end of formula IV, wherein said first cyclic amino acid monomer comprises $R^x$; and (c) optionally polymerizing a second cyclic amino acid monomer, comprising $R^y$, onto the living polymer end, wherein said second cyclic amino acid monomer is different from said first cyclic amino acid monomer to form a compound of formula V.

Each of the $R^2$, Q, m, m', $R^x$, and $R^y$ groups of formula V are as defined above and in various embodiments, classes and subclasses described herein both singly and in combination.

In certain embodiments, the m' group of formula V is 1-1000. In certain embodiments, the m' group of formula V is 0. In other embodiments, m' is 1-1000. According to other embodiments, m and m' are independently 10 to 100 repeat units. In still other embodiments, m is 1-20 repeat units and m' is 10-50 repeat units.

According to another embodiment, the present invention provides a compound of formula V:

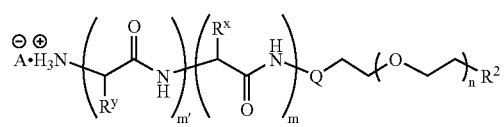

V wherein:
  n is 10-2500;
  m is 1 to 1000;
  m' is 0 to 1000;
  $R^x$ and $R^y$ are each independently a natural or unnatural amino acid side-chain group, wherein $R^x$ and $R^y$ are different from each other;
  Q is a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—, wherein:
    -Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur;
  $R^2$ is halogen, $N_3$, CN, a mono-protected amine, a di-protected amine, a protected hydroxyl, a protected aldehyde, a protected thiol, —NHR$^4$, —N(R$^4$)$_2$, —SR$^4$, —O(CH$_2$CH$_2$O)$_q$(CH$_2$)$_r$R$^5$, —OC(O)R$^4$, or —OS(O)$_2$R$^4$;
  q and r are each independently 0-4;

each $R^4$ is independently an optionally substituted group selected from aliphatic, a 5-8 membered saturated, partially unsaturated, or aryl ring having 0-4 heteroatoms independently selected from nitrogen, oxygen, or sulfur, an 8-10-membered saturated, partially unsaturated, or aryl bicyclic ring having 0-5 heteroatoms independently selected from nitrogen, oxygen, or sulfur, or a detectable moiety, or:

two $R^4$ on the same nitrogen atom are taken together with said nitrogen atom to form an optionally substituted 4-7 membered saturated, partially unsaturated, or aryl ring having 1-4 heteroatoms independently selected from nitrogen, oxygen, or sulfur; and $R^5$ is hydrogen, halogen, CN, a mono-protected amine, a di-protected amine, a protected aldehyde, a protected hydroxyl, a protected carboxylic acid, a protected thiol, or an optionally substituted group selected from aliphatic, a 5-8 membered saturated, partially unsaturated, or aryl ring having 0-4 heteroatoms independently selected from nitrogen, oxygen, or sulfur, an 8-10 membered saturated, partially unsaturated, or aryl bicyclic ring having 0-5 heteroatoms independently selected from nitrogen, oxygen, or sulfur, or a detectable moiety.

Each of the $R^2$, Q, m, m', $R^x$, and $R^y$ groups of formula V are as defined above and in various embodiments, classes and subclasses described herein both singly and in combination.

In certain embodiments, the m' group of formula V is 1-1000. In certain embodiments, the m' group of formula V is 0. In other embodiments, m' is 1-1000. According to other embodiments, m and m' are independently 10 to 100 repeat units. In still other embodiments, m is 1-20 repeat units and m' is 10-50 repeat units.

According to another embodiment, the present invention provides compounds of formula V, as described above, wherein said compounds have a polydispersity index ("PDI") of about 1.0 to about 1.2. According to another embodiment, the present invention provides compounds of formula V, as described above, wherein said compound has a polydispersity index ("PDI") of about 1.03 to about 1.15. According to yet another embodiment, the present invention provides compounds of formula V, as described above, wherein said compound has a polydispersity index ("PDI") of about 1.10 to about 1.12. According to other embodiments, the present invention provides compounds of formula V having a PDI of less than about 1.10.

In certain embodiments, the present invention provides compounds of formula V, as described above, wherein n is about 225. In other embodiments, n is about 200 to about 300. In still other embodiments, n is about 200 to about 250. In still other embodiments, n is about 100 to about 150. In still other embodiments, n is about 400 to about 500.

It will be appreciated by one of ordinary skill in the art that a compound of formula V may be treated with a base to generate the free amine. Such methods are known to one of ordinary skill in the art and include those described herein. In addition, it will be appreciated that the amino group of formula V may be further derivatized. Such derivatizations include protection, coupling, alkylation, and the like. In certain embodiments, the derivatization of the amino group of formula V incorporates an $R^{2a}$ group as defined and described herein. Such compounds are of formula VI:

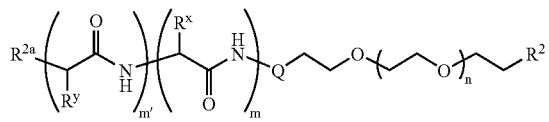

VI wherein:
n is 10-2500;
m is 1 to 1000;
m' is 0 to 1000;
$R^x$ and $R^y$ are each independently a natural or unnatural amino acid side-chain group, wherein $R^x$ and $R^y$ are different from each other;
Q is a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—, wherein:
-Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur;
$R^2$ is halogen, $N_3$, CN, a mono-protected amine, a di-protected amine, a protected hydroxyl, a protected aldehyde, a protected thiol, —NHR$^4$, —N(R$^4$)$_2$, —SR$^4$, —O(CH$_2$CH$_2$O)$_q$(CH$_2$)$_r$R$^5$, —OC(O)R$^4$, or —OS(O)$_2$R$^4$;
q and r are each independently 0-4;
$R^{2a}$ is a mono-protected amine, a di-protected amine, —NHR$^4$, —N(R$^4$)$_2$, —NHC(O)R$^4$, —NR$^4$C(O)R$^4$, —NHC(O)NHR$^4$, —NHC(O)N(R$^4$)$_2$, —NR$^4$C(O)NHR$^4$, —NR$^4$C(O)N(R$^4$)$_2$, —NHC(O)OR$^4$, —NR$^4$C(O)OR$^4$, —NHSO$_2$R$^4$, or —NR$^4$SO$_2$R$^4$;
each $R^4$ is independently an optionally substituted group selected from aliphatic, a 5-8 membered saturated, partially unsaturated, or aryl ring having 0-4 heteroatoms independently selected from nitrogen, oxygen, or sulfur, an 8-10-membered saturated, partially unsaturated, or aryl bicyclic ring having 0-5 heteroatoms independently selected from nitrogen, oxygen, or sulfur, or a detectable moiety, or:

two $R^4$ on the same nitrogen atom are taken together with said nitrogen atom to form an optionally substituted 4-7 membered saturated, partially unsaturated, or aryl ring having 1-4 heteroatoms independently selected from nitrogen, oxygen, or sulfur; and $R^5$ is hydrogen, halogen, CN, a mono-protected amine, a di-protected amine, a protected aldehyde, a protected hydroxyl, a protected carboxylic acid, a protected thiol, or an optionally substituted group selected from aliphatic, a 5-8 membered saturated, partially unsaturated, or aryl ring having 0-4 heteroatoms independently selected from nitrogen, oxygen, or sulfur, an 8-10 membered saturated, partially unsaturated, or aryl bicyclic ring having 0-5 heteroatoms independently selected from nitrogen, oxygen, or sulfur, or a detectable moiety.

Each of the $R^2$, $R^{2a}$, Q, m, m', $R^x$, and $R^y$ groups of formula VI are as defined above and in various embodiments, classes and subclasses described herein both singly and in combination.

In certain embodiments, the m' group of formula VI is 1-1000. In certain embodiments, the m' group of formula VI is 0. In other embodiments, m' is 1-1000. According to other embodiments, m and m' are independently 10 to 100 repeat units. In still other embodiments, m is 1-20 repeat units and m' is 10-50 repeat units.

According to another embodiment, the present invention provides compounds of formula VI, as described above, wherein said compounds have a polydispersity index ("PDI") of about 1.0 to about 1.2. According to another embodiment, the present invention provides compounds of formula VI, as described above, wherein said compound has a polydispersity index ("PDI") of about 1.03 to about 1.15. According to yet another embodiment, the present invention provides compounds of formula VI, as described above, wherein said compound has a polydispersity index ("PDI") of about 1.10 to about 1.12. According to other embodiments, the present invention provides compounds of formula VI having a PDI of less than about 1.10.

In certain embodiments, the present invention provides compounds of formula VI, as described above, wherein n is about 225. In other embodiments, n is about 200 to about 300. In still other embodiments, n is about 200 to about 250. In still other embodiments, n is about 100 to about 150. In still other embodiments, n is about 400 to about 500.

As described generally herein, and as depicted in Scheme 2 supra, a polymer macroinitiator having two terminal amine groups may be used in methods of the present invention. Accordingly, another aspect of the present invention provides a method of preparing a compound of formula VII:

gen, oxygen, or sulfur, or an optionally substituted 8-10 membered bivalent saturated, partially unsaturated, or aryl bicyclic ring having 0-5 heteroatoms independently selected from nitrogen, oxygen, or sulfur; and each A is a suitable acid anion, wherein said method comprises the steps of:
(a) providing a compound of formula D:

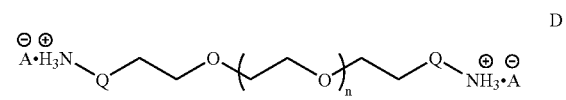

wherein:
n is 10-2500;
each Q is independently a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —$SO_2$—, —$NHSO_2$—, —$SO_2$NH—, —NHC(O)—, —C(O)NH—, —OC(O)NH—, or —NHC(O)O—, wherein:
-Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur; and each A is a suitable acid anion,

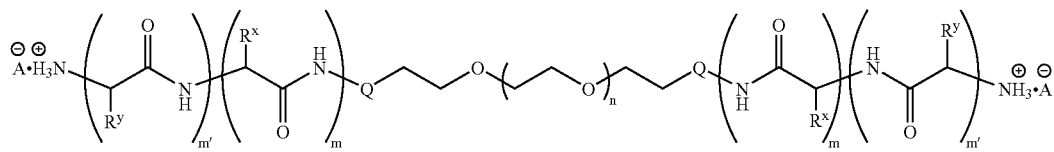

wherein:
n is 10-2500;
each m is independently 1 to 1000;
each m' is independently 0 to 1000;
each $R^x$ and $R^y$ are independently a natural or unnatural amino acid side-chain group, wherein $R^x$ and $R^y$ are different from each other;
each Q is independently a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —$SO_2$—, —$NHSO_2$—, —$SO_2$NH—, —NHC(O)—, —C(O)NH—, —OC(O)NH—, or —NHC(O)O—, wherein:
-Cy- is an optionally substituted 5-8 membered bivalent, saturated, partially unsaturated, or aryl ring having 0-4 heteroatoms independently selected from nitro- (b) polymerizing a first cyclic amino acid monomer onto the amine salt terminal end of formula I, wherein said first cyclic amino acid monomer comprises $R^x$; and (c) optionally polymerizing a second cyclic amino acid monomer, comprising $R^y$, onto the living polymer end, wherein said second cyclic amino acid monomer is different from said first cyclic amino acid monomer.

Each of the Q, A, m, m', n, $R^x$, and $R^y$ groups of formula VII are as defined above and in various embodiments, classes and subclasses described herein both singly and in combination.

In certain embodiments, the m' group of formula VII is 0. In other embodiments, the m' group of formula VII is 1-1000.

Another aspect of the present invention provides a compound of formula VII:

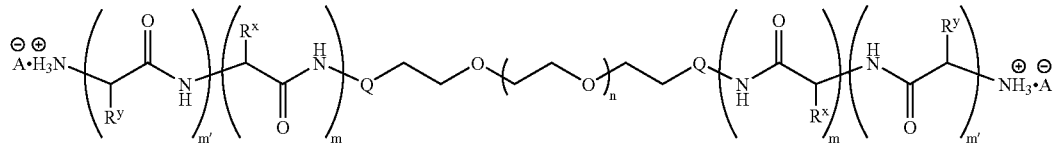

wherein:
n is 10-2500;
each m is independently 1 to 1000;
each m' is independently 0 to 1000;
each $R^x$ and $R^y$ are independently a natural or unnatural amino acid side-chain group, wherein $R^x$ and $R^y$ are different from each other;
each Q is independently a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —$SO_2$—, —$NHSO_2$—, —$SO_2NH$—, —NHC(O)—, —C(O)NH—, —OC(O)NH—, or —NHC(O)O—, wherein:

-Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur; and each A is a suitable acid anion.

Each of the Q, A, m, m', n, $R^x$, and $R^y$ groups of formula VII are as defined above and in various embodiments, classes and subclasses described herein both singly and in combination.

In certain embodiments, the m' group of formula VII is 1-1000. In certain embodiments, the m' group of formula VII is 0. In other embodiments, m' is 1-1000. According to other embodiments, m and m' are independently 10 to 100 repeat units. In still other embodiments, m is 1-20 repeat units and m' is 10-50 repeat units.

According to another embodiment, the present invention provides compounds of formula VII, as described above, wherein said compounds have a polydispersity index ("PDI") of about 1.0 to about 1.2. According to another embodiment, the present invention provides compounds of formula VII, as described above, wherein said compound has a polydispersity index ("PDI") of about 1.03 to about 1.15. According to yet another embodiment, the present invention provides compounds of formula VII, as described above, wherein said compound has a polydispersity index ("PDI") of about 1.10 to about 1.12. According to other embodiments, the present invention provides compounds of formula VII having a PDI of less than about 1.10

In certain embodiments, the present invention provides compounds of formula VII, as described above, wherein n is about 225. In other embodiments, n is about 200 to about 300. In still other embodiments, n is about 200 to about 250. In still other embodiments, n is about 100 to about 150. In still other embodiments, n is about 400 to about 500.

In certain embodiments, the m' group of formula VII is 0. In other embodiments, the m' group of formula VII is 1-1000.

One of ordinary skill in the art will recognize that compounds of formula VII may be further derivatized as described herein. In certain embodiments, the present invention provides a compound of formula VIII:

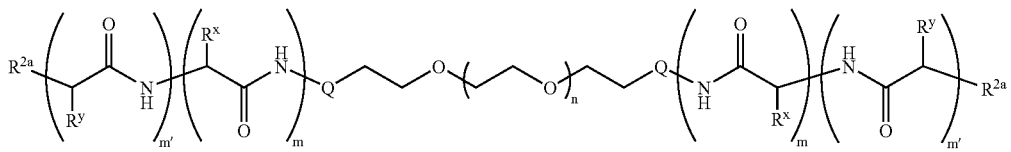

wherein:
n is 10-2500;
each m is independently 1 to 1000;
each m' is independently 0 to 1000;
each $R^x$ and $R^y$ are independently a natural or unnatural amino acid side-chain group, wherein $R^x$ and $R^y$ are different from each other;
each Q is independently a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —$SO_2$—, —$NHSO_2$—, —$SO_2NH$—, —NHC(O)—, —C(O)NH—, —OC(O)NH—, or —NHC(O)O—, wherein:

-Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur;

each $R^{2a}$ is independently a mono-protected amine, a di-protected amine, —$NHR^4$, —$N(R^4)_2$, —$NHC(O)R^4$, —$NR^4C(O)R^4$, —$NHC(O)NHR^4$, —$NHC(O)N(R^4)_2$, —$NR^4C(O)NHR^4$, —$NR^4C(O)N(R^4)_2$, —$NHC(O)OR^4$, —$NR^4C(O)OR^4$, —$NHSO_2R^4$, or —$NR^4SO_2R^4$; and each $R^4$ is independently an optionally substituted group selected from aliphatic, a 5-8 membered saturated, partially unsaturated, or aryl ring having 0-4 heteroatoms independently selected from nitrogen, oxygen, or sulfur, an 8-10-membered saturated, partially unsaturated, or aryl bicyclic ring having 0-5 heteroatoms independently selected from nitrogen, oxygen, or sulfur, or a detectable moiety, or:

two $R^4$ on the same nitrogen atom are taken together with said nitrogen atom to form an optionally substituted 4-7 membered saturated, partially unsaturated, or aryl ring having 1-4 heteroatoms independently selected from nitrogen, oxygen, or sulfur.

Each of the Q, $R^a$, m, m', n, $R^x$, and $R^y$ groups of formula VIII are as defined above and in various embodiments, classes and subclasses described herein both singly and in combination.

In certain embodiments, the m' group of formula VIII is 1-1000. In certain embodiments, the m' group of formula VIII is 0. In other embodiments, m' is 1-1000. According to other embodiments, m and m' are independently 10 to 100 repeat units. In still other embodiments, m is 1-20 repeat units and m' is 10-50 repeat units.

According to another embodiment, the present invention provides compounds of formula VIII, as described above, wherein said compounds have a polydispersity index ("PDI") of about 1.0 to about 1.2. According to another embodiment, the present invention provides compounds of formula VIII, as described above, wherein said compound has a polydispersity index ("PDI") of about 1.03 to about 1.15. According to yet another embodiment, the present invention provides compounds of formula VIII, as described above, wherein said compound has a polydispersity index ("PDI") of about 1.10 to about 1.12. According to other embodiments, the present invention provides compounds of formula VIII having a PDI of less than about 1.10.

In certain embodiments, the present invention provides compounds of formula VIII, as described above, wherein n is about 225. In other embodiments, n is about 200 to about 300. In still other embodiments, n is about 200 to about 250. In still other embodiments, n is about 100 to about 150. In still other embodiments, n is about 400 to about 500.

One of ordinary skill in the art will recognize that compounds of formula VIII are prepared by symmetrical polymerization of the two terminal amine salts of formula D. However, it is also contemplated that one of the terminal amine groups of formula D may be protected such that the other terminal amine may be used to initiate ROP in accordance with the present invention. The protecting group may then be removed and ROP can be initiated from the other terminal amine group. Accordingly, another embodiment of the present invention provides a method for preparing a compound of formula IX:

wherein:
n is 10-2500;
each m and m-a is independently 1 to 1000;
each m' and m'-a is independently 0 to 1000;
each of $R^x$, $R^{xa}$, $R^y$, and $R^{ya}$ is independently a natural or unnatural amino acid side-chain group, wherein $R^x$ and $R^y$ and $R^{xa}$ and $R^{ya}$ are different from each other;
each Q is independently a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—, wherein:
-Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur; and
each A is a suitable acid anion, wherein said method comprises the steps of:
(a) providing a compound of formula E:

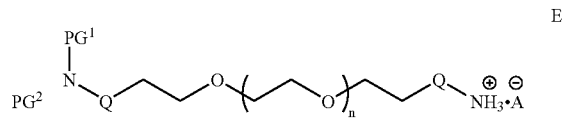

E wherein:
n is 10-2500;
each of $PG^1$ or $PG^2$ is hydrogen or a suitable amine protecting group, or $PG^1$ and $PG^2$ are taken together to form a cyclic amine protecting group, provided that at least one of $PG^1$ and $PG^2$ is a suitable amine protecting group;
each Q is independently a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—,
wherein:
-Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsatur-

IX

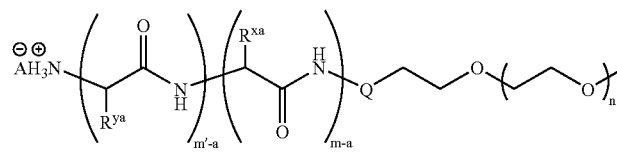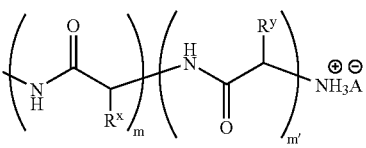

ated, or aryl bicyclic ring having 0-5 heteroatoms independently selected from nitrogen, oxygen, or sulfur; and A is a suitable acid anion, (b) polymerizing a first cyclic amino acid monomer onto the amine salt terminal end of formula E, wherein said first cyclic amino acid monomer comprises $R^x$;

(c) optionally polymerizing a second cyclic amino acid monomer, comprising $R^y$, onto the living polymer end, wherein said second cyclic amino acid monomer is different from said first cyclic amino acid monomer, to form a compound of formula F:

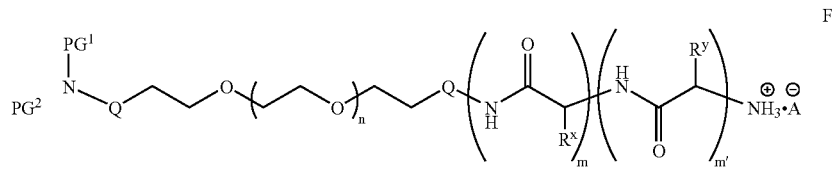

wherein:
m is 1-1000;
m' is 0-1000;
n is 10-2500;
each $R^x$ and $R^y$ are independently a natural or unnatural amino acid side-chain group, wherein $R^x$ and $R^y$ are different from each other;
each of $PG^1$ or $PG^2$ is hydrogen or a suitable amine protecting group, or $PG^1$ and $PG^2$ are taken together to form a cyclic amine protecting group, provided that at least one of $PG^1$ and $PG^2$ is a suitable amine protecting group;
each Q is independently a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—, wherein:
-Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur; and A is a suitable acid anion, (d) protecting the living terminal amine of said compound of formula F;

(e) removing the $PG^1$ and $PG^2$ groups and forming a salt thereof;

(f) polymerizing a first cyclic amino acid monomer onto the resulting amine salt terminal end, wherein said first cyclic amino acid monomer comprises $R^{xa}$;

(g) optionally polymerizing a second cyclic amino acid monomer, comprising $R^{ya}$, onto the living polymer end, wherein said second cyclic amino acid monomer is different from said first cyclic amino acid monomer, to form a compound of formula IX.

Each of the Q, A, m, m-a, m', m'-a, n, $R^x$, $R^{xa}$, $R^y$, and $R^{ya}$ groups of formula IX are as defined above and in various embodiments, classes and subclasses described herein both singly and in combination.

In certain embodiments, the m' and m'-a groups of formula IX are independently 1-1000. In certain embodiments, one or both of the m' and m'-a groups of formula IX are 0. According to other embodiments, m, m-a, m', and m'-a are independently 10 to 100 repeat units. In still other embodiments, m and m-a are independently 1-20 repeat units and m' and m'-a are independently 10-50 repeat units.

According to another embodiment, the present invention provides compounds of formula IX, as described above, wherein said compounds have a polydispersity index ("PDI") of about 1.0 to about 1.2. According to another embodiment, the present invention provides compounds of formula IX, as described above, wherein said compound has a polydispersity index ("PDI") of about 1.03 to about 1.15. According to yet another embodiment, the present invention provides compounds of formula IX, as described above, wherein said compound has a polydispersity index ("PDI") of about 1.10 to about 1.12. According to other embodiments, the present invention provides compounds of formula IX having a PDI of less than about 1.10.

In certain embodiments, the present invention provides compounds of formula IX, as described above, wherein n is about 225. In other embodiments, n is about 200 to about 300. In still other embodiments, n is about 200 to about 250. In still other embodiments, n is about 100 to about 150. In still other embodiments, n is about 400 to about 500.

One of ordinary skill in the art will recognize that compounds of formula IX may be further derivatized as described herein. In certain embodiments, the present invention provides a compound of formula X:

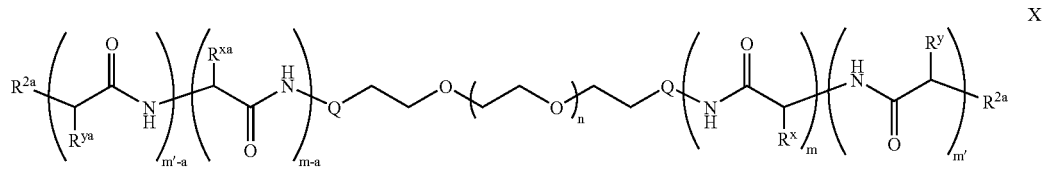

wherein:
n is 10-2500;
each m and m-a is independently 1 to 1000;
each m' and m'-a is independently 0 to 1000;
each of $R^x$, $R^{xa}$, $R^y$, and $R^{ya}$ is independently a natural or unnatural amino acid side-chain group, wherein $R^x$ and $R^y$, and $R^{xa}$ and $R^{ya}$, are different from each other;
each Q is independently a valence bond or a bivalent, saturated or unsaturated, straight or branched $C_{1-12}$ alkylene chain, wherein 0-6 methylene units of Q are independently replaced by -Cy-, —O—, —NH—, —S—, —OC(O)—, —C(O)O—, —C(O)—, —SO—, —SO$_2$—, —NHSO$_2$—, —SO$_2$NH—, —NHC(O)—, —C(O)NH—, —OC(O)NH—, or —NHC(O)O—, wherein:
-Cy- is an optionally substituted 5-8 membered bivalent, saturated, partially unsaturated, or aryl ring having 0-4 heteroatoms independently selected from nitrogen, oxygen, or sulfur, or an optionally substituted 8-10 membered bivalent saturated, partially unsaturated, or aryl bicyclic ring having 0-5 heteroatoms independently selected from nitrogen, oxygen, or sulfur; and
each $R^{2a}$ is independently a mono-protected amine, a di-protected amine, —NHR$^4$, —N(R$^4$)$_2$, —NHC(O)R$^4$, —NR$^4$C(O)R$^4$, —NHC(O)NHR$^4$, —NHC(O)N(R$^4$)$_2$, —NR$^4$C(O)NHR$^4$, —NR$^4$C(O)N(R$^4$)$_2$, —NHC(O)OR$^4$, —NR$^4$C(O)OR$^4$, —NHSO$_2$R$^4$, or —NR$^4$SO$_2$R$^4$; and
each $R^4$ is independently an optionally substituted group selected from aliphatic, a 5-8 membered saturated, partially unsaturated, or aryl ring having 0-4 heteroatoms independently selected from nitrogen, oxygen, or sulfur, an 8-10-membered saturated, partially unsaturated, or aryl bicyclic ring having 0-5 heteroatoms independently selected from nitrogen, oxygen, or sulfur, or a detectable moiety, or:
two $R^4$ on the same nitrogen atom are taken together with said nitrogen atom to form an optionally substituted 4-7 membered saturated, partially unsaturated, or aryl ring having 1-4 heteroatoms independently selected from nitrogen, oxygen, or sulfur.

Each of the Q, $R^{2a}$, m, m-a, m', m'-a, n, $R^x$, $R^{xa}$, $R^y$, and $R^{ya}$ groups of formula X are as defined above and in various embodiments, classes and subclasses described herein both singly and in combination.

In certain embodiments, the m' and m'-a groups of formula X are independently 1-1000. In certain embodiments, one or both of the m' and m'-a groups of formula X are 0. According to other embodiments, m, m-a, m', and m'-a are independently 10 to 100 repeat units. In still other embodiments, m and m-a are independently 1-20 repeat units and m' and m'-a are independently 10-50 repeat units.

According to another embodiment, the present invention provides compounds of formula X, as described above, wherein said compounds have a polydispersity index ("PDI") of about 1.0 to about 1.2. According to another embodiment, the present invention provides compounds of formula X, as described above, wherein said compound has a polydispersity index ("PDI") of about 1.03 to about 1.15. According to yet another embodiment, the present invention provides compounds of formula X, as described above, wherein said compound has a polydispersity index ("PDI") of about 1.10 to about 1.12. According to other embodiments, the present invention provides compounds of formula X having a PDI of less than about 1.10.

In certain embodiments, the present invention provides compounds of formula X, as described above, wherein n is about 225. In other embodiments, n is about 200 to about 300. In still other embodiments, n is about 200 to about 250. In still other embodiments, n is about 100 to about 150. In still other embodiments, n is about 400 to about 500.

4. Uses, Methods, and Compositions

As discussed above, the present invention provides multi-block copolymers, intermediates thereto, and methods of preparing the same. Such multi-block copolymers are useful for a variety of purposes in the pharmaceutical and biomedical fields. Such uses include using the multi-block copolymers of the present invention, in particular the PEG-poly (amino acid) block copolymers prepared by the methods of the present invention, in the process of PEGylating other molecules.

For example, U.S. Pat. No. 6,797,257 describes imaging agents prepared by PEGylating gadolinium oxide albumin microspheres. U.S. Pat. Nos. 6,790,823 and 6,764,853 describe the PEGylation of proteins by covalently bonding reactive groups, such as, free amines or carboxylates of amino acid residues. Reactive groups are those to which an activated polyethylene glycol molecule may be bound. The amino acid residues having a free amine group may include lysine residues and the N-terminal amino acid residues; those having a free carboxylate group may include aspartic acid residues, glutamic acid residues, and the C-terminal amino acid residue. Sulfhydryl groups may also be used as a reactive group for attaching activated polyethylene glycol molecule(s).

Accordingly, another aspect of the present invention provides a method of conjugating a biomolecule with a compound of formula II, II', III, or V. In certain embodiments, the compounds of formula II, II', III, or V are prepared by the methods of the present invention, as described generally above and in classes and subclasses defined above and herein. In certain embodiments, the present invention provides a method of conugating a protein, a plasmid, a dye, a peptide, a hydrogel, or a small molecule drug with a compound of formula II, II', III, or V. In certain embodiments, the compounds of formula II, II', III, or V are prepared by the methods of the present invention, as described generally above and in classes and subclasses defined above and herein.

Yet another aspect of the present invention provides a drug-polymer conjugate comprising a compound of formula II, II', III, or V. In certain embodiments, the present invention provides a drug-polymer conjugate comprising a compound of formula II, II', III, or V prepared by the methods of the present invention, and a pharmaceutically active agent. In still another aspect of the present invention, pharmaceutically acceptable compositions are provided, wherein these compositions comprise a drug-polymer conjugate as described herein, and optionally comprise a pharmaceutically acceptable carrier, adjuvant or vehicle. In certain embodiments, these compositions optionally further comprise one or more additional therapeutic agents.

One of ordinary skill in the art would recognize that the compounds prepared by the methods of the present invention are useful for the conjugation of small molecule drugs. Small molecule drugs suitable for conjugation with the compounds prepared by the methods of the present invention include, but are not limited to, those having a functional group suitable for covalently linking to the PEG-poly(amino acid) block copolymers of the present invention prepared by the methods of the present invention. Such drugs include, without limitation, chemotherapeutic agents or other anti-proliferative agents including alkylating drugs (mechlorethamine, chlorambucil, Cyclophosphamide, Melphalan, Ifosfamide), antimetabolites (Methotrexate), purine antagonists and pyrimidine antagonists (6-Mercaptopurine, 5-Fluorouracil, Cytarabile, Gemcitabine), spindle poisons (Vinblastine, Vincristine, Vinorelbine, Paclitaxel), podophyllotoxins (Etoposide, Irinotecan, Topotecan), antibiotics (Doxorubicin, Bleomycin, Mitomycin), nitrosoureas (Carmustine, Lomustine), inorganic ions (Cisplatin, Carboplatin), enzymes (Asparaginase), angiogenesis inhibitors (Avastin) and hormones (Tamoxifen, Leuprolide, Flutamide, and Megestrol), Gleevec, dexamethasone, and cyclophosphamide. For a more comprehensive discussion of updated cancer therapies see, http://www.cancer.gov/, a list of the FDA approved oncology drugs at http://www.fda.gov/cder/cancer/druglistframe.htm, and The Merck Manual, Seventeenth Ed. 1999, the entire contents of which are hereby incorporated by reference.

Other examples of small molecule drugs that may be conjugated with the compounds prepared by the methods of this invention include treatments for Alzheimer's Disease such as Aricept® and Excelon®; treatments for Parkinson's Disease such as L-DOPA/carbidopa, entacapone, ropinrole, pramipexole, bromocriptine, pergolide, trihexephendyl, and amantadine; agents for treating Multiple Sclerosis (MS) such as beta interferon (e.g., Avonex® and Rebif®), Copaxone®, and mitoxantrone; treatments for asthma such as albuterol and Singulair®, agents for treating schizophrenia such as zyprexa, risperdal, seroquel, and haloperidol; anti-inflammatory agents such as corticosteroids, TNF blockers, IL-1 RA, azathioprine, cyclophosphamide, and sulfasalazine; immunomodulatory and immunosuppressive agents such as cyclosporin, tacrolimus, rapamycin, mycophenolate mofetil, interferons, corticosteroids, cyclophosphamide, azathioprine, and sulfasalazine; neurotrophic factors such as acetylcholinesterase inhibitors, MAO inhibitors, interferons, anticonvulsants, ion channel blockers, riluzole, and anti-Parkinsonian agents; agents for treating cardiovascular disease such as beta-blockers, ACE inhibitors, diuretics, nitrates, calcium channel blockers, and statins; agents for treating liver disease such as corticosteroids, cholestyramine, interferons, and anti-viral agents; agents for treating blood disorders such as corticosteroids, anti-leukemic agents, and growth factors; and agents for treating immunodeficiency disorders such as gamma globulin.

As described above, the pharmaceutically acceptable compositions of the present invention additionally comprise a pharmaceutically acceptable carrier, adjuvant, or vehicle, which, as used herein, includes any and all solvents, diluents, or other liquid vehicle, dispersion or suspension aids, surface active agents, isotonic agents, thickening or emulsifying agents, preservatives, solid binders, lubricants and the like, as suited to the particular dosage form desired. Remington's Pharmaceutical Sciences, Sixteenth Edition, E. W. Martin (Mack Publishing Co., Easton, Pa., 1980) discloses various carriers used in formulating pharmaceutically acceptable compositions and known techniques for the preparation thereof. Except insofar as any conventional carrier medium is incompatible with the compounds of the invention, such as by producing any undesirable biological effect or otherwise interacting in a deleterious manner with any other component(s) of the pharmaceutically acceptable composition, its use is contemplated to be within the scope of this invention.

The pharmaceutically acceptable compositions of this invention can be administered to humans and other animals orally, rectally, parenterally, intracisternally, intravaginally, intraperitoneally, topically (as by powders, ointments, or drops), bucally, as an oral or nasal spray, or the like, depending on the severity of the infection being treated. In certain embodiments, the compounds of the invention may be administered orally or parenterally at dosage levels of about 0.01 mg/kg to about 50 mg/kg and preferably from about 1 mg/kg to about 25 mg/kg, of subject body weight per day, one or more times a day, to obtain the desired therapeutic effect.

Amphiphilic multi-block copolymers, as described herein, can self-assemble in aqueous solution to form nano- and micron-sized structures, with applications from drug encapsulation to artificial viruses and cells. In water, these amphiphilic copolymers assemble by multi-molecular micellization when present in solution above the critical micelle concentration (CMC). Without wishing to be bound by any particular theory, it is believed that the hydrophobic poly (amino acid) portion or "block" of the copolymer collapses to form the micellar core, while the hydrophilic PEG block forms a peripheral corona and imparts water solubility. Additionally, poly(amino acid) blocks capable of chemical crosslinking (e.g. aspartic and glutamic acid, cysteine, or serine) may also be incorporated into the amphiphilic copolymer to further enhance the stability of micellar assemblies. These core-shell polymer micelles can be tuned to encapsulate a variety of therapeutic molecules, including small molecule drugs, polypeptides, and polynucleotides. Use of compounds of the present invention in micellar assemblies is described in detail in U.S. provisional application Ser. No. 60/667,260, filed Apr. 1, 2005, and U.S. provisional application Ser. No. 60/741,780, filed Dec. 1, 2005, the entirety of both of which is hereby incorporated herein by reference.

In order that the invention described herein may be more fully understood, the following examples are set forth. It will be understood that these examples are for illustrative purposes only and are not to be construed as limiting this invention in any manner.

EXAMPLES

Example 1

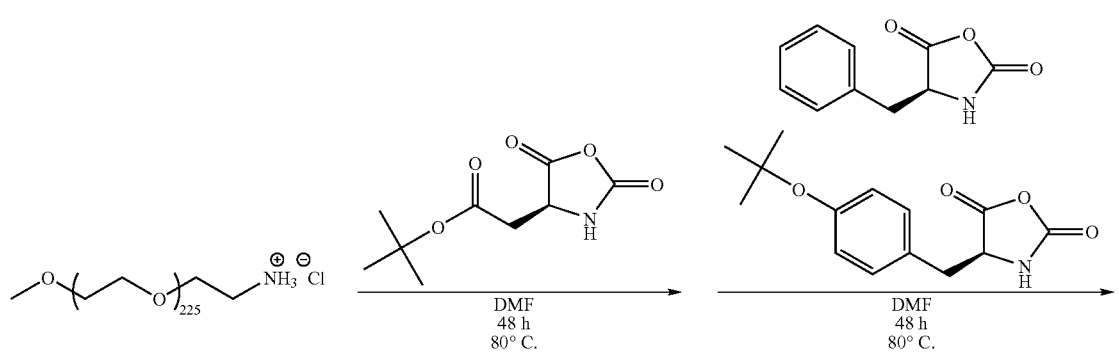

-continued

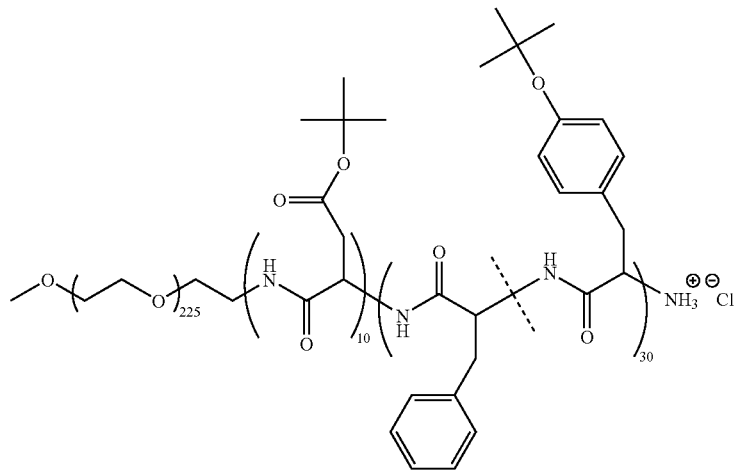

To a dried 100 mL round bottom flask equipped with a stir bar, septum and inlet adapter was added PEG-amine hydrochloride (2.13 g, 0.21 mmol) and t-butyl aspartic acid NCA (0.46 g, 2.1 mmol). The contents were dried under vacuum for 1 hour and backfilled with $N_2$. Anhydrous dimethylformamide (DMF) (25 mL) was added via syringe and the reaction was heated to 80° C. After 48 hours, an aliquot was removed and the polymer molecular weight was determined to be 12,400 g/mol (PDI=1.10) by size exclusion chromatography in dimethylacetamide (DMAc). Phenylalanine NCA (0.98 g, 5.1 mmol) and t-butyl tyrosine NCA (0.34 g, 1.3 mmol) were placed in a 50 mL round bottom flask and dried under vacuum for 1 hour. The two monomers were dissolved in anhydrous DMF (15 mL) then transferred to the reaction vessel containing the PEG-b-poly(aspartic acid) copolymer. The reaction was stirred for 48 hours at 80° C. The solution was allowed to cool to room temperature, precipitated into diethyl ether (500 mL), filtered, and dried in vacuo. The multi-block copolymer was isolated as a white powder with a molecular weight of 15,100 g/mol (PDI=1.13) as determined by size exclusion chromatography in DMAc.

Example 2

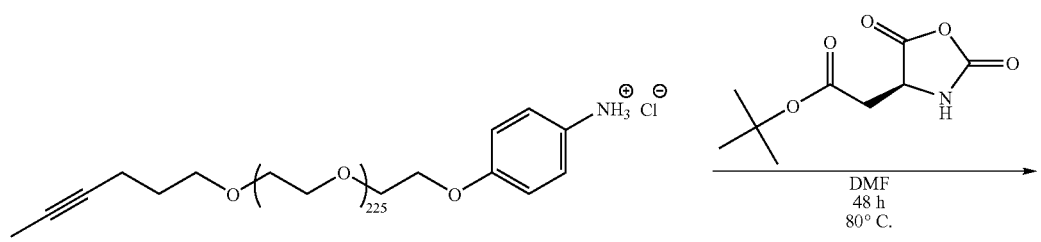

-continued

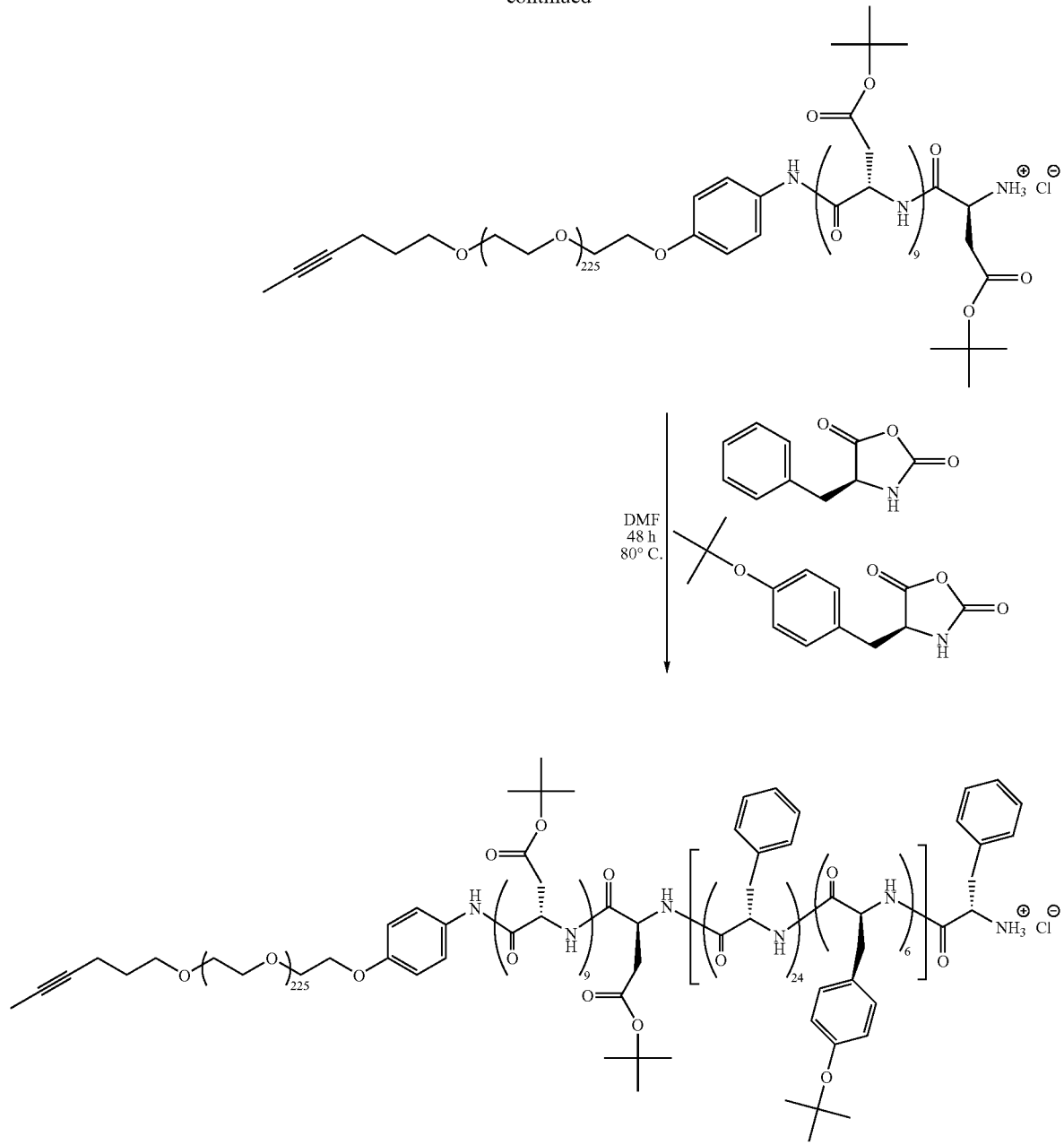

To a dried 100 mL round bottom flask equipped with a stir bar, septum and inlet adapter was added acetylene-PEG-aniline hydrochloride (2.13 g, 0.21 mmol) and t-butyl aspartic acid NCA (0.46 g, 2.1 mmol). The contents were dried under vacuum for 1 hour and backfilled with $N_2$. Anhydrous DMF (25 mL) was added via syringe then the reaction heated to 80° C. After 48 hours, an aliquot was removed and the polymer molecular weight was determined to be 11,900 g/mol (PDI=1.12) by size exclusion chromatography in DMF. Phenylalanine NCA (0.98 g, 5.1 mmol) and t-butyl tyrosine NCA (0.34 g, 1.3 mmol) were placed in a 50 mL round bottom flask and dried under vacuum for 1 hour. The two monomers were dissolved in anhydrous DMF (15 mL) and transferred to the reaction vessel containing the PEG-b-poly(aspartic acid) copolymer. The solution was stirred for 48 hours at 80° C. The solution was allowed to cool to room temperature, precipitated into diethyl ether (500 mL), filtered, and dried in vacuo. The multi-block copolymer was isolated as a white powder with a molecular weight of 12,700 g/mol (PDI=1.15) as determined by size exclusion chromatography in DMF. $^1$H NMR (δ, 400 MHz, DMSO-$d_6$) 9.12, 8.05, 7.96, 7.44, 7.17, 6.94, 6.83, 6.59, 4.73, 4.51, 4.02, 3.54, 1.92, 1.47, 1.38, 1.21, 1.09.

125 126
Example 3
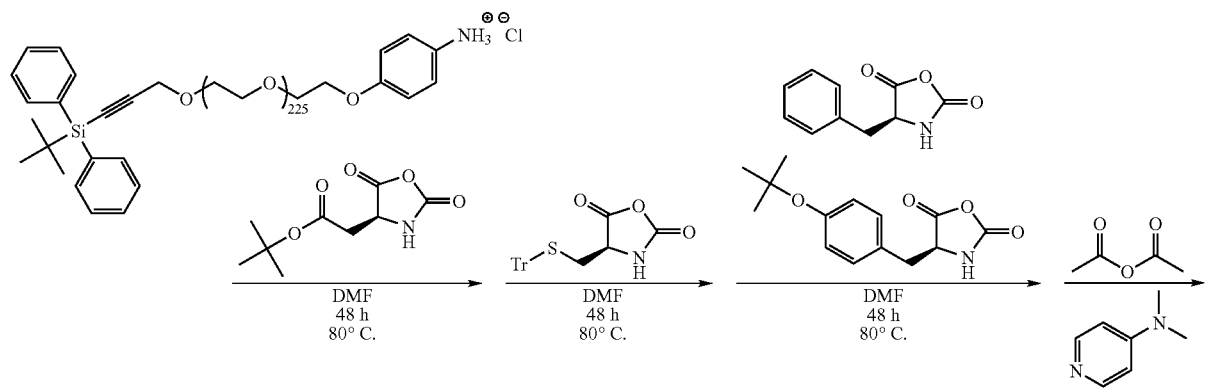
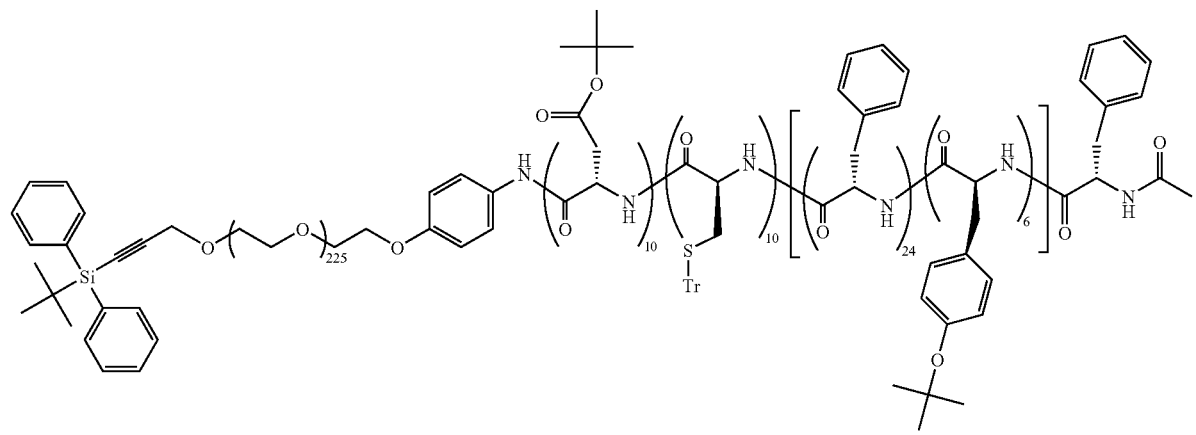
Example 4
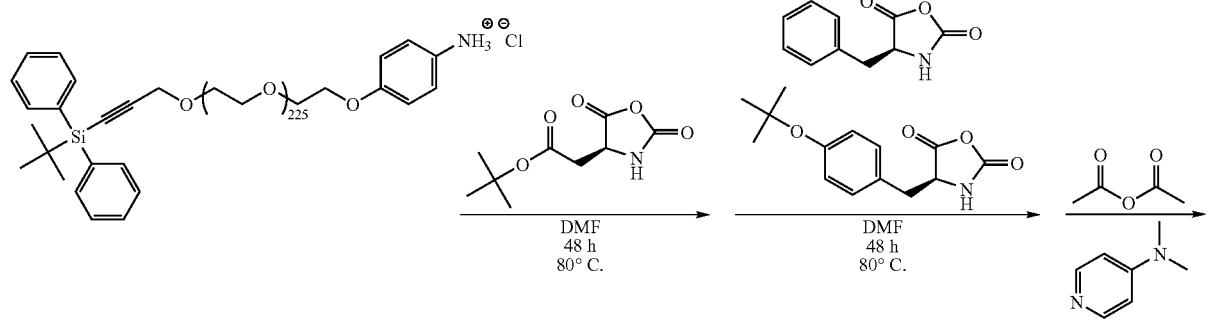

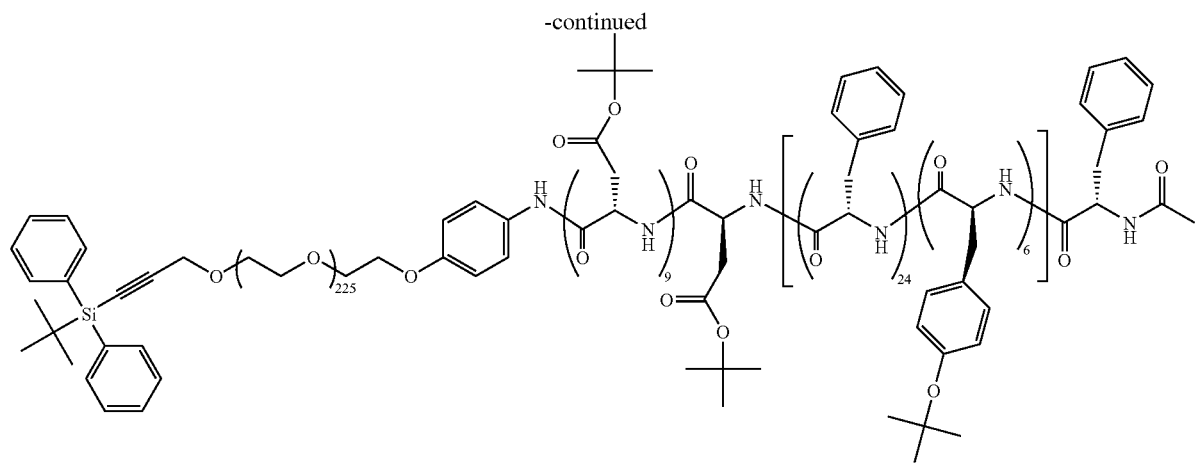
Example 5
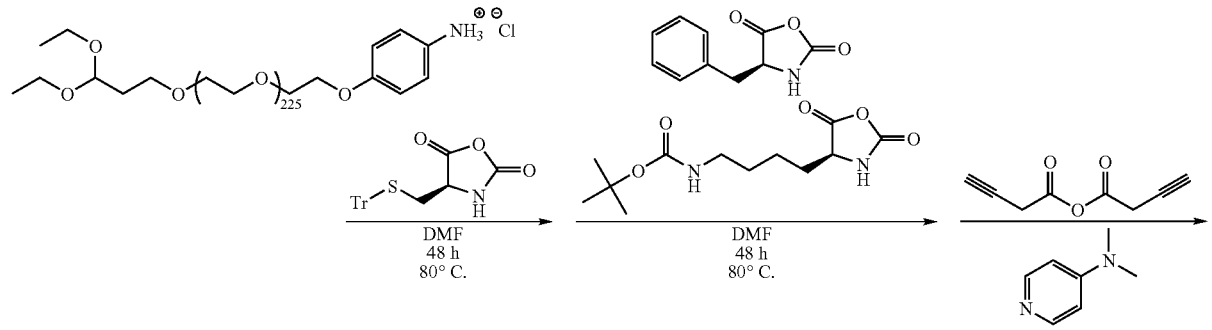
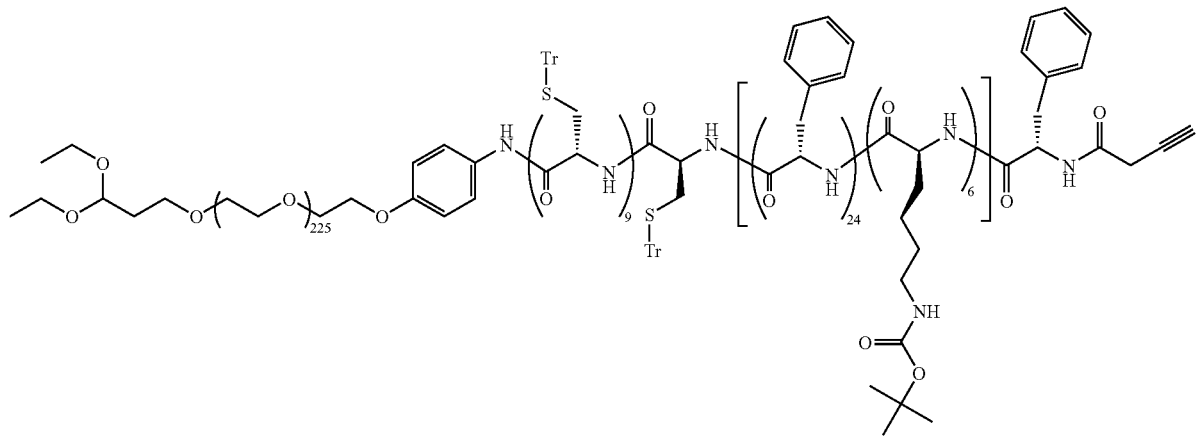

Example 6
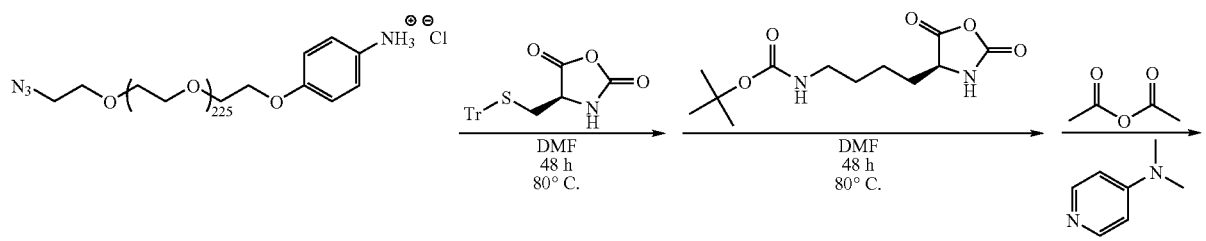
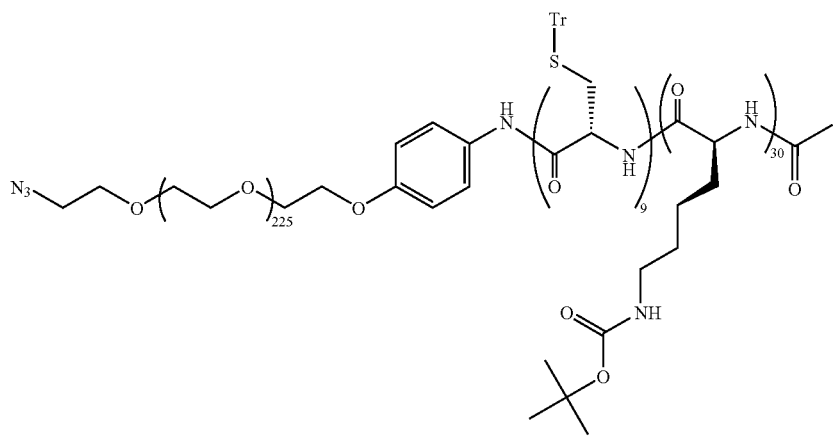
Example 7
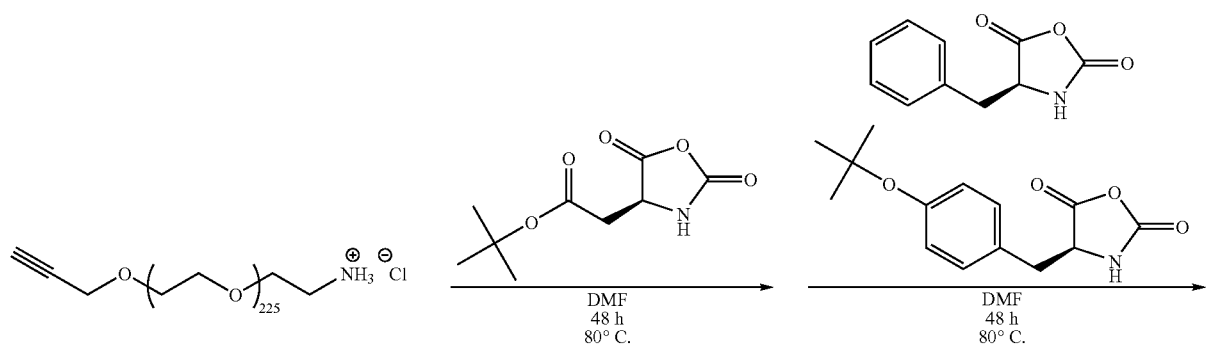

-continued

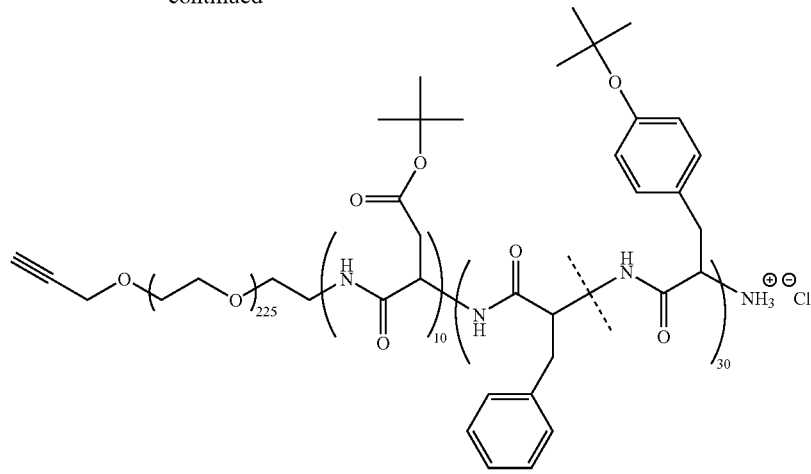

While we have described a number of embodiments of this invention, it is apparent that our basic examples may be altered to provide other embodiments that utilize the compounds and methods of this invention. Therefore, it will be appreciated that the scope of this invention is to be defined by the appended claims rather than by the specific embodiments that have been represented by way of example.

We claim:

1. A compound of formula III:

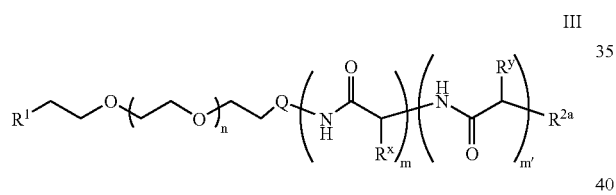

III wherein:
n is 10-2500;
m is 1 to 1000;
m' is 0 to 1000;
$R^x$ and $R^y$ are each independently a natural or unnatural amino acid side-chain group, wherein $R^x$ and $R^y$ are different from each other;
$R^1$ is $-Z(CH_2CH_2Y)_p(CH_2)_yR^3$, wherein:
Z is —O—;
Y is —O—;
p is 0-10;
y is 0-10; and
$R^3$ is $-N_3$;
Q is a valence bond;
$R^{2a}$ is —NHC(O)$R^4$; and
$R^4$ is an optionally substituted aliphatic.

2. The compound according to claim 1, wherein $R^1$ is:

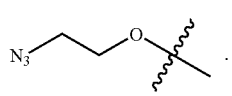

g

3. The compound according to claim 2, wherein $R^{2a}$ is selected from the group consisting of:

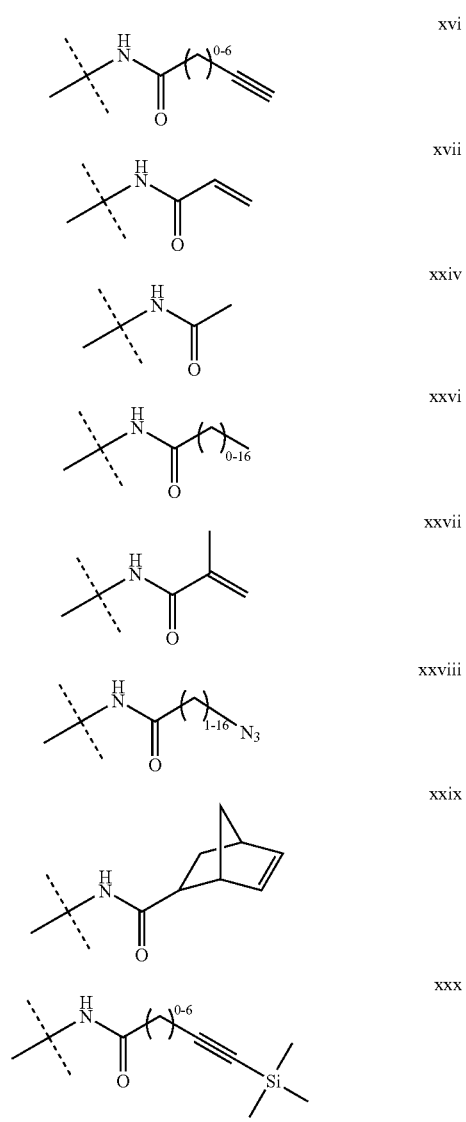

-continued xxxi 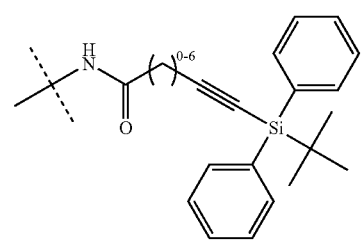

xxxii 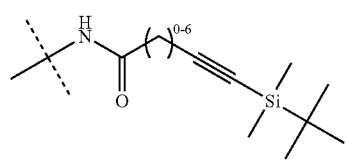

xxxiii 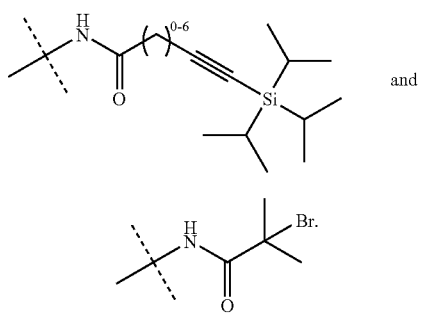 and xlvii 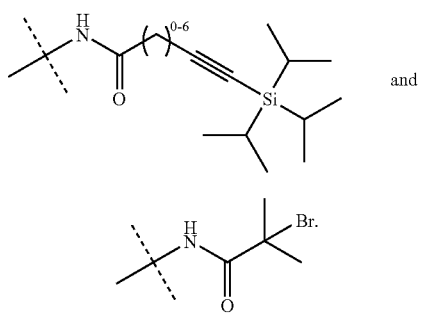

4. The compound according to claim 1, wherein:
n is about 100 to about 250;
m is 1-20;
m' is 10-50; and
$R^{2a}$ is —NHC(O)CH$_3$.

5. The compound according to claim 4, wherein one of $R^x$ and $R^y$ is a hydrophilic amino acid side-chain or crosslinkable group and the other of $R^x$ and $R^y$ is a hydrophobic or ionic amino acid side-chain group.

6. The compound according to claim 5, wherein said hydrophilic amino acid side-chain group is an aspartic acid side chain, glutamic acid side-chain, lysine side-chain, arginine side-chain, or protected form or mixture thereof, and said hydrophobic amino acid side-chain group is a phenylalanine side-chain, alanine side-chain, or leucine side-chain, and optionally one or more of tyrosine side-chain, serine side-chain, or threonine side-chain.

7. The compound according to claim 2, wherein:
n is about 100 to about 250;
m is 1-20;
m' is 10-50; and
$R^{2a}$ is —NHC(O)CH$_3$.

8. The compound according to claim 1, wherein $R^x$ is a hydrophilic amino acid side-chain or crosslinkable group and $R^y$ is a hydrophobic or ionic amino acid side-chain group.

9. The compound according to claim 8, wherein $R^x$ is an aspartic acid side chain or a glutamic acid side-chain.

10. The compound according to claim 9, wherein $R^y$ is a phenylalanine side-chain, alanine side-chain, benzyl or alkyl glutamate side chain, a benzyl or alkyl aspartate side chain, or leucine side-chain, and optionally one or more of tyrosine side-chain, serine side-chain, threonine side-chain, glutamic acid, or aspartic acid such that the overall poly(amino acid) block comprising $R^y$ is hydrophobic.

* * * * *

UNITED STATES PATENT AND TRADEMARK OFFICE
CERTIFICATE OF CORRECTION

PATENT NO. : 7,601,796 B2  Page 1 of 1
APPLICATION NO. : 11/325020
DATED : October 13, 2009
INVENTOR(S) : Breitenkamp et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 859 days.

Signed and Sealed this

Fifth Day of October, 2010

David J. Kappos
*Director of the United States Patent and Trademark Office*